March 27, 1962 F. G. STEELE 3,027,078
ELECTRONIC DIGITAL DIFFERENTIAL ANALYZER
Filed Oct. 28, 1953 12 Sheets-Sheet 1
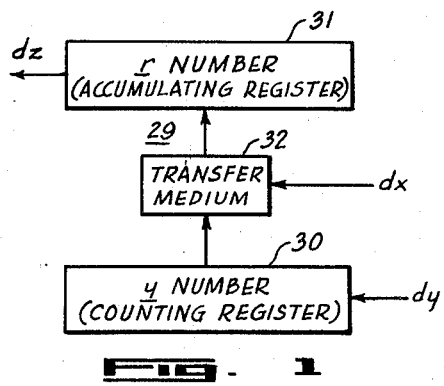
FIG. 1
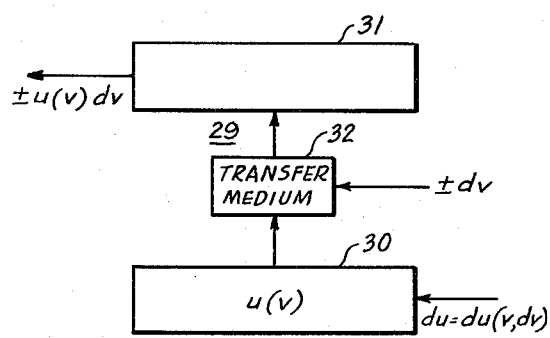
FIG. 2
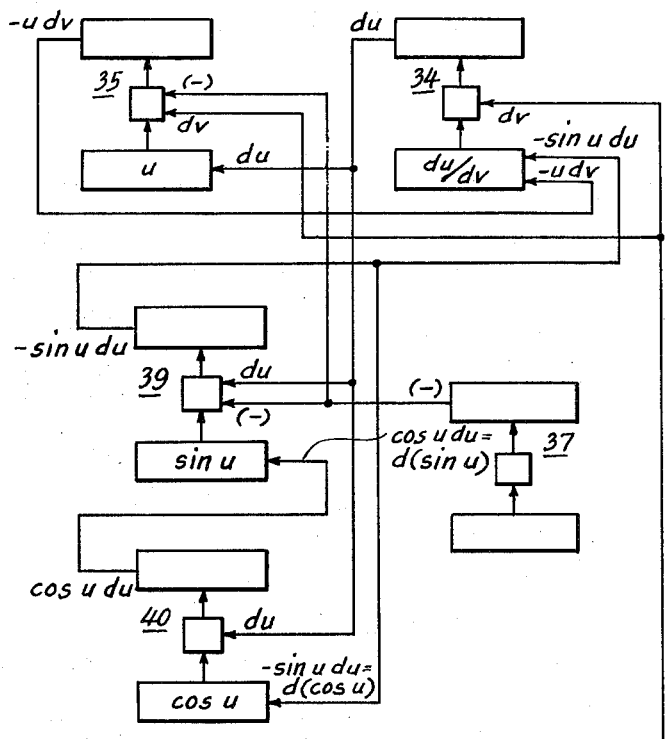
FIG. 3
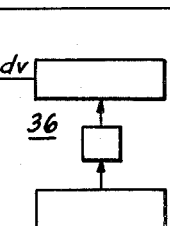
INVENTOR:
Floyd G. Steele
BY
Walter J. Jason
ATTORNEY

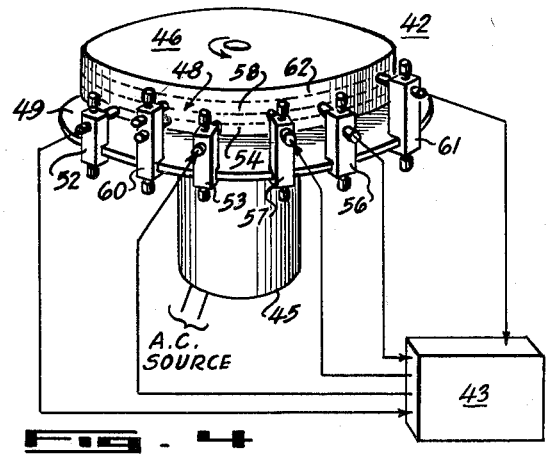
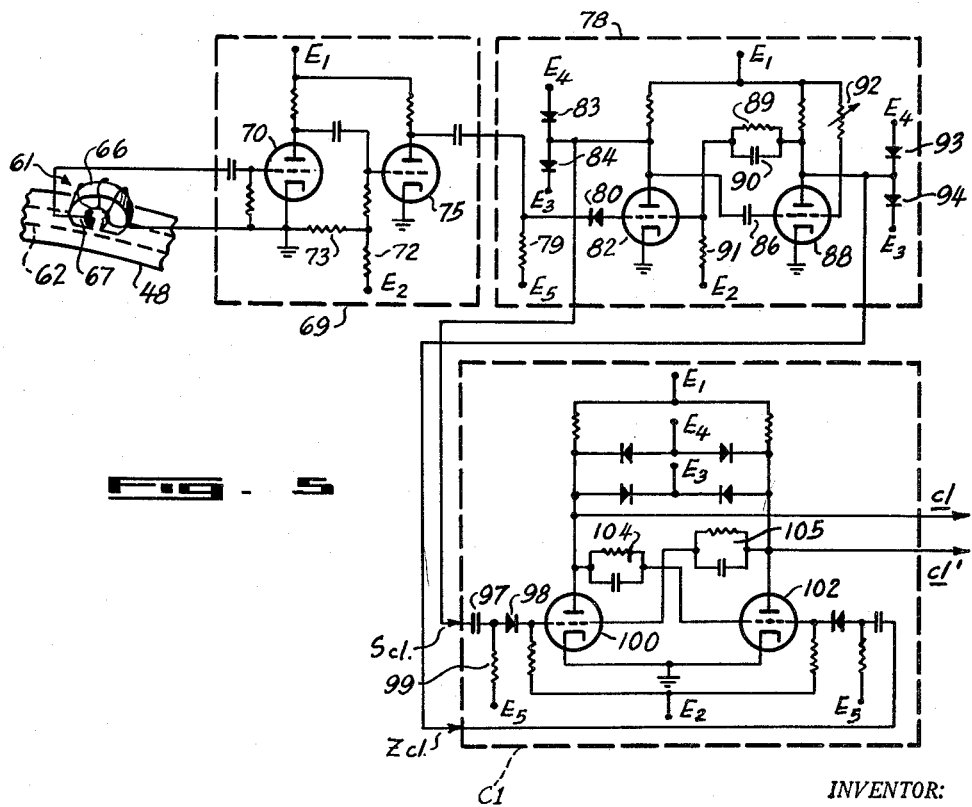

March 27, 1962 F. G. STEELE 3,027,078
ELECTRONIC DIGITAL DIFFERENTIAL ANALYZER
Filed Oct. 28, 1953 12 Sheets-Sheet 3
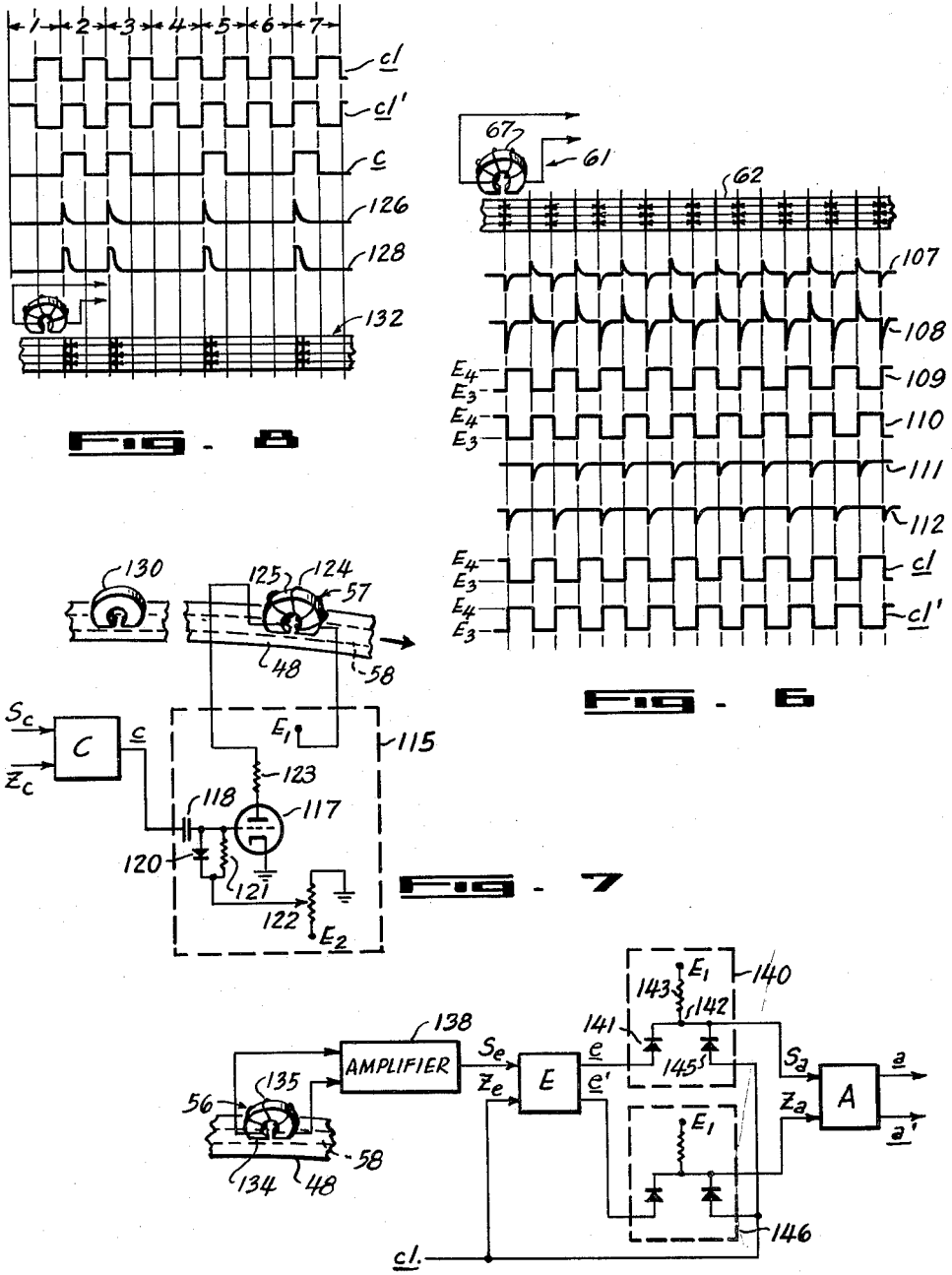
INVENTOR:
Floyd G. Steele
BY
ATTORNEY

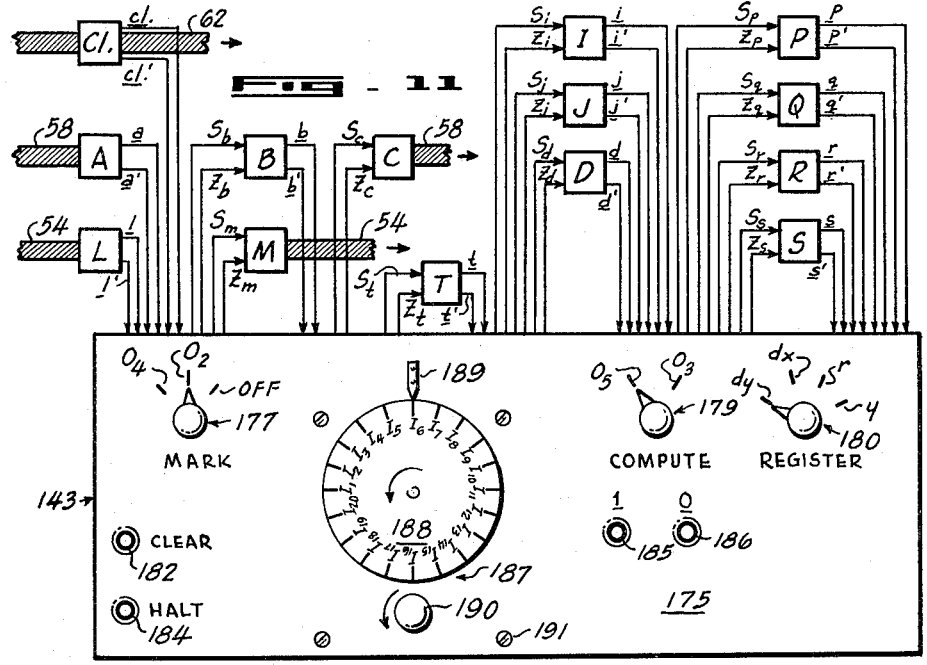

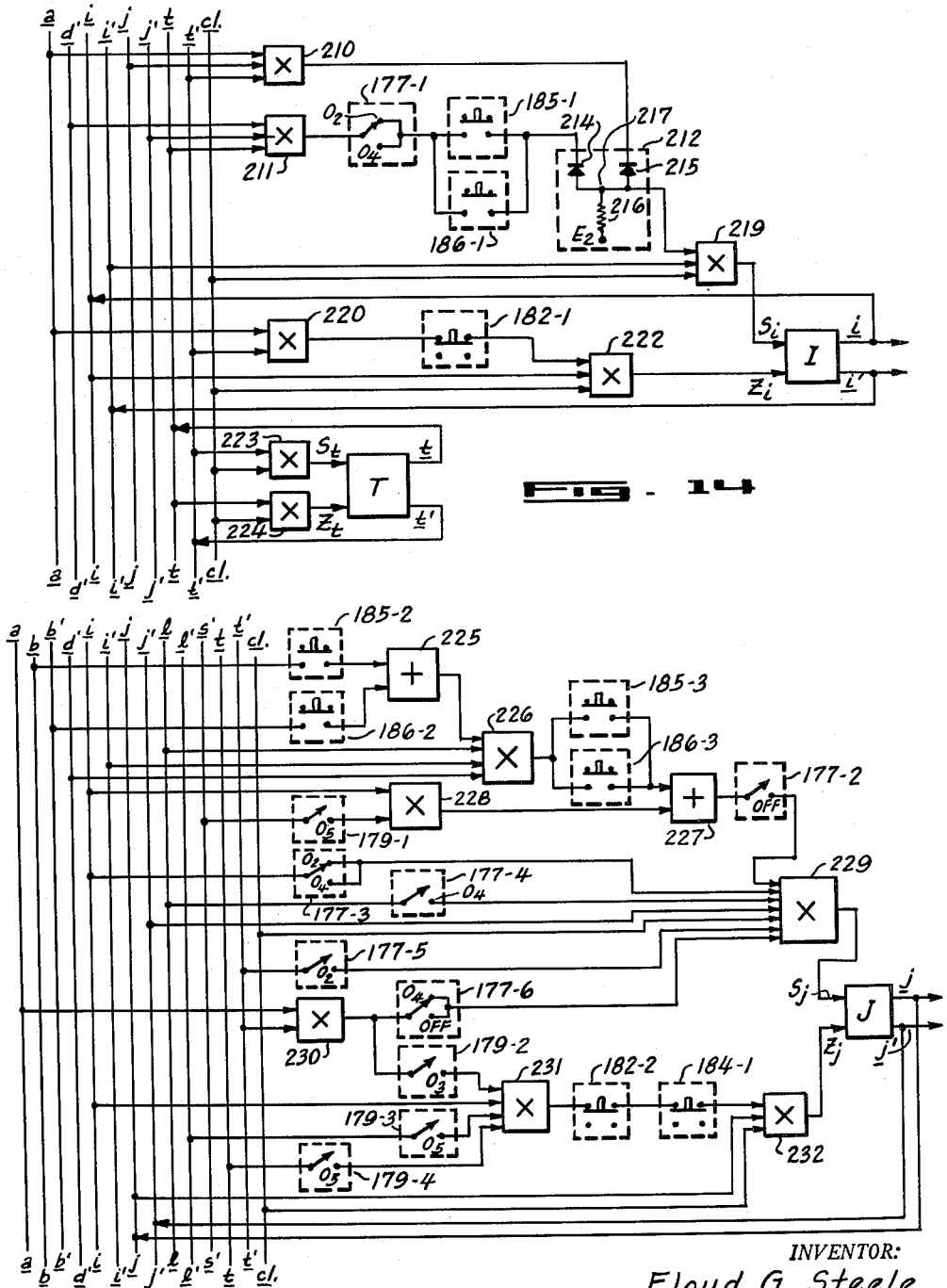

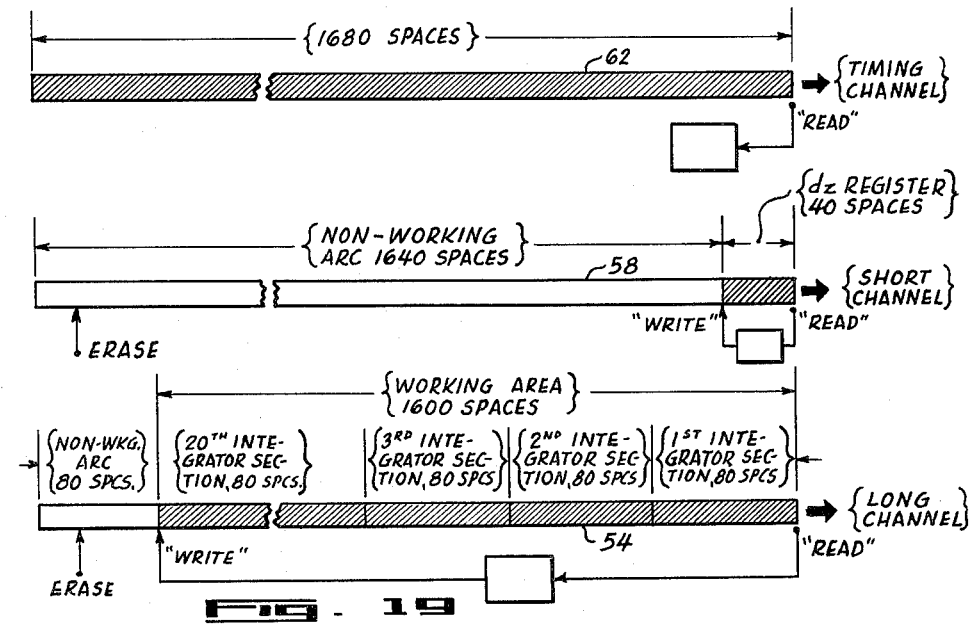
FIG. 19
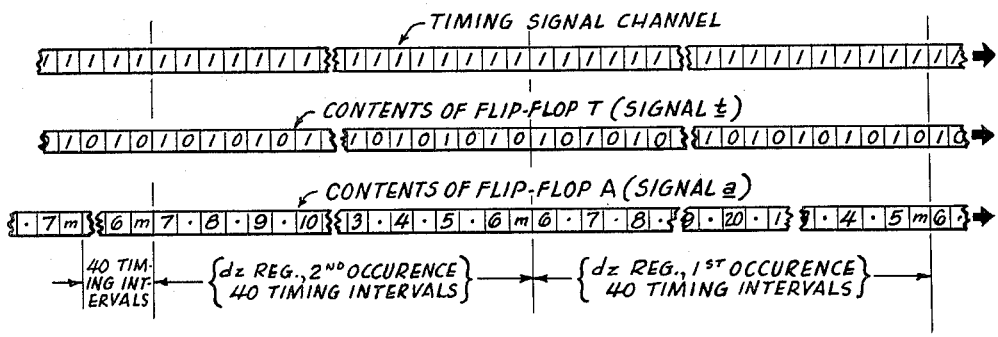
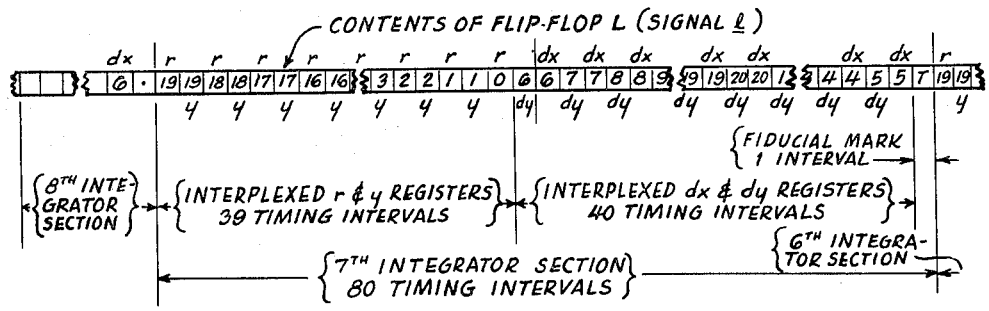
FIG. 20

March 27, 1962  F. G. STEELE  3,027,078
ELECTRONIC DIGITAL DIFFERENTIAL ANALYZER
Filed Oct. 28, 1953  12 Sheets-Sheet 10
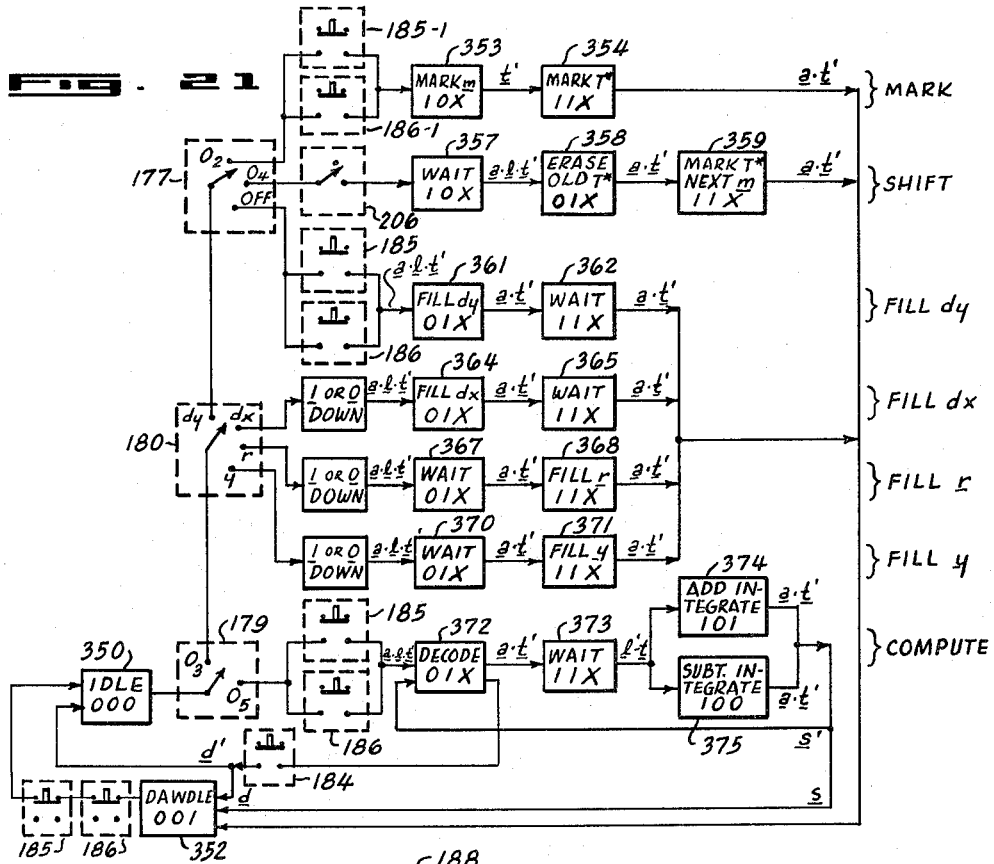
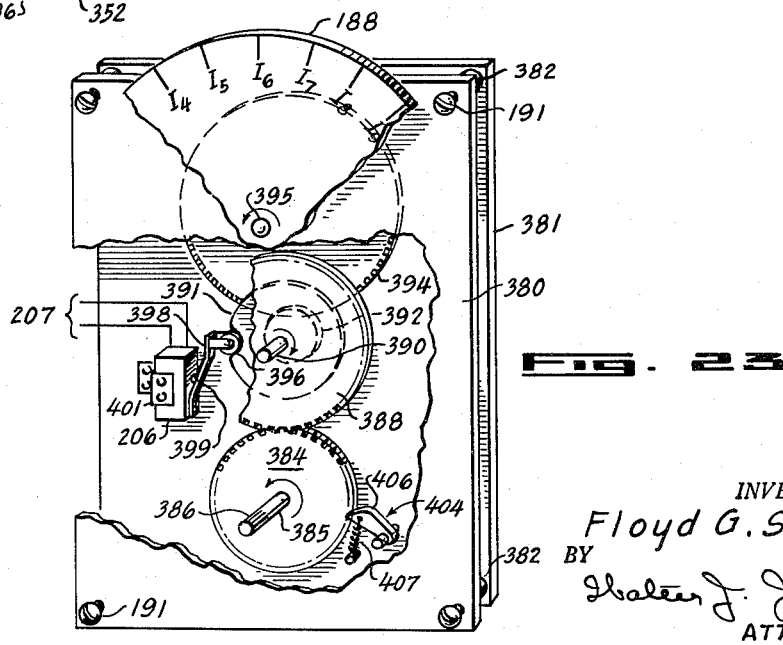
INVENTOR:
*Floyd G. Steele*
BY
ATTORNEY

FIG. 22

March 27, 1962  F. G. STEELE  3,027,078
ELECTRONIC DIGITAL DIFFERENTIAL ANALYZER
Filed Oct. 28, 1953  12 Sheets-Sheet 12
FIG. 24
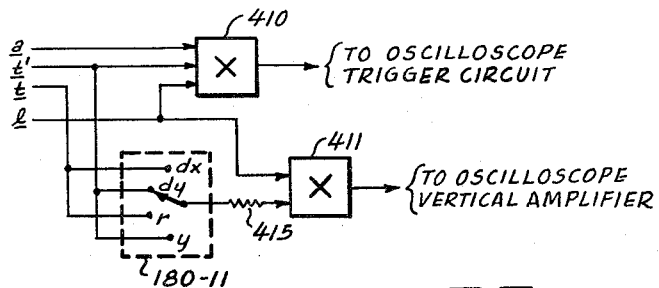
FIG. 25
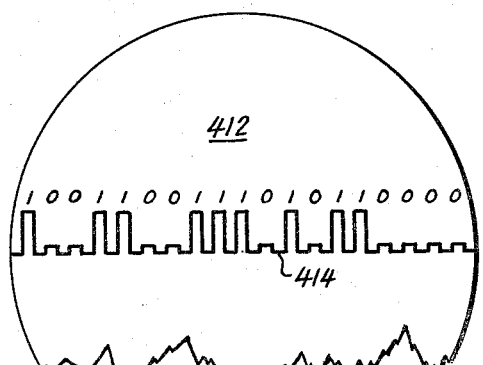
FIG. 26
INVENTOR:
*Floyd G. Steele*
BY
ATTORNEY

United States Patent Office 3,027,078
Patented Mar. 27, 1962

3,027,078
ELECTRONIC DIGITAL DIFFERENTIAL ANALYZER
Floyd G. Steele, La Jolla, Calif., assignor to Digital Control Systems, Inc., La Jolla, Calif., a corporation of California
Filed Oct. 28, 1953, Ser. No. 388,780
66 Claims. (Cl. 235—152)

The present invention relates to an electronic digital differential analyzer, and more particularly to an electronic digital differential analyzer of a greatly simplified design.

Differential analyzers are utilized to obtain approximate solutions of differential equations which may arise, in turn, in the mathematical analysis or simulation of problems encountered in physics, chemistry, engineering, etc., if, for example, a differential equation were written to define the theoretical motion of a physical body with respect to time, it might contain a series of successively higher order derivative terms, all taken with respect to time, and representing velocity, acceleration, etc. Such an equation is of small value until solved, that is, reduced into an algebraic or graphical form of distance only, considered relative to the independent variable time. With this accomplished, an analysis may then be made to determine the actual movement of the body within specific time limits of interests, the results of which may be used to determine the characteristics of the particular system wherein such motion occurs.

All differential equations may be divided into two general classes, linear and non-linear. A linear differential equation is one having only first degree derivative terms, i.e., no squared, cubed, etc., ones, and in which all coefficients of the derivative terms are functions of the independent variable. All differential equations failing to meet these requirements are termed non-linear differential equations.

For example, the equations $$\frac{d^2y}{dx^2}+y=0$$

$$\frac{d^2y}{dx^2}+(\sin x)y=0$$

and $$\frac{d^2y}{dx^2}+(\sin^2 x)y=0$$

are linear while the equations $$\left(\frac{d^2y}{dx^2}\right)^2+y=0$$

and $$\frac{d^2y}{dx^2}+(\sin y)y=0$$

are non-linear differential equations.

In general, all linear differential equations up to the 5th order may be solved using a purely mathematical approach with the solutions appearing as algebraic equations. In the same way, a certain few classes or types of non-linear equations may be solved to obtain pure mathematical solutions in equation form.

In the event a specific differential equation fails to come under one of the classes having a known mathematical solution, other means exist for securing satisfactory approximate solutions thereof, although not in equation form. Thus, any one of a number of well known numerical approximation methods may be employed, each method requiring the use of a set of different equations, the solution being calculated therefrom in a routine step by step manner for consecutive points along the independent variable axis. Each of these numerical approximation methods involves an extremely large number of individual manually performed calculations and, for some of the more complex differential equations upward of several man years of work may be required to secure an approximation over the regions of interest. Naturally, the solution obtained will be useful only if each of its multitudinous component calculations is performed without error.

In addition to these manual methods, machines, termed broadly differential analyzers, have been devised to obtain approximate solutions of both linear and non-linear differential equations. Such machines may be classified into three general types, namely, mechanical, analogue and digital. The mechanical analyzers, of which the Bush and the Bush-Caldwell machines are examples, comprise many excessively large and intricate mechanical components requiring in extreme examples, entire buildings for their housing. The mathematical accuracies of the solutions produced by such machines are determined by the mechanical tolerances held in the construction thereof, and, by maintaining extremely rigorous tolerance limits, an output accuracy of approximately one part in ten thousand has been achieved for the best machines, but then only at an excessive cost.

On the other hand, the analogue differential analyzers, although smaller and less expensive than the mechanical analyzers, produce less accurate approximate solutions owing to the rapid accumulation of error in only a relatively few integrator sections. One cause of this error lies in the fact that the analogue analyzer's most basic integrator circuit is the well known resistor-capacitor one, it being capable, however, of integrating only with respect to time, the independent variable. Thus, in order to solve non-linear equations, it is necessary to depart from this electronic circuit and introduce motor-driven potentiometers for generating appropriate electrical signals representing the non-linear terms. Thus, such analyzers contain electro-mechanical components in addition to pure electronic circuits with resulting accuracies of one part in five-hundred being average for such machines.

The most recent advance in the field of differential analyzers has been that in the electronic digital field. Such digital analyzers may obtain approximate solutions, using an equivalent time scale, of approximately fifty times the accuracy of mechanical analyzers and at the same time are comparable to the analog analyzer in size and expense. The first of such digital analyzers to appear commercially was the "Maddida," the name having been derived from the descriptive phrase "magnetic drum digital differential analyzer." The "Maddida," although possessing a considerable number of advantages over either of the other two types of analyzers, suffers from an undue electronic complexity, it containing, for example, nearly 100 tube envelopes, excluding the power supply, and almost 1,000 crystal diodes. Other digital analyzers appearing commercially since the "Maddida" have been even more complex owing to their operating in a binary coded decimal system and having special input and output devices associated therewith. Since proper operation of such digital computers is dependent upon the continued and uninterrupted operation of each of its individual components, such an excessively large number of components renders the reliability of these prior digital machines relatively low.

The digital analyzer of the present invention alleviates to a great extent the circuit complexity of the "Maddida" type of analyzer; it containing, for example, less than 20 tube envelopes exclusive of the power supply and less than 400 crystal diodes. As a result, it not only has a much higher degree of reliability, but is also of much smaller weight, size and, from the economic standpoint, much cheaper to build and service. Furthermore, the analyzer of the present invention retains the mathematical advantages noted above for the "Maddida" when contrasted with the mechanical and analogue analyzers.

Essentially, the analyzer of the present invention comprises a motor driven magnetic storage drum having three channels thereon, these being the timing channel, the short or $dz$ information channel, and the long information channel. The long channel is divided into twenty sections, corresponding respectively to the number of integrator sections of the analyzer of the present invention, each section of the long channel being subdivided into eighty spaces each capable of storing binary bit information therein in the form of a magnetized cell of one of two directions of polarization. In operation, the first space of each section of the long channel is normally blank, that is contains a magnetized cell of a direction of polarization corresponding to a blank or a zero binary value, while the next 40 spaces contain the magnetized cells representing the $dy$ and $dx$ code bits in alternate or interplexed order. In the final 39 spaces of each section are found the magnetized cells representing the binary bits of the $r$ and $y$ number registers, interplexed in alternate spaces.

The timing signal, derived from the timing channel, is applied to a single stage binary counter which counts, so to speak, odd and even, or first and second timing signal intervals. This single stage counter, in turn, is utilized to distinguish between the $dx$ and $dy$ code spaces and between the $r$ and $y$ number spaces, since each $dy$ space, for example, will appear during a first timing interval with each $dx$ space appearing during a second interval.

The short or $dz$ channel is 40 spaces long and hence will recirculate twice during the appearance of each of the 80 space sections of the long channel. The signal representing the output value from each of the 20 integrator sections is recorded as a magnetized cell in a separate space on the $dz$ channel, the cells lying in alternate spaces thereof which, in turn, appear during a second timing interval as counted by the single stage counter. All except one of the remaining spaces appearing during first intervals are blank, the one recorded space containing a magnetized cell of a direction of polarization opposite to that of the blank, termed the $m$ mark, and serving to distinguish or separate the various integrator section output values recorded on the $dz$ or short channel.

The $m$ mark is normally precessed, that is, is shifted over two spaces relative to the second interval spaces during the first recirculation of appearance of the short channel during the passage of each section of the long channel and is then recirculated without change during the second appearance of the $dz$ channel. As will be seen, this permits the immediate recording of the cell representing the output value of each integrator section in its own particular $dz$ space in the short channel without special delay devices, since the short channel space immediately following the final space of any given long channel section will always correspond to that section.

Five separate operations are required in solving a differential equation by the analyzer of the present invention, these being clear, mark, fill, shift and compute, which, with the exception of the clear operation, are determined by the settings of three front panel switches, designated mark, register and compute. During the clear operation, both long and short channels are completely erased, that is, a continuous stream of magnetized cells representing zero binary values are magnetically recorded thereon. During the mark operation, the $m$ mark is recorded on the short channel and, additionally, a magnetized cell having the same direction of polarization as the $m$ mark and hereinafter referred to as a fiducial or T* mark is placed on the long channel to appear in the normally blank first space of one long channel section.

During the fill operation, the $dy$, $dx$, $r$ and $y$ spaces, hereinafter referred to collectively as registers of the particular section containing the fiducial mark may be separately filled as determined by the operation switch positions, by manually depressing, in a sequence determined by the values to be placed therein, a pair of pushbuttons, termed 1 and 0, representing one and zero binary values, respectively. After each register of the long channel section containing the fiducial mark has been filled, then the fiducial mark may be shifted to another section by rotating a shift knob on the computer's front panel and the registers of that section filled, as previously, by depressions of the 1 and 0 pushbuttons. As should be noted here, this shift knob is associated with a visual indicator having thereon the numbered integrator sections such that at all times, a visual indication is had of the particular section containing the fiducial mark. After each section required for solving a given equation has been properly filled, the compute operation may be initiated and the approximate solution of the equation obtained.

The compute operation is automatically repeated during the passage of each long channel section and comprises a first sub-operation occurring during passage of the interplexed $dy$ and $dx$ registers during which each $dz$ space value corresponding to each $dy$ register space having a magnetized cell representing a one binary value therein is, in effect, counted into a four stage summation $dy$ binary counter, each $dz$ value of one being effective to increase the count by one binary digit value and each $dz$ value of zero being effective to decrease the count by one binary digit value. As will be later demonstrated, the actual operation of the summation $dy$ counter is quite different from conventional counters, the above defined operation being representative of the results only. Also, during passage of the $dy$ and $dx$ registers, each $dz$ value of one corresponding to a magnetized cell in the $dx$ register representing a one binary value is applied to a single stage binary counter which has an initial value of zero. A $dz$ value of zero corresponding to a marked $dx$ code position effects no change in this counter, the final contents of the counter determining later during the same compute operation whether the signal representing the old or new $y$ number of the long channel section being recirculated is subtracted or added, respectively, to the signal representing the $r$ register number.

Then, following a wait sub-operation occurring during passage of any unused portions of the $r$ and $y$ registers, the integrate sub-operation becomes effective with the signal representing the least significant digit of the summation $dy$ counter number being effectively added to the signal representing the least significant $y$ number digit to form a signal representing the new $y$ number least significant digit, which is recorded again on the long channel. Then the signal representing the new or old least significant $y$ number digit is added or subtracted, as determined by the contents of the single stage counter, to the signal representing the least significant $r$ number digit to form the signal representing the least significant digit of the new $r$ number, it being recorded on the long channel just following the magnetized cell representing the new least significant $y$ number digit. Then, the signal representing the next-to-least significant digit of the summation $dy$ count is added to the signal representing the next-to-least significant old $y$ number digit to form the signal representing the next-to-least significant new $y$ number digit with either it or the signal representing the old next-to-least significant $y$ number digit being additionally or subtractively combined with the signal representing the next-to-least significant old $r$ number digit. These alternate operations of the integrate suboperation are continued during passage of the particular long channel section, with the signal representing the carry digit or overflow resulting from the addition or subtraction of the most significant $y$ and $r$ number digits being recorded in the $dz$ channel space corresponding to that section. Upon the next appearance or recirculation of the long channel section, these newly recorded magnetized cells representing the new $y$ and $r$ number digits will form the old $y$ and $r$ number digits for the compute operation taking place at that time.

These three sub-operations constituting a compute cycle of operation are sequentially performed during each long channel section excursion with compute operation continuing until either manually or automatically stopped. If manual stoppage is desired, a halt key may be depressed while an automatic stoppage is brought about whenever the $y$ number represented in a long channel section exceeds in magnitude the capacity of its associated $y$ register. This latter stoppage is required since the magnitude of the $y$ number in each section at any time represents the magnitude of the function to be integrated. Upon overflow of the $y$ register, the $y$ number remaining is in obvious error and by having this overflow stop the computation, the normally ensuing incorrect operation is eliminated.

In addition to a description of the present analyzer and its operation, there is also included a simple read-out technique for use therewith whereby the numerical contents of any particular register may be determined at any time. This enables the operator to obtain the magnitude of the answer at a series of points as the solution is progressively advanced by the operation of the analyzer.

It is, therefore, the principal object of the present invention to provide an electronic digital differential analyzer of a greatly simplified design.

Another object of the present invention is to provide an electronic digital differential analyzer including a rotatable magnetic memory including only a permanently recorded timing signal channel and a pair of recirculating information channels thereon.

Still another object of the present invention is to provide a digital differential analyzer including a cyclical memory channel having all of the $r$ and $y$ information of a plurality of integrator sections endlessly recirculated therethrough.

A further object of the present invention is to provide a differential analyzer including a cyclical memory device having first and second streams of information endlessly recirculated therethrough, the first stream of information including the $r$ and $y$ bits of a series of integrator sections with the second stream being the output bits produced by the series of integrations of the information in the first stream.

A still further object of the present invention is to provide a digital differential analyzer including a rotatable magnetic memory having all of the registers of a plurality of integrator sections serially positioned along a first channel thereof, and having the most recent output bit resulting from each integration recorded along a second channel thereof.

A further object of the present invention is to provide a digital differential analyzer including a rotatable magnetic memory having all of the input information for a plurality of integrator sections serially recorded and endlessly recirculated along a first channel thereof, and having the output bits from the integrations performed in the integrator sections serially recorded and endlessly recirculated along a second channel thereof, a portion of the input information for each of the plurality of integrator sections being derived from the output bits recorded on the second channel.

A still further object of the present invention is to provide a digital differential analyzer including a rotatable magnetic memory drum having a pair of recirculating information channels thereon, wherein the input information for 1st, 2nd, 3rd . . . $n$th integrator sections are serially recorded and recirculated on one of the channels and the output signals of said integrator sections are serially recorded and recirculated on the other of the channels.

Still another object of the present invention is to provide a digital differential analyzer including a rotatable magnetic memory drum having a first channel divided into 1st, 2nd, 3rd . . . $n$th sections, one for each integrator section, each of said sections being $4n$ spaces in length, with the output signals resulting from the integrations in said 1st, 2nd, 3rd . . . $n$th integrator sections being recorded and recirculated in alternate spaces on another channel which is $2n$ spaces in length.

A further object of the present invention is to provide a digital differential analyzer including a magnetic memory device having first and second channels of $4n^2$ and $2n$ spaces, respectively, in length, wherein all of the input information for each of said 1st, 2nd, 3rd . . . $n$th integrator sections are recorded and recirculated on said first channel in $4n$ spaces thereof and wherein the output signals resulting from the integrations in said 1st, 2nd, 3rd . . . $n$th integrator sections are recorded in alternate spaces on said second channel.

Still another object of the present invention is to provide a digital computing device including a cyclical memory storage medium having only two streams of recirculating information for integrating a function $u(v)$ with respect to an independent variable $dv$.

A further object of the present invention is to provide a device including a cyclical memory storage device for integrating a function $u(v)$ with respect to an independent variable $dv$ wherein binary information representing the value of the function $u(v)$ is stored as the consecutive place digits of a first binary number in the memory device and is continually combined with other information stored in the memory device, in accordance with the consecutive values of $dv$.

Another object of the present invention is to provide an electronic digital integrating device having a rotatable magnetic storage means wherein a $y$ signal representing the value of the function to be integrated is stored on the storage means, said $y$ signal being modified at predetermined intervals in accordance with the change of the function which it represents, said $y$ signal being combined at predetermined time intervals with an $r$ signal stored in said storage means to produce a resultant signal representing the result of a mathematical operation upon the numbers representing the result of a mathematical operation upon the numbers represented by the $r$ and $y$ signals, the signal representing the overflow digits from the mathematical operation corresponding to the integral of the function.

A still further object of the present invention is to provide a device for integrating a function $u(v)$ with respect to $dv$, where $du(v, dv)$ appears as an input electrical signal representing a series of negative and positive counts, and $dv$ appears as a series of signals having first and second values representing a series of positive and negative directions of integration, respectively, the device including a cyclical storage means having first and second channels wherein the sum of the counts of the input signal representing $du(v, dv)$ is stored as a first binary signal on the first channel, the device acting in response to the first and second values of each of the $dv$ signals for combining the first binary signal with a second binary signal stored on the first channel for either adding or subtracting, respectively, the first number and the second number represented by said signals and storing a signal representing the most recent carry digit produced by each addition or subtraction on the second channel whereby the series of consecutively stored signals representing the carry digits also represents $u(v)dv$.

Another object of the present invention is to provide a digital differential analyzer having all of the input information of a series of integrator sections recirculating around a corresponding series of sections of a first information channel on a magnetic memory drum, only one of said channel sections containing a fiducial mark, the particular section containing the fiducial mark being visually indicated.

Another object of the present invention is to provide a digital differential analyzer having first and second memory channel of $2n$ and $4n^2$ binary digit spaces in length, respectively, wherein, after erasure of the first and second channels, a mark is recorded in one space of the first channel and a second mark in one space on the second channel, and the input information for an integrator section is recorded in the first $(4n-1)$ spaces following the second mark on the second channel.

Still another object of the present invention is to provide a digital differential analyzer including at least one recirculating memory channel having a series of sections and having the input information for a corresponding series of integrator sections recorded thereon, the first space in each except one of the sections of said channel being normally blank with the one section having a signal representing a binary one value recorded in its first space, the signal recorded in the first space of the one section being selectively transferrable to any of the other sections for readout or fill purposes.

A further object of the present invention is to provide an electronic digital computing device having a plurality of operations, each of the operations having a series of automatically sequentially performed sub-operations.

Still another object of the present invention is to provide a digital computing device having a plurality of manually selectable major operations, each of the major operations comprising, in turn, a series of sequentially performed sub-operations, each of the sub-operations being automatically initiated from the previous sub-operation.

A further object of the present invention is to provide an electronic digital computing device having a plurality of manually selectable operations, each of said operations, upon being initiated, comprising a series of sequentially performed sub-operations, each of the sub-operations being ordered by the conduction state sequence of a series of programming flip-flops, the conduction state sequence being changed at the conclusion of each sub-operation to produce the next sub-operation.

A still further object of the present invention is to provide an electronic digital computer device including a pair of recirculating information channels on a rotating magnetic memory, and being capable of performing a plurality of operations, wherein each of the operations includes a plurality of sequentially performed sub-operations, the change of each sub-operation into the next being automatically provided by predetermined data occurrences in the recirculating information channels.

A further object of the present invention is to provide an electronic digital computing device having a series of programming flip-flops wherein the conduction state sequence of the programming flip-flops determines at any time the operation performed by the device.

Another object of the present invention is to provide an electronic digital computing device having at least one major operation which comprises, in turn, a series of sequentially performed sub-operations wherein each of the sub-operations determines the computational manipulations performed on the recirculating information contained in an associated memory device.

Other objects and features of the present invention will be readily apparent to those skilled in the art from the following specification and appended drawings wherein is illustrated a preferred form of the invention, and in which:

FIGURES 1 and 2 are block schematic representations of a typical integrator section within the differential analyzer according to the present invention;

FIGURE 3 illustrates the interconnections between a group of integrator sections for solving a specified differential equation;

FIGURE 4 illustrates the magnetic memory unit in perspective view and associated computer unit in schematic form of the analyzer according to the present invention;

FIGURE 5 is a circuit diagram of the timing signal source;

FIGURE 6 is a group of signal waveforms illustrating the principles involved in the operation of the circuit of FIGURE 5;

FIGURE 7 is the circuit diagram of a typical "writing" unit;

FIGURE 8 is a group of signal waveforms appearing in the circuit of FIGURE 7;

FIGURE 9 is the circuit diagram of a typical "reading" unit;

FIGURE 10 is a group of signal waveforms appearing in the circuit of FIGURE 9;

FIGURE 11 is a schematic representation of the front panel switching and associated computer flip-flops of the analyzer according to the present invention;

FIGURE 12 is a partly perspective and partly electrical schematic representation of a portion of one of the front panel switches of FIGURE 11;

FIGURE 13 is an electrical schematic representation of one of the front panel pushbuttons of FIGURE 11;

FIGURES 14 through 18 are schematic presentations of the diode gating network associated with the various computer flip-flops;

FIGURE 19 illustrates the information arrangements on the three magnetic memory channels;

FIGURE 20 illustrates the information placement within a typical integrator section according to the present invention in association with the information on the timing and short channels;

FIGURE 21 is a flow diagram illustrating the flip-flop conduction state sequences and sub-operations performed during each of the major operations of the analyzer according to the present invention;

FIGURE 22 illustrates the informational flow pattern occurring during portions of a fill $dy$ operation on both of the memory information channels;

FIGURE 23 is a view, partly in perspective, of the indicator mechanism on the front panel;

FIGURE 24 illustrates the informational flow pattern occurring during portions of a short channel precession operation;

FIGURE 25 is a schematic representation of the gating network utilized for deriving output data from the analyzer of the present invention; and FIGURE 26 is the face of an oscilloscope showing the visual representation of output data produced by the circuitry of FIGURE 25.

(1) COMPUTATIONAL THEORY

Figure 16:
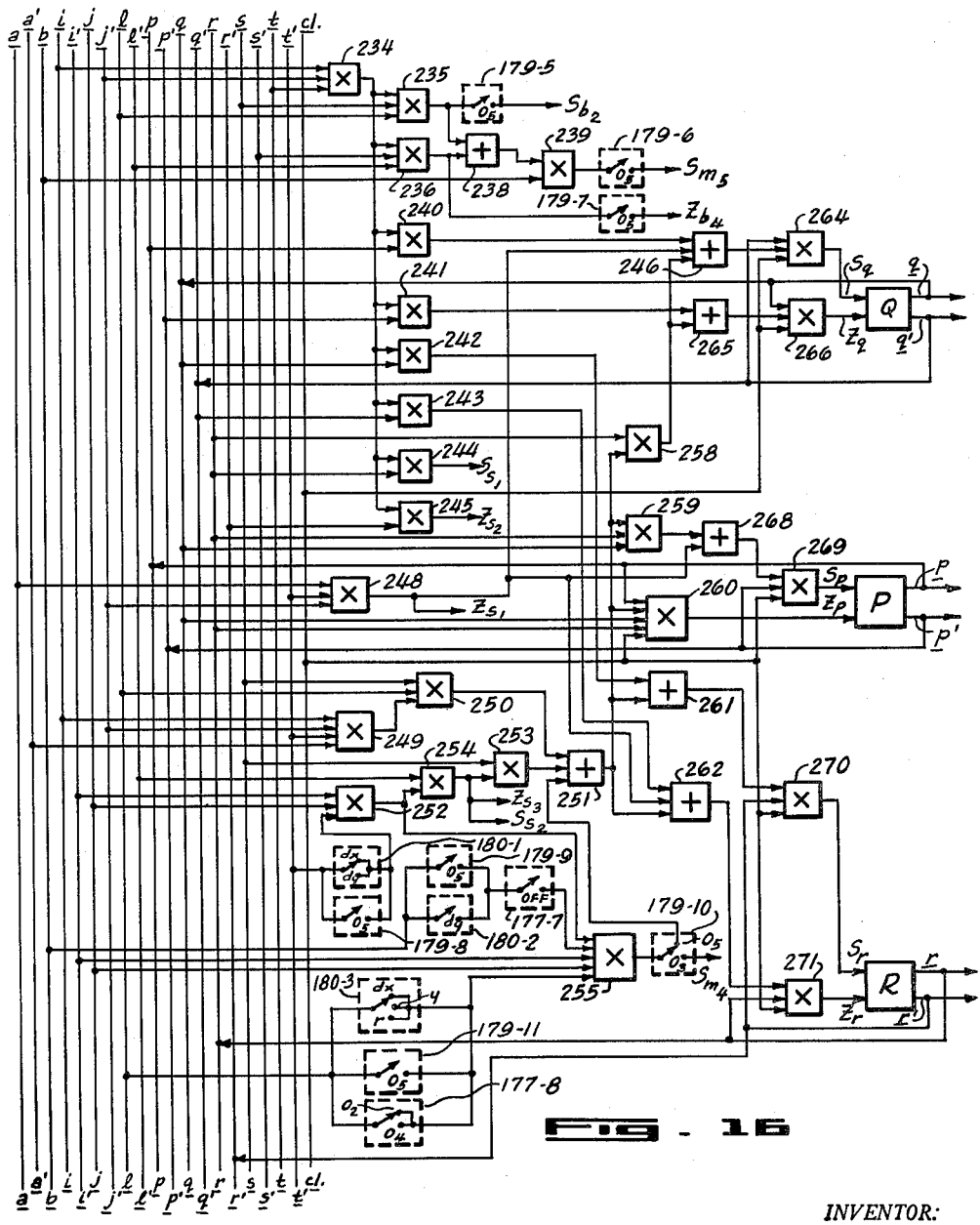

Referring now to the drawings, there is illustrated in FIGURE 1, a typical integrator section 29 which forms the basic unit of the analyzer of the present invention, it being here shown for the purpose of example only, in a block diagrammatic form. Integrator section 29 includes a counting register 30 for storing a series of electrical signals representing a $y$ number, an accumulating register 31 for storing a series of electrical signals representing an $r$ number, and finally a transfer medium 32 operable in response to an electrical signal representing each input $dx$ value for ordering the additive transfer of a series of electrical signals representing a function of the $y$ number in register 30 to the series of signals in accumulating register 31 but without changing the signals stored in register 30. Registers 30 and 31 contain an identical number of stages, 19 in the present invention, with the $y$ number represented by the signals in register 30 being continuously increased or decreased in magnitude, as by counting, in accordance with an electrical signal representing a $dy$ input. The series of overflow or carry digits produced by the series of $dx$ ordered additive transfers from the most significant digit stage of accumulating register 31 are represented by a $dz$ output signal from register 31.

Considered now in broad mathematical terms, and referring to FIG. 2, if the $dy$ input count is made to represent the differential of a function of a dependent variable $u$, or equationwise, if $dy=du(v, dv)$ then the count represented by the signals accumulated in the $y$ register at any time is equal to the integral of this function's differential, or $u(v)$.

In the same way, if the information applied to the $dx$ input represents the differential $dv$ of an independent variable $v$, then the number represented by the signals in the $r$ register prior to the first carry or overflow digit signal $dz$ represents the integral with respect to $dv$ of the function $u(v)$ stored in the $y$ register or the integral of $u(v)dv$. However, since the overflow values constituting $dz$ are utilized and not the $r$ number in the register 31, these $dz$ overflow digit signals represent or correspond to the differential of the integral stored in the $r$ register, or merely $u(v)dv$. As will be noted, the output expression $u(v)dv$ may be either positive or negative in accordance with the sign desired therefor, the method for selectively determining the sign being later presented in more detail.

Turning now to mathematical derivation of the specific integration process performed by typical integrator section 29, it is first necessary to note that the analyzer of the present invention operates on binary numbers less than one and that the most significant place digit represented in counting register 30 designates the sign of the $y$ number, the values of one and zero particularly designating positive and negative $y$ number values, respectively. The binal point is assumed to exist immediately following this most significant or sign digit with the contents of the $y$ or counting register immediately following the $i$th $dy$ input signal being expressible by:

$$(1+y_i) \quad \text{(Equation 1)}$$

From the above, it will be immediately noted that negative numbers are represented in the $y$ register as the one's complement of the $y_i$ absolute magnitude.

The input values represented by the $dx$ signals may be either positive or negative in value in accordance with the above noted independent variable $dv$ values, with transfer medium 32 responding to each signal representing a positive $dx$ value for adding:

$$w_i = \tfrac{1}{2}(1+y_i) \quad \text{(Equation 2)}$$

to the number represented in $r$ register 31. The term "$\tfrac{1}{2}$" occurs in Equation 2 since the binal point is assumed to exist in the $r$ register immediately to the left of the most significant digit represented therein and hence each of its digits is of one-half the binary value of each of the corresponding $y$ number digits, a further assumption being that the $y$ number is to be added, digit by digit, to the corresponding $r$ number digits. Also, for signals representing negative $dx$ values, transfer medium 32 acts to additively transfer the 2's complement of the number represented in the $y$ register, as exemplified by Equation 1, to the number represented in the $r$ register. This may be represented by:

$$w_i = \tfrac{1}{2}[2-(1+y_i)] = \tfrac{1}{2}(1-y_i) \quad \text{(Equation 3)}$$

From Equations 2 and 3 it is seen that the general transfer expression for both positive and negative $dx$ value may be written as:

$$w_i = \tfrac{1}{2}(1+y_i dx_i) \quad \text{(Equation 4)}$$

where $dx_i$ may equal either $+1$ or $-1$.

No description is given at this time of the specific manner in which the above mathematical operations are accomplished by an integrator section, it being set forth merely for showing that if such is done, then an approximate integration is effected thereby.

The value of the $dz$ carry digit signal at the $i$th interval may be expressed by:

$$dz_i + R_i = R_{i-1} + w_i \quad \text{(Equation 5)}$$

where $R_i$ represents the contents of the $r$ register following the transfer of the $y$ number and $R_{i-1}$ represents the $r$ register contents just prior to the transfer.

Although the series of carry digit signals forming the $dz$ output will each be of either one or zero value, mathematically, each zero value is treated as a $-1$ value and the following expression may be written for this mathematical assumption:

$$du_i = 2dz_i - 1 \quad \text{(Equation 6)}$$

From the above, it is readily seen that when $dz_i$ equals zero, then $du_i$ will correspond to a $-1$ as desired.

Considering now, Equations 5 and 6, the following relationship may be written:

$$\sum_{i=1}^{n} du_i = 2\sum_{i=1}^{n} dz_i - n$$

$$= 2\sum_{i=1}^{n} w_i + 2(Ro - Rn) - n \quad \text{(Equation 7)}$$

$$= 2\left[\frac{n}{2} + \tfrac{1}{2}\sum_{i=1}^{n} y_i dx_i\right] + 2(Ro - Rn) - n$$

$$= \sum_{i=1}^{n} y_i dx_i + 2(Ro - Rn)$$

It is seen then that the sum of the $du$'s will approximate the first term of Equation 7 leaving an error of $2(Ro - Rn)$.

Now, since the first term $$\sum_{i=1}^{n} y_i dx_i$$

of Equation 7 corresponds to an approximation of the expression:

$$\int_0^{x_n} y\, dx$$

where $$x_n = \sum_{i=1}^{n} dx_i \quad \text{(Equation 8)}$$

it is seen that if the above described operations are performed by an integrator, then such operations produce an approximate integration, recalling that the output $dz$ values are treated as $+1$ and $-1$ magnitudes.

It should here be noted that the operation of the present analyzer does not correspond in exact detail to the mathematical derivation set forth broadly above, its operation actually being, in practice, more accurate. The difference comes about in that either $(1+y_i)$ or $(1+y_{i-1})$ is available for combination with the $r$ number at the end of the $i$th interval and the machine operates to add $(1+y_i)$ and subtract $(1+y_{i-1})$ to the $r$ number in response to positive and negative $dv$ values, respectively. The reason for this lies in the fact that, recalling that the consecutive $y$ number values represent consecutive values of the function $u(v)$, if the function should double back on itself, as caused by a negative $dv$ value, along the independent variable axis then, upon each doubling back, the final $y$ number value or $(1+y_{i-1})$ prior to the direction switch, should be subtracted after the switch in order that the curve represented by the consecutive $y$ number points be retraced exactly without accumulation of end point errors. The precise mathematical derivation of this operational feature leads to a much greater complexity than the more general treatment given above and for this reason is not here included.

The approximate solution of a specified differential equation may be obtained by properly interconnecting a group of integrator sections of the type illustrated in FIGURES 1 and 2 assuming, of course, that the initial conditions have been properly inserted therein as magnitudes of $r$ and $y$ numbers. By way of example, there is illustrated in FIGURE 3 the interconnections necessary between several of such integrator sections for specifically solving the equation:

$$\frac{d^2u}{dv^2}+\sin u\frac{du}{dv}=u=0 \quad \text{(Equation 9)}$$

with initial conditions of $u(0)=0$, and $u'(0)=1$.

The first step in determining the necessary number of, and interconnections between various integrator sections is to rewrite differential Equation 9 as a difference equation of the form:

$$d\left(\frac{du}{dv}\right)=-\sin udu-udv \quad \text{(Equation 10)}$$

Recalling that, from FIGURE 2, a $du$ input accumulates in a $y$ register as $u(v)$, it is apparent if $$d\left(\frac{du}{dv}\right)$$

were applied as a $dy$ input to an integrator section, the $y$ register contents thereof would represent $$\frac{du}{dv}$$

However, from Equation 9, it is seen that $$d\left(\frac{du}{dv}\right) \text{ equals} -\sin udu-udv$$

and hence if $-\sin udu-udv$ were applied instead as the $dy$ input, the $y$ register contents thereof would correspond to $$\frac{du}{dv}$$

and the solution of the equation, that is, $u$, could be readily accumulated as the $y$ number in another integrator section. Accordingly, referring to FIGURE 3, an integrator section 34 therein has applied to its $dy$ input, information representing the equation $-\sin udu-udv$, which, in turn, is generated, in a manner to be shortly seen, by other integrator sections.

By applying a $dv$ function to the $dx$ input of section 34, the $dz$ output values generated thereby correspond to $du$ which, in turn, is applied to the $dy$ input of another integrator section 35. This $dv$ input function, representing the independent variable, is generated by the integrator section 36 and comprises, for this example, a series of consecutive plus one values ordering the $y$ register contents continually added to the $r$ register contents. The manner in which section 36 produces these consecutive output plus one values will be set forth later in the present disclosure.

The contents accumulated in the $y$ register of section 35 thus represents $u$, the approximate solution of the equation. Since one of the terms in the equation of the $dy$ input to section 34 is $-udv$, section 35 may be made further use of, in this example, by applying both the $dv$ function from section 36 and, further, a sign reversing input, here designated $(-)$, as generated on the $dz$ output of an integrator section 37. The manner of generating this sign reversing function as well as the meaning thereof will be described later in the present disclosure. Thus, with both $dv$ and $(-)$ applied as the $dx$ inputs to integrator section 35, its output generated function will be $-udv$ which, in turn, is applied as one of the input functions to the $dy$ input of the first noted integrator section 34.

The remaining function to be generated is $-\sin udv$ which is accomplished by a pair of integrator sections 39 and 40. First of all, recalling that $d(\sin u)=\cos udu$, if $\cos udu$, neglecting for the moment how such a function is generated, were applied to the $dy$ input of section 39 then $\sin u$ would be accumulated in the $y$ register thereof. Now, if the $du$ output function of the section 34 is applied to the $dx$ input of section 39, along with the $(-)$ function generated by section 37, the $dz$ output values thereof would be $-\sin udu$ which, in turn, comprises the remaining required input function for the $dy$ input of section 34.

The remaining input function needed for section 39 is $\cos udu$ which is obtained by recognizing that $$d(\cos u)=-\sin udu$$

and applying the $dz$ output of section 39 or $-\sin udu$ to the $dy$ input of an integrator section 40 and the $du$ function from section 34 to the $dx$ input thereof. The $dz$ output values of section 40 thus represent $\cos udu$ which are applied to the $dy$ input conductor of section 39, thus completing the required interconnections.

From the description of operation of sections 39 and 40, it is seen that both sine and cosine functions may be continuously generated by proper interconnections therebetween. It is, of course, necessary to place a proper initial relationship between the two functions in the respective $y$ registers which may be readily accomplished by, for example, having one $y$ number equal to one with the other $y$ number equal to zero.

(2) MAGNETIC MEMORY DRUM AND CIRCUITRY

In the discussion thus far presented in connection with FIGURES 1, 2 and 3, each integrator section has been viewed as a separate entity and was accordingly represented by a separate block diagram. In actual practice, however, the analyzer of the present invention has no individual units which constitute an integrator section as a separate and distinct physical entity, as in the case in mechanical and electronic analog differential analyzers. Instead, all of the information required in the integrator section of FIG. 1 or FIG. 2 is stored on a cyclical storage device, while all of the arithmetic and control operations and suboperations to be performed on the information are effected by electrical signals from a plurality of gating circuits which, in turn, receive their control signals from a plurality of mechanical and electronic control switches. In particular, according to a preferred embodiment of the analyzer of the present invention, the cyclical storage device is a rotatable magnetic drum having a long information channel and a short information channel. The long channel is divided into a number of sections, corresponding to the number of integrator sections of the analyzer, each section being capable of storing all of the information of the $y$ and $r$ registers of FIG. 1 plus all of the code information necessary to identify the $dx$ and $dy$ information, as set forth in greater detail below. The short channel stores the most recent $dz$ output information from all of the integrator sections of the analyzer and has a bit capacity at least equal to the number of integrator sections.

The information on both channels, considered now in general terms, takes the form of a series of magnetized cells on the surface of the drum representing binary digit values, each value being represented by the direction of orientation or polarization of the magnetic particles constituting the cells. Upon rotation of the drum, considering for the moment either channel, these magnetic particle orientations of each cell, in passing a "read" point, are transformed by suitable transducers and electronic circuitry into a corresponding electrical signal whose potential magnitudes represent the magnetically recorded values originally producing them at the "read" point. As defined, the cell representing a recorded binary one value will produce a relatively high potential magnitude in this electrical signal with a recorded zero value producing a relatively low potential magnitude.

These serially appearing electrical signals from the "read" point are then acted on by the computer in accordance with the particular type of operation being performed at that time with each signal magnitude either being changed into the other magnitude or remaining the same as determined by the mathematical result or answer of the operation. Then, these serially appearing answer signals are applied by an appropriate transducer and circuitry to a "write" point adjacent the same channel to be magnetically recorded thereon, again as the magnetized cells previously defined. This newly recorded information is then, owing to the rotation of the drum, delayed in time until it reappears at the "read" point with subsequent transformation into signal form, computational operation thereon, and re-recording on the channel.

The amount of delay afforded each binary bit of the information on a channel is determined by the length of its associated channel and angular velocity of the drum, each channel length being determined, in turn, by the arcuate spacing between the "read" and "write" points measured around the drum's periphery. Also, the total information found on each channel will make one complete excursion each instance the drum's surface moves a distance corresponding to the spacing between its corresponding "read" and "write" points. In addition, since the drum will, in practice, be continuously rotated, the information on the two channels will be endlessly recirculated and each bit thereof be made available time and time again for individual computational operations.

In addition to the above noted long and short memory channels in the present analyzer, there is permanently recorded on another or third channel extending completely around the drum, timing information which is represented by a repetitive alternate alignment pattern of the drum's magnetic particles. By sensing this timing information at a "read" point with an appropriate transducer and electronic circuitry, a corresponding timing or clocking signal is produced, it being of an endlessly repetitive nature, similar to its corresponding magnetic pattern, and serving two basic and fundamental functions in the operation of the analyzer.

First of all, the timing signal is employed as a measuring function or time scale for the information recording operation on the two recirculating channels by timing the recording of each bit thereon and hence alloting thereto a discrete channel space. This serves to eliminate any possible scrambling or intermingling between consecutive pairs of such bits with the result that all binary bits thus recorded will be distinctly recognizable upon appearing at the "read" points.

Also, the clocking signal provides for synchronous and time related operations between all of the electronic switches included in the present analyzer and additionally produces, as will become obvious later, the serial transfer, if called for, of the digit contents represented by the conduction state of one electronic switch into another similar switch.

Turning now to the specific magnetic memory arrangement employed in the present analyzer, there is illustrated in FIGURE 4, a magnetic memory unit 42 shown in conjunction with a computer unit 43, here illustrated in block schematic form, units 42 and 43 forming the two basic components of the present analyzer. Memory unit 42 includes a source of driving energy, such as an electric motor 45, preferably of an alternating-current synchronous type, driving a cylindrically shaped memory wheel or drum 46 in the designated counter clockwise direction of rotation at an angular velocity of, for example, 1800 revolutions per minute. Drum 46 is preferably formed of plastic or other non-magnetic material and includes a thin coating 48 of magnetic iron oxide extending around its outer edge or periphery. A stationary circular mounting ring 49, having a greater diameter than that of drum 46, is positioned between motor 45 and the drum and serves as a mounting support for various transducer elements to be shortly described.

A plurality of magnetic transducer mounting brackets, are secured to mounting ring 49 and contain appropriately sized openings for mounting associated magnetic heads, the combined brackets and heads functioning as "read," "write" and "erase" units. Particularly, a "read" unit 52 and a "write" unit 53 are mounted in circumferential alignment around drum 46 to sense and record data, respectively, on the long information channel 54 while a "read" unit 56 and a "write" unit 57 are positioned relative to drum 46 so as to sense and record data, respectively, on the short information channel 58. An "erase" unit 60 is also illustrated, it including a pair of permanent magnets aligned adjacent tracks 54 and 58 so as to erase the information previously recorded thereon by "write" units 53 and 57, the erasure taking the form of orientating the magnetic particles of tracks 54 and 58 in a direction parallel to the direction of their movement to correspond to a continuous series of binary zero digit values.

Finally, a "read" unit 61 is illustrated, it serving to sense the permanently recorded timing data on a timing track 62, likewise circumferentially recorded around drum 46. Additional details of the "read," "write" and "erase" units will be found later in connection with the description of certain electronic circuitry associated therewith. As is also indicated, "read" units 52 and 56, and 61 deliver their output signals to computer unit 43 while "write" units 53 and 57 receive input signals from unit 43.

Computer unit 43 includes appropriate electronic circuitry for both converting the magnetic information sensed by the "read" units from the long, short and timing signal channels into the before mentioned electrical signals and for supplying electrical signals representing output computational information to the "write" units for their subsequent recordment on the respective short and long channels to complete the recirculation process.

Considering first the electronic circuitry associated with the timing "read" unit 61, reference is made to FIGURE 5 wherein unit 61 is shown to include a magnetizable core 66, preferably of ferrite material, of a horseshoe or C-shaped configuration and having a coil 67 wound thereon. The narrow air gap between the core pole faces is positioned perpendicularly to the travel of channel 62 with one end of coil 67 being capacitively coupled to the grid of a first triode 70, within an amplifier unit 69, the other end of the winding being connected to ground. A grid resistor is coupled between the grid of triode 70 and ground, it being of a sufficiently high value to furnish a suitable contact potential for linear operation of the triode. The cathode of triode 70 is grounded while its anode is coupled through a conventional plate resistor to the terminal $E_1$ of a source of, for example, 250 volts positive potential, the source not here being illustrated.

The anode of triode 70 is capacitively coupled to the grid of a second triode 75, also within amplifier 69, the grid of triode 75 being connected through a conventional grid resistor to the junction point between a pair of resistors 72 and 73, in turn, serially connected between a terminal $E_2$ of a source of, for example, 350 volts negative potential, and ground. The anode of this second triode is connected through a conventional plate resistor to terminal $E_1$, with the output signal of the amplifier unit being capacitively coupled from the anode of triode 75 to the input terminal of an unistable or one-shot multivibrator circuit 78.

In particular, the input terminal of circuit 78 is coupled through a resistor 79 to a terminal $E_5$ of a source of, for example, 5 volts positive potential, and is additionally coupled through the anode to cathode of a diode 80 to the grid of a first triode 82. The cathode of triode 82 is grounded, the anode thereof being coupled through a plate resistor to terminal $E_1$ and through a pair of diodes 83 and 84 to the terminals $E_4$ and $E_3$, respectively, of a pair of clamping potential sources producing substantially constant positive output voltages of, for example, 140 and 100 volts, respectively. The magnitudes of these terminal $E_3$ and $E_4$ potentials are extensively referred to, hereinafterwards, as low and high voltage levels, respectively.

This triode 82 anode is also coupled through a coupling capacitor 86 to the grid of a second triode 88, the grid thereof being also connected through a variable resistor 92 to terminal $E_1$. The cathode of triode 88 is grounded and its anode is both coupled through a plate resistor to terminal $E_1$ and through a paralleled resistor 89 and capacitor 90 to the grid of triode 82 and from there through a resistor 91 to terminal $E_2$. Finally, its anode is connected through diodes 93 and 94, to the pair of clamping potential terminals $E_4$ and $E_3$, respectively.

The output signals of circuit 78 appear on the anodes of triodes 82 and 88, respectively, the output signal of triode 82 being applied to the $C_{c1}$ input conductor of an electronic switching device, or bistable multivibrator circuit, such as flip-flop C1. This $S_{c1}$ conductor is, within flip-flop C1, coupled through a capacitor 97 and diode 98 to the grid of a first triode 100. The other output signal of circuit 78 is applied to the $Z_{c1}$ input conductor of flip-flop C1 which, in turn, is coupled serially through a capacitor and diode, corresponding to capacitor 97 and diode 98, respectively, to the grid of a second triode 102. The common junction between capacitor 97 and diode 98 is coupled through a resistor to terminal $E_5$ as is the common junction between the capacitor and diode within the grid circuit of triode 102.

The grids of triodes 100 and 102 are coupled through a pair of grid resistors to terminal $E_2$ while their anodes are coupled through a pair of plate resistors to the $E_1$ terminal. Both anodes are likewise clamped as previously described for circuit 78 by appropriate diodes connected to the $E_3$ and $E_4$ terminals. In addition, the anode of triode 100 is coupled through a paralleled resistor-capacitor combination 104 to the grid of triode 102 while the anode of triode 102 is coupled through a paralleled resistor-capacitor combination 105 to the grid of triode 100. Finally, the output signal $cl$ of flip-flop C1 is derived from the anode of triode 100 while its so-called complementary output signal, designated $cl'$ is taken from the anode of triode 102.

For explaining the operation of this timing "read" circuit, reference is made to FIGURE 6 wherein is set forth a group of signal waveforms appearing at various points in the circuit. First illustrated, in a schematic manner, is the permanent magnetization pattern on timing signal channel 62, the pattern comprising an endless series of substantially equally lengthened magnetized areas or cells, the magnetic oxide particles in consecutive areas being orientated in alternate directions parallel to the direction of track travel. Upon passage of channel 62 beneath the pole faces of core 66, alternate positive and negative pulses are produced across coil 67, the two polarities corresponding to the two changes of direction of the flux pattern. These pulses of alternate positive and negative polarity are illustrated by the signal waveform, generally designated 107, and after amplification by triode 70, appear as negative and positive pulses, respectively, on its anode.

Resistors 72 and 73, coupled between ground and terminal $E_2$, serve as a voltage dividing network to apply a negative bias of such magnitude to the triode 75 grid to operate the tube within its linear operating region. Thus, the positive and negative pulses appearing on the anode of triode 70 are amplified by triode 75 to appear as corresponding output negative and positive pulses, respectively, as exemplified in the signal waveform designated 108 in FIGURE 6.

Considering now for the moment, multivibrator 78, the grid current drawn through variable resistor 92 from triode 88 establishes a zero valued grid potential with a normal full conduction status resulting therefrom. With triode 88 fully conducting, its anode potential is determined by the 100 volt clamping potential appearing on terminal $E_3$ and, with this magnitude of potential appearing on the anode, the relative values of resistors 89 and 91 are such as to apply a sufficiently negative bias to the grid of triode 82 that it assumes a cut off condition with its anode potential being that on terminal $E_4$, or 140 volts.

Now, each positive pulse appearing on the anode of triode 75 is capacitively coupled through diode 80 to the grid of triode 82 resulting in a rise of its grid potential and flow of plate current. This, in turn, causes a reduction of its anode voltage which, when coupled through capacitor 86 to the grid of triode 88 results in a reduction of its normal full anode current flow and increase of its anode potential. This increase in potential is, in turn, coupled by way of resistor 89 and capacitor 90 to the grid of triode 82 which, in turn, raises its grid potential still further with a subsequent decrease of its anode voltage.

This interaction between the two triode circuits continues in a substantially instantaneous manner until their normal conduction states have been reversed with triode 82 fully conducting and triode 88 non-conducting, their respective anode potentials being regulated by the $E_3$ and $E_4$ terminal clamping voltages, respectively. These conduction states are maintained until the negative charge accumulated on capacitor 86 during the triggering operation gradually leaks off through resistor 92 and the triode 88 grid potential is raised by the positive potential on terminal $E_1$ above cut off and triode 88 begins to again draw current. This, in turn, causes a reversal of the previously described action in that the current drawn through triode 88 causes a decrease in its anode potential, which when coupled to the grid of the then fully conducting triode 82 causes a reduction in its anode current and rise in its anode voltage. This interaction continues, again in a substantially instantaneous manner, until the conduction states of the two triodes are once more back to their first described or normal condition.

The time that the reversed conduction states takes place is determined primarily by the relative values of capacitor 86 and variable resistor 92 which, in turn, are preferably adjusted such that the reversed conduction state takes place for substantially the interval of time that each magnetically aligned area of track 62, producing an initial positive pulse, is passing beneath head 61. Thus, in FIGURE 6, the waveform generally designated 109 is that appearing on the triode 82 anode with the signal appearing on the triode 88 anode being designated by the waveform designated 110. It is seen, in accordance with the above explanation, that waveforms 109 and 110 are complementary with respect to each other, that is, when the first is at the clamped high potential level, the second will be at the low clamping level, and, alternately, when the first is low, the second will be high.

Considering now the operation of flip-flop C1, signal 109 is applied across capacitor 97 and resistor 99, the two acting as a differentiating circuit to produce positive and negative going pulses for each change of signal 109 in the positive and negative directions, respectively. Since diode 98, owing to the direction of its connection, will effectively block all positive pulses, only the negative pulses will be conducted therethrough to appear as a voltage drop across the triode 100 grid resistor. These negative pulses, as they appear at the grid of triode 100, are illustrated by the signal waveform, generally designated 111 in FIGURE 6.

In the same way, the grid input circuit to triode 102 serves to differentiate signal 110 with only the resultant negative pulses thereof appearing on the grid of triode 102, the grid input signal being represented in FIGURE 6 as the signal waveform designated at 112.

If triode 100 of flip-flop C1 is initially assumed fully conducting with its output $cl$ signal being accordingly at the $E_3$ or low voltage level, then the next negative pulse appearing in signal 111 will lower its grid potential causing a decrease in its plate current flow and an increase in its anode potential. This rise in potential is coupled by way of resistor and capacitor combination 104 to the grid of the then cut-off triode 102. This rise in triode 102 grid potential causes an increase in its anode current with a corresponding decrease in its anode potential which, in being coupled back to the grid of triode 100 by way of capacitor-resistor combination 105, tends to reduce further the triode 100 grid voltage and hence increase its plate potential. This interaction between the two triode circuits continues until their two conduction states are reversed with output signals $cl$ and $cl'$ being at the high and low voltage levels, respectively.

The next signal received by flip-flop C1 will be the negative pulse in signal 112 which in being applied to the grid of the then conducting triode 102 causes the reverse action as above described to take place with triodes 102 and 100 returning to their non-conducting and conducting states, respectively, as exemplified by low and high levels in signals $cl'$ and $cl$. The remaining portions of signals $cl$ and $cl'$ as illustrated may be readily understood from the above description.

It will be observed that signals $cl$ and $cl'$ are complementary with respect to each other and resemble in shape, curves 109 and 110, respectively, from which they were initially derived. It should here be noted that each adjacent low and high voltage level in the $cl$ signal measures or indicates by its time duration, as defined, a single timing interval with the duration of such timing intervals, assuming a constant drum velocity, being determined by the lengths of the permanent magnetic areas on track 62 producing the consecutive negative pulses in signal 107.

From the foregoing, it is seen that $S_{c1}$ input conductor, representing "set flip-flop C1" signifies that any negative triggering pulse applied thereon will produce a high or binary one value in output signal $cl$, signal $cl'$ having a binary value zero. On the other hand, each negative pulse applied to the $Z_{c1}$ conductor, representing "zero flip-flop C1," will cause signal $cl'$ to, in the manner described, rise to its high voltage level or binary one value with signal $cl$ being at its low or zero value.

As mentioned previously, the duration of each high voltage level in signal 109 is controlled by the relative values of variable resistor 92 and capacitor 86. Generally speaking, it is considered most desirable to adjust resistor 92 such that signals 109 and 110, and hence signals $cl$ and $cl'$, are substantially symmetrical with each adjacent high and low voltage level therein appearing for substantially the same time duration. This circuit flexibility is desirable since, in some instances where the lead and circuit capacitance present in the diode gating network, to be later described, is of a substantial magnitude, a relatively longer high voltage level in each signal $cl$ timing interval may be required in order to furnish sufficient rise time in the various gating circuits. On the other hand, since the binary digit information on both short and long channels should be "read" or picked up, as will be later explained in more detail, during the appearance of the low level in signal $cl$, it is also desirable to make the low voltage level in each timing interval appear for as long as possible to provide reliable memory recirculation. It is accordingly seen that, by having this means of controlling the relative high and low voltage level durations in the consecutive signal $cl$ timing intervals, an adjustment may be made such that, for any given application, reliable gating network and memory operation may be simultaneously achieved.

Other flip-flops, to be later described, are found in the computer of the present invention, each of which may be structurally similar to flip-flop C1, here set forth in detailed form. For the purposes of simplicity, however, these remaining flip-flops when they appear, will be set forth in a block diagrammatic manner with their input and output conductors being designated in accordance with the standard herein established for flip-flop C1. By way of review then, any negative triggering signal applied to the "set" input conductor of a flip-flop will produce binary one and zero values in the flip-flop's unprimed and primed output signals, respectively, while a triggering signal applied to the "zero" terminal thereof will produce zero and one binary values in its unprimed and primed output signals, respectively. Also, each pair of flip-flop complementary output signals is given the same alphabetical designation as is its corresponding flip-flop but in lower case letters for the purposes of distinction.

The electronic circuits within computer unit 43 associated with record or "write" units 53 and 57 are structurally similar, only one of which is, by way of example, illustrated and described. Thus, in FIGURE 7 is illustrated a recording circuit 115 associated with "write" unit 57, the binary information to be recorded thereby on short channel 58 appearing as the output signal $c$ conduction levels of an electronic switch, such as flip-flop C, to be later mentioned in more detail. Circuit 115 includes a triode 117, the grid thereof being coupled through a capacitor 118 to the signal $c$ output terminal of flip-flop C with its grid resistor 121, shunted by a diode 120, being connected to the movable arm of a potentiometer 122 connected, in turn, between ground and the terminal $E_2$. The cathode of triode 117 is grounded and the anode thereof is connected through a resistor 123 to one end of a coil or winding 124 wound around an iron core 125, core 125 forming with winding 124, the essential portions of "write" unit 57. Core 125 and winding 124 are similar in structure to core 66 and winding 67, respectively, of FIGURE 5, with the air gap between the pole faces of core 125 being positioned perpendicularly to the direction of travel of the short information channel 58. Also included in FIGURE 7 is a permanent magnet 130, comprising one of the previously noted magnet pair within "erase" unit 60 of FIGURE 4, the air gap between the pole faces thereof likewise being positioned perpendicularly to the direction of track 58 travel.

The operation of record circuit 115 may be most readily understood by reference to FIGURE 8 wherein is set forth a typical group of signal waveforms appearing at various points in the circuit. First illustrated are the pair of complementary timing signals $cl$ and $cl'$, produced by flip-flop C1, as they appear during consecutively designated timing intervals. Flip-flop C is triggered to represent, by its conduction states, the flow of computer output information to be recorded for recirculation on the short channel, the particular manner by which this is accomplished being set forth later in FIGURE 17. Flip-flop C is structurally similar to the previously illustrated flip-flop C1, it having $S_c$ and $Z_c$ input conductors corresponding to the $S_{c1}$ and $Z_{c1}$ conductors, respectively, thereof.

Flip-flop C is normally in its zeroed or low conduction state, that is, signal $c$ is normally at its low voltage level and hence corresponds electrically to the binary value of zero. Each instance, however, that a binary value of one is to be recorded on channel 58, flip-flop C is triggered at the end of or conclusion of a corresponding timing interval to its set or one state with signal $c$ accordingly going high. Now, signal $cl'$ is, in practice, applied to the $Z_c$ terminal with the result that flip-flop C will remain in its set state only for the first half of the next timing interval, that is, while signal $cl$ is at its low voltage level, and, at the end of which time, corresponding to the return of signal $cl'$ from its high to low level, flip-flop C will be triggered back to its normal low conduction level.

This is shown, by way of example only, in FIGURE 8, where flip-flop C is triggered to produce high voltage levels in signal $c$ during the low voltage level signal $cl$ portions of the second, third, fifth, and seventh designated timing intervals, to thereby represent binary one values, it remaining low during the fourth and sixth intervals to represent zero binary values.

Whenever signal $c$ changes from its low to high level, a corresponding positive pulse is produced on the grid of triode 117 owing to the differentiating action of resistor 121 and capacitor 118. On the other hand, each negative pulse generated by a signal $c$ change from a high to a low level, will be shunted directly across resistor 121 by diode 120 and hence not appear on the triode's grid.

The signal appearing on the grid is illustrated by the waveform generally designated 126 in FIGURE 8 it containing, as before stated, positive pulses at the beginning of those intervals signal $c$ switches high. Potentiometer 122 is adjusted such that the normal negative bias potential placed on the grid renders the triode substantially at cut-off. Upon appearance of each positive pulse in signal 126, a corresponding anode conduction takes place through resistor 123 and coil 124 to terminal $E_1$, this anode current flow being represented by the signal, generally designated 128 in FIGURE 8.

The pole faces of erase magnet 130 serve to continuously polarize the magnetic particles of track 58 in one direction relative to the direction of travel thereof, this direction of magnetization corresponding to a continuous stream of zero binary digit values as defined magnetically. Now, the direction of winding of coil 124 is such, in response to current flow therethrough from triode 117, to magnetically actuate core 125 into reversing this direction of erase bias. Each of such direction reversals corresponds, as magnetically defined, to a binary one value. Thus, whenever triode 117 is pulsed to conduction, as in signal 128, the resulting anode current flow through winding 124 causes a binary value of one to be inserted within the stream of zeros. This action is illustrated by the magnetic bias representation 132 in FIGURE 8 wherein, as will be seen, during each interval signal 128 is high, indicating current flow, the direction of the normally appearing zero valued bias on channel 58 is reversed.

As will be observed, since flip-flop C is always activated in a prescribed manner relative to the signal $cl$ timing intervals which activations, in turn, produces magnetic alignments of the magnetic particles of track 58 by record circuit 115, it is apparent that the eventual magnetization pattern produced thereby bears a definite spaced relationship around the drum periphery with the permanently recorded timing track. As will be shortly seen, this allows the information thus recorded to be picked up or "read" and synchronized with the timing signal at the "read" point. As will be also noted, each binary one value is magnetically recorded just after signal $cl$ goes low, that is, during the first part of its associated timing interval. Furthermore, it is evident that only a single binary one value may be recorded during any one timing interval and the clocking signal itself must be utilized to distinguish between consecutive zero magnetic values, there being no flux changes therebetween to indicate their successive appearances.

Referring next to FIGURE 9, there is illustrated the electronic circuitry within computer unit 43 associated with "read" unit 56. First illustrated is a magnetizable iron core 134 enclosed by a winding 135, the two forming the essential portions of "read" unit 56, and being structurally similar to core 66 and winding 67, respectively, of clock "read" unit 61 as described in connection with FIGURE 5. The air gap between the pole faces of core 134 is, as formerly, positioned perpendicularly to the direction of the short information channel 58 travel, with the ends of winding 135 being connected to an amplifier 138, similar in all respects to the previously illustrated and described timing signal amplifier 69 in FIGURE 5. The output of amplifier 138 is applied to the $S_e$ input conductor of an electronic switch, such as flip-flop E, the $Z_e$ input conductor thereof being coupled to the signal $cl$ output conductor of flip-flop C1, not again here illustrated.

Output signal $e$ of flip-flop E is applied to the first input terminal of a two terminal "and" gating circuit 140. This first input terminal is connected within circuit 140 through diode 141 to a common junction 142. In the same manner, signal $cl$ is applied to the second input terminal of circuit 140, this second terminal in turn, being coupled through a diode 145 to junction 142. Junction 142 is coupled both through a resistor 143 to terminal $E_1$ and is also connected to the output terminal of circuit 140, which is coupled, in turn, to the $S_a$ input conductor of another electronic switching device, such as flip-flop A.

In the same manner, as the signal $e'$ output conductor of flip-flop E is connected to one input terminal of another two terminal "and" gating circuit 146, similar to circuit 140, while the signal $cl$ conductor is connected to the other input terminal of circuit 146. Finally, the output terminal of circuit 146 is coupled to the $Z_a$ input conductor of flip-flop A. Flip-flop A produces a pair of complementary output signals $a$ and $a'$, the voltage levels of which represent electrically, as will be seen, the magnetic binary values passing beneath core 134.

For understanding the operation of the circuit of FIGURE 9, reference is made to the signal waveforms illustrated in FIGURE 10. Again illustrated, for the sake of convenience, is magnetic pattern 132 on information channel 58 as was shown to have been recorded thereon, by way of example, in FIGURE 8. Pattern 132 in passing beneath the air gap of core 134 induces pulses of alternate positive and negative polarity in winding 135 at alternate changes in direction of the magnetization bias direction. Thus, the leading edge of the first recorded binary one cell on channel 58 induces, by way of example, a positive pulse in winding 135 which is applied to amplifier 138, the pulse being illustrated in the output signal waveform, generally designated 136 in FIGURE 10, of winding 135. On the other hand, the trailing edge of this binary one recording induces, owing to the reversed change of magnetization direction from that of the leading edge, a negative pulse in winding 135, it being likewise applied to amplifier 138. In the same way, each of the other magnetic binary one cells on the channel induce, upon passage of their leading and trailing edges beneath the core 134 air gap, pulses of positive and negative polarities, respectively, in signal 136.

As will be recalled from the operation of amplifier 138, incoming positive and negative pulses will be amplified by the two stages therein to appear as output positive and negative pulses, respectively. Each positive output pulse will be effectively blocked by the diode, corresponding to diode 98 in FIGURE 5, in the $S_e$ input circuitry but, on the other hand, each negative pulse in signal 136 will trigger flip-flop E into its set or high conduction state as exemplified by its output signal waveform $e$, illustrated in FIGURE 10. Now, since timing signal $cl$ is applied to the $Z_e$ input conductor or flip-flop E, each change from a high to low voltage level thereof, corresponding to a negative pulse, will, if flip-flop E is in its set condition, trigger it into its zero state with signal $e$ accordingly going low. Thus, at the end of the first designated timing interval in signal $cl$, as illustrated in FIGURE 10, signal $e$ will be lowered to its low potential level. Immediately following this low voltage level, however, the second negative pulse in signal 136 occurs with the result that flip-flop E is again triggered to its high conduction level with signal $e$ returning high. This second high voltage in signal $e$ is returned low at the end of the second timing interval owing again to the operation of signal $cl$. In the same way, the remaining portions of signal $e$, as illustrated, may be understood with, as before stated, additional negative pulses produced by signal $cl$ on the $Z_e$ conductor during those intervals signal $e$ is already low, causing no change in the flip-flop conduction state.

Turning now to the operation of the "and" gating circuit 140, it is seen that owing to the direction of connection of diodes 141 and 145, junction 142 will always be at the potential of the circuit input signal having the lower of the two voltage levels. Thus, if either or both of signals $cl$ and $c$ are at the 100 volt level, then, junction 142 will be at the same 100 volt level. One the other hand, if both signals are high or of the 140 volt level, then junction 142 will likewise be at a corresponding 140 volt level.

Thus, during the last half of the first designated timing interval, when signal $e$ and $cl$ are each high, junction 142 will likewise be high and the input $S_a$ capacitor within flip-flop A, corresponding to capacitor 97 in FIGURE 5, will be charged to the 140 volt level then appearing at junction 142, the charging current traveling from terminal $E_1$ through resistor 143. Then, at the conclusion of the first timing interval when signal $cl$ and $e$ each switch to their low voltage level, junction 142 will likewise change to the 100 volt level and the then charged flip-flop input capacitor will accordingly discharge through its associated grid resistor causing a corresponding negative pulse to be produced at the grid of its associated flip-flop triode. This, in turn, acts to trigger flip-flop A into its other conduction state and signal $a$, illustrated in FIGURE 10, previously at its low level will rise, at the beginning of the second timing interval, to its high voltage level.

At the end of the second timing interval, signals $e$ and $cl$ are again high with another negative pulse being delivered through the $S_a$ input conductor. This triggering pulse has no effect on the conduction state of flip-flop A, it being already high, but during the last half of the third timing interval, signal $e'$ and $cl$ are each at their high voltage level and, since the operation of gating circuit 146 is similar to circuit 140, a negative triggering pulse will be delivered through the $Z_a$ conductor and act to trigger flip-flop A back to its zero conduction state. Signal $a$ accordingly goes low to represent a zero binary value during the fourth timing interval, which zero value electrically represents the zero magnetic state in pattern 132 following the second binary one value therein. In this same manner, the remaining portions of the FIGURE 10 waveforms may be readily understood.

It is thus seen that each binary one cell on channel 58, although appearing in magnetic form for only a fraction of a timing interval, when converted into an electrical representation, as in signal $a$, appears for a full timing interval as is desired. It is also important to note that "read" unit 56 should be positioned on the memory drum such that its output negative pulses, indicating recorded binary one values, as are illustrated in signal 136, appear only during low voltage levels of signal $cl$ in order that the resulting signal $a$ high voltage levels appear for full timing intervals.

It should be further noted that a full timing interval is required for the transfer of a binary value represented by the conduction state of one flip-flop into a corresponding binary value represented by the conduction state of another flip-flop. This is evidenced, in part, by the transfer of the signal $e$ values into corresponding signal $a$ values and is caused primarily by the fact that the input capacitor whose subsequent discharge produces the triggering function must be charged for at least half of a timing interval, corresponding to the signal $cl$ high voltage level, before it can be discharged to effect the flip-flop change of states.

(3) MANUAL SWITCHING AND FLIP-FLOP ARRANGEMENT

In addition to the memory circuitry, computer unit 43 also includes various flip-flops serving to process the recirculating binary data, a plurality of interconnected logical "and" and "or" gating circuits serving to provide triggering signals for the data processing flip-flops, and finally, various manually operated pushbuttons and switches for providing desired interconnections between the gating circuits. Thus, in FIGURE 11, there is illustrated the external arrangement of the pushbuttons and switches as found on the front of computer unit 43, there also being shown, in external relationship to the computer unit, the principal information bearing flip-flops in the memory circuitry as well as the information processing flip-flops which are illustrated in conjunction with their input and output signal conductors. Although, in practice, these flip-flops will be found enclosed with the computer unit, here, they are, for the purposes of identification, illustrated external thereto.

Thus, on the front panel 175 of unit 43 which there is illustrated a mark operation switch 177, having three contact positions designated by $O_4$, $O_2$ and Off, a compute operation switch 179 having two switch contact positions designated by $O_5$ and $O_3$, and finally, a register operation switch 180, having four switch positions designated by $dy$, $dx$, $r$ and $y$.

Also included on front panel 175 are a "clear" pushbutton 182, a "halt" pushbutton 184, a 1 pushbutton 185 and finally, a 0 pushbutton 186. Finally, the external portions of an integrator section indicator mechanism is indicated at 187, these portions including a pointer 189 positioned adjacent a rotatable marked dial 188, dial 188 having printed or engraved at twenty evenly spaced divisions around the edge thereof, the successive symbols $I_1$, $I_2$, $I_3$, etc. on through $I_{20}$, in the clockwise direction as viewed from FIGURE 11, these symbols representing the first integrator section, the second integrator section, the third integrator section, etc. on through the twentieth integrator section, respectively. In addition, a small rotatable knob 190 is illustrated, it serving when rotated one turn in the designated counter-clockwise direction to actuate the indicator mechanism such that dial 188 is rotated, in the same corresponding direction, an angular amount corresponding to the difference between successive symbols thereon. Mechanism 187 is secured to the front panel by four screws, designated 191, the structural details of the mechanism being shown in considerably more detail later in FIGURE 23. It should be here noted that a ratchet arrangement is incorporated in the mechanism to permit knob 190 rotation in only the counter-clockwise direction.

As will be later explained in more detail, this indicator mechanism permits the operator to single out or isolate during successive recirculations, the particular integrator section indicated by pointer 189 for the purpose of either filling that section or observing the contents of any of its registers. Also, rotation of knob 190 acts to change the particular section indicated by dial 188 and hence changes the section that may be either filled or observed.

The relative switch positions of switches 177, 179 and 180 at any time determine the particular operation capable of being performed by the computer. "Clear" pushbutton 182 serves when depressed to clear both long and short channels by leaving unchanged the continuous stream of zeros placed thereon by the erase heads, while the "halt" pushbutton 184 serves, when depressed, to stop the compute operation of the computer. The 1 and 0 buttons 185 and 186, respectively, serve both for initiating various specified computer operations as well as for filling binary values into the various integrator sections during the fill operation.

Considering now the principal memory flip-flops, there is again illustrated timing signal flip-flop C1, as associated with timing signal track 62, the complementary output signals $cl$ and $cl'$ thereof being applied to the gating network within computer unit 43. Also again illustrated, are "read" and "write" flip-flops A and C respectively, associated with short information channel 58, the complementary output signals $a$ and $a'$ of flip-flop A being applied to the unit 43 gating circuitry with flip-flop C receiving from the unit triggering signals on its $S_c$ and $Z_c$ input conductors. Associated with flip-flops A and C in connection with the recirculation of the short channel information, is another electronic switching device, such as flip-flop B, receiving triggering signals from unit 43 on its $S_b$ and $Z_b$ input conductors and producing complementary output signals $b$ and $b'$ which, in turn, are applied back to the gating network.

As before stated, long information channel 54 has associated with it in computer unit 43, electronic circuitry similar to that described and shown in FIGURES 7 and 9 for the short information channel, with a "reading" electronic switch, such as flip-flop L, corresponding to flip-flop A, producing complementary output signals $l$ and $l'$ which are applied to the gating network. In the same way, the recording circuit associated with channel 54 includes an electronic switch, such as flip-flop M, corresponding to flip-flop C, flip-flop M receiving triggering signals on its $S_m$ and $Z_m$ input conductors.

An electronic switching device, such as flip-flop T, is associated closely with timing flip-flop C1, as will be later shown in FIGURE 14, flip-flop T receiving triggering signals from the gating circuitry on its $S_t$ and $Z_t$ input conductors and producing complementary output signals $t$ and $t'$ which in turn are applied back to the network.

Next illustrated are three electronic switching devices, such as flip-flops I, J and D, which receive triggering signals on their $S_i$ and $Z_i$, $S_j$ and $Z_j$, and $S_d$ and $Z_d$ pairs of input conductors, respectively. Flip-flops I, J and D, in turn, produce the paired complementary output signals $i$ and $i'$, $j$ and $j'$, and $d$ and $d'$, respectively, all of which are applied to the gating circuitry within unit 43. These three flip-flops are grouped together, for convenience, since they generally function as a unit for determining, through their particular conduction states in association with the placements of the various switches and pushbuttons, the particular sub-operation performed by the computer at any specified time.

Finally, there are included four electronic switching devices, such as flip-flops P, Q, R and S which together form, as is hereafter termed, a summation $dy$ counter. Flip-flops P, Q, R and S receive triggering signals from the gating network on their respective $S_p$ and $Z_p$, $S_q$ and $Z_q$, $S_r$ and $Z_r$, and $S_s$ and $Z_s$ input conductor pairs with their respective pairs of complementary output signals $p$ and $p'$, $q$ and $q'$, $r$ and $r'$, and $s$ and $s'$ being applied to the gating circuitry.

(4) DIODE GATING NETWORK

Before considering in detail the diode gating circuitry within computer unit 43, it is thought well to first set forth additional details of mark operation switch 177 and the 1 pushbutton 185, the two being taken as representative of the other switches and pushbuttons, respectively. Thus, referring to FIGURE 12, there is illustrated partly in electrical schematic and partly in perspective form, a portion of switch 177. In particular, switch 177 includes a manually actuable switching knob 192 adapted to be rotated to any of three switch positions indicated by Off, $O_2$ and $O_4$. Knob 192 is connected to a shaft 193, partly illustrated, shaft 193 extending along the illustrated dashed line. Now, arranged along shaft 193 are a series of switching sections, the three being here given by way of example are in schematic form, and designated as 177-1, 177-2 and 177-3.

Considering first, section 177-1, a movable switch arm 194 therein is adapted to engage one of the fixed switch contact points 195, 196 or 197 in accordance with the angular position of knob 192, these contact points corresponding to the $O_4$, $O_2$, and Off positions, respectively. Movable arm 194 has applied to it the output signal of an "and" gating circuit 211 later illustrated in FIGURE 14, which will be applied to the particular contact point engaged by switch arm 194. In particular, switch points 195 and 196 are connected together and from there to the paralleled pushbutton sections 185-1 and 186-1 as later illustrated in FIGURE 14. As will be observed, contact point 197 is left unconnected signifying that the output signal of "and" circuit 211 is not utilized by the gating circuitry during the Off position of switch 177.

In the same way, section 177-2, later illustrated again in FIGURE 15, contains a movable switch arm, electrically isolated from all other movable switching arms, having the output signal of an "or" circuit 227 applied thereto. The contact point in this section corresponding to the Off position of switch 177 is connected to an "and" gating circuit 229, later shown in FIGURE 15, with the contact points therein corresponding to the $O_2$ and $O_4$ positions remaining unconnected. In the same way, the final section 177-3, again illustrated later in FIGURE 15, has output signal $i$ of flip-flop I applied to its movable switch arm with the $O_2$ and $O_4$ contact points therein being mutually connected to one input terminal of "and" circuit 229.

Switch 177 includes additional but similar sections, not here illustrated, they being illustrated in the subsequent diode gating layout in FIGURES 14 through 18. In an actual structural embodiment of switch 177, detent means should be included for providing positive stoppage of the movable switch arm at each of its three switch positions. The two remaining operation switches 179 and 180 are each similar to switch 177 except that each switch section of switch 179 will contain only two fixed contact points, corresponding to the $O_3$ and $O_5$ positions thereof, while each section of switch 180 will have four fixed contact points, corresponding to the $dy$, $dx$, $r$ and $y$ switch positions.

Referring now to FIGURE 13, there is illustrated in electrical diagrammatic form, a portion of 1 pushbutton 185 in conjunction with its associated relay circuitry. Here, pushbutton 185 includes a movable conductive arm 200 adapted when depressed, for making a shorting contact between a pair of lower contact points 201. One of points 201 is connected to the negative terminal of a source of potential, such as battery 205, the positive terminal of the battery being connected to one end of the winding of a relay 206. The other of the 201 contact points is coupled both to ground and the other end of the relay 206 winding. Finally, the output conductors of a toggle switch 207, here represented in electrically diagrammatic form, coming from a movable switch arm 208 and a contact point 209 therein are connected in parallel between contact points 201 of pushbutton 185.

In operation, upon depression of pushbutton 185, arm 200 makes a conductive engagement between lower contact points 201 with the battery circuit being subsequently completed through the coil of relay 206. The magnetic field produced by relay 206, in a conventional manner, envelops each of a series of movable shorting arms, each arm being normally biased in the designated up position to make shorting contact between a pair of upper contact points in its respective section. This series of shorting arms are included within a series of 1 pushbutton sections, the three here illustrated, by way of example, being in serial vertical form and designated 185-1, 185-2, and 185-3. This magnetic field produced by relay 206 causes the movable arms of each of the pushbutton sections to be lowered and brought into positive engagement with two corresponding lower contact points within its section and hence make a shorting contact between them. As is apparent, these pushbutton sections could have been represented by a single movable arm pivotally moved by the magnetic field between upper and lower contact point engagements. The form here used serves to distinguish the pushbutton sections from the various operation switch sections.

In particular, the lower contact points of section 185-1 are connected between the previously shown switch section 177-1 and the "or" circuit 212 of FIGURE 14. The upper contact points of section 185-2 are connected between the signal $b$ conductor and one input terminal of an "or" circuit 225, shown in FIGURE 15. Finally, the lower contact points of section 185-3 are connected between "and" circuit 226 and "or" circuit 227, as in FIGURE 15. The upper, lower, and upper contact point pairs of sections 185-1, 185-2, and 185-3, respectively, are unconnected to any of the remaining gating circuitry.

The remaining sections of circuit 185, not here illustrated, will be later found in FIGURES 14 through 18 in association with the diode gating network. Also, the zero and halt pushbuttons are connected to relays circuitry of the type here illustrated for the 1 pushbutton with their associated switch sections being actuated in the manner herein set forth.

Referring now to FIGURE 14, there is set forth the gating circuitry connected to the $S_i$ and $Z_i$ input conductors of flip-flop I, as well as the circuitry connected to the $S_t$ and $Z_t$ input conductors of flip-flop T. Considering first of all, the $S_i$ circuitry, signals $d'$, $j'$ and $t$ are applied to the three input terminals, respectively, of a three terminal "and" gating circuit 211, which may be similar to "and" gating circuit 140 previously illustrated in FIGURE 9 and modified as suggested for including three input terminals. The output terminal of circuit 211 is coupled to the movable switch arm of section 177–1, previously described in FIGURE 12, the $O_2$ and $O_4$ contact points of which are jointly coupled to one lower contact point of pushbutton section 185–1, previously illustrated in FIGURE 13 and to one lower contact point of the first section 186–1 of zero pushbutton 186. The other lower contact points of sections 185–1 and 186–1 are connected together and from there through a diode 214 to a common junction 217, both within a two terminal "or" gating circuit 212.

Another three terminal "and" gating circuit 210, having its input terminals connected to the signal $a$, $j$, and $t'$ conductors, has its output signal applied through a diode 215 to junction 217, both within "or" circuit 212. Junction 217, in turn, is connected through a resistor 216 to the terminal $E_2$, of the negative source of potential.

The output terminal of "or" circuit 212, connected to common junction 217 therein, is coupled to one input terminal of a three terminal triggering "and" gating circuit 219 with signals $i'$ and $cl$ being applied to the other remaining two input terminals thereof. The output signal of circuit 219 is applied to the $S_i$ input conductor of flip-flop I.

Considering the $Z_i$ gating circuitry, signals $a$ and $t'$ are applied to a two terminal "and" circuit 220, the output signal of which is applied to one upper contact point of a pushbutton section 182–1 of clear pushbutton 182. The remaining upper contact point of section 182–1 is connected to one input terminal of a three terminal triggering "and" gating circuit 222, the other two input terminals of which receive signals $i$ and $cl$, respectively. The output terminal of circuit 222 is connected to the $Z_i$ input conductor of flip-flop I.

Considering now flip-flop T, signals $t'$ and $cl$ are applied to a two terminal "and" gating circuit 223, the output terminal of which is connected to the $S_t$ input conductor thereof. Also, signals $t$ and $cl$ are applied to an "and" circuit 224 the output signal of which is applied to the $Z_t$ input conductor of flip-flop T.

The various "and" gating circuits illustrated operate in a manner similarly to that described for circuit 140 in FIGURE 9 in that a high output voltage level is produced only upon the simultaneous appearance of a high voltage level in each of their respective input signals. More particularly, the triggering "and" circuits, whose output signals are applied directly to the input conductors of a flip-flop, serve, as previously explained, to apply a triggering signal thereto upon the clocking signal going low at the end of any timing interval all of the remaining input signals were at their high voltage level.

In considering the operation of "or" gating circuit 212, it is seen that owing to the direction of connection of diodes 214 and 215, whenever either or both of the input signals applied thereto are at their high voltage level, then junction 217 and hence the output conductor thereof will likewise be at the high voltage level. Only when both input signals are simultaneously low will the output voltage level be also low. Although only a two terminal "or" circuit is here illustrated, a larger number of input terminals may be employed by connecting each of such additional terminals through a diode, similarly positioned as diodes 214 and 215, to common junction 217. With such a modification, junction 217 and hence the circuit's output terminal will be high whenever any of the input signals is at its high voltage level.

Although the particular significance and operational properties of these various "and" and "or" gating circuits, switching and pushbutton sections associated here with flip-flops I and T, as well as with the remaining flip-flops to be yet described, will become more apparent during the subsequent discussion of each of the analyzers designated clear, mark, fill, shift, and compute operations, special reference is made at this time to the triggering of flip-flop T. First of all, at the end of each timing interval signal $t$ is high, flip-flop T will receive a triggering signal, owing to the operation of diode gating circuit 224, on its $Z_t$ input conductor and hence have its conduction state reversed such that signal $t'$ then becomes high. Then, at the end of the next following timing interval a corresponding triggering signal will be applied from "and" circuit 223 to the $S_t$ conductor with the flip-flop conduction state accordingly being reversed back to its first mentioned high voltage level. It is thus seen that flip-flop T is triggered to alternate conduction states during consecutive timing intervals and hence its output signal $t$ voltage levels respresent alternate zero and one binary values. In this respect, flip-flop T acts as a single stage binary counter to count the signal $cl$ timing intervals.

Considering now FIGURE 15, there is illustrated the gating circuitry associated with the $S_j$ and $Z_j$ input conductors of flip-flop J. Thus, signals $b$ and $b'$ are applied to one of the lower contact points of the respective 1 and 0 pushbutton sections 185–2 and 186–2, the other lower contact points thereof being connected to the two input terminals of a two terminal "or" gating circuit 225. The output signal of circuit 225 along with signals $d'$, $i'$, and $l$ are applied to the four input terminals of an "and" gating circuit 226, the output terminal of which is connected to one of the lower contact points of each of 1 and 0 pushbutton sections 185–3 and 186–3. The remaining lower contact points of sections 185–3 and 186–3 are jointly connected to one input terminal of a two terminal "or" circuit 227.

Signal $s'$ is applied to the movable switch arm of a compute switching section 179–1, the $O_5$ switch contact therein being coupled to one input terminal of a two terminal "and" gating circuit 228. Signal $i$ is applied to the other input terminal of circuit 228, the output signal thereof being applied to the remaining input terminal of "or" circuit 227. The output terminal of circuit 227 is connected to the movable switch arm of switch section 177–2, the Off switch point therein being coupled to one input terminal of a seven terminal "and" circuit 229. Signals $i$, $l$, and $t'$ are applied to the movable contact arms of sections 177–3, 177–4, and 177–5, respectively, with the $O_2$ and $O_4$ contact points of section 177–3, the $O_4$ contact point of section 177–4, and the $O_2$ contact point of section 177–5 being connected to three additional input terminals of circuit 229. Signals $j'$ and $cl$ are applied to two other input terminals of circuit 229 with its remaining input terminal being connected to the $O_4$ and Off contact points of a switch section 177–6. The movable switch arm of section 177–6 is connected to the output terminal of an "and" circuit 230, circuit 230 receiving signals $a$ and $t'$ on its two input terminals. The output terminal of "and" circuit 229 is coupled to the $S_j$ input conductor of flip-flop J.

The output conductor of "and" circuit 230 is additionally coupled to the movable switch arm of a compute switch section 179–2, the $O_3$ point therein being coupled to one input terminal of a four terminal "and" gating circuit 231. Another input terminal of circuit 231 is connected to the signal $i$ conductor while signal $l'$ is applied to the movable switch arm of a compute switch section 179-3. The $O_5$ contact point in section 179-3 is coupled to another input terminal of circuit 231 while signal $t$ is applied to the movable switch arm of yet another compute switch section 179-4, the $O_5$ contact point therein being connected to the final input terminal of circuit 231.

The output terminal of circuit 231 is connected serially through the upper contact points of the clear and halt pushbutton section 182-2 and 184-1, respectively, to one input terminal of a three terminal triggering "and" gating circuit 232. The remaining two input terminals of circuit 232 are connected to the signal $j$ and $cl$ conductors, with its output terminal being connected to the $Z_j$ input conductor of flip-flop J.

Referring now to FIGURE 16 there is illustrated the gating circuitry providing triggering signals for the summation $dy$ counter Q, R and P flip-flops. Thus, signals $i$, $j'$ and $t$ are applied to the three input terminals of a three terminal "and" circuit 234, the output signal of which is applied along with signals $l$ and $s$ to the three input terminals of a similar "and" gating circuit 235. The output conductor of circuit 235 is connected to the movable switch arm of a compute operation switch section 179-5 with the signal appearing on the $O_5$ contact point thereof being designated $S_{b_2}$ which will serve in FIGURE 18 as one of the signals applied to the triggering circuitry associated with the $S_b$ input terminal of flip-flop B.

The output terminal of circuit 234 is further coupled to one input terminal of a three terminal "and" gating circuit 236, the other two input terminals thereof being connected to the signal $l'$ and $s'$ conductors, respectively. The output signal of circuit 236 along with the output signal of circuit 235 are applied to a two terminal "or" gating circuit 238, the output signal of which is applied to one input terminal of a two terminal "and" gating circuit 239. Signal $b$ is applied to the other input terminal of circuit 239 and its output terminal is connected to the movable switch arm of a compute operation switch section 179-6 with the signal, designated $S_{m_5}$, later found in FIGURE 18, appearing on the $O_5$ contact point thereof. The output terminal of "and" circuit 236 is also connected to the movable switch arm of a compute switch section 179-7, the signal appearing on the $O_5$ contact point thereof being designated $Z_{b_4}$, found later in FIGURE 18.

The output terminal of circuit 234 is connected to one input terminal of each of "and" gating circuits 240, 241, 242, 243, 244 and 245, which, in turn, receive on their other input terminals the $p$, $p'$, $q$, $q'$, $r$ and $r'$ signals, respectively. The output terminals of circuits 244 and 245 are designated $S_{s_1}$ and $Z_{s_2}$, respectively, with the output conductor of circuit 240 being coupled to one input terminal of a three terminal "or" gating circuit 246.

Signals $a$, $j'$ and $t'$ are applied to the three input terminals of an "and" gating circuit 248, the output signal of which is designated $Z_{s_1}$ and is applied to another input terminal of "or" circuit 246. A four terminal "and" gating circuit 249 has signals $i$, $j'$, $t'$ and $a'$ applied to its input terminals with its output terminal being connected to one input terminal of a three terminal "and" gating circuit 250. Signals $l$ and $s$ are applied to the other two terminals of circuit 250 with its output signal being applied to one input terminal of a three terminal "or" gating circuit 251. Signals $i'$ and $j$ are applied to two of the three input terminals of an "and" gating circuit 252 with the signal $t'$ conductor being coupled to the movable switch arm of a pair of operation switch sections 180-1 and 179-8, respectively, with the $dx$ and $dy$ contact points of switch 180-1 being connected with the $O_5$ contact point of section 179-8 to the remaining input terminal of circuit 252. The output terminal of circuit 252 is coupled to one input terminal of an "and" gating circuit 254 and to one input terminal of a five terminal "and" gating circuit 255.

Figure 18:
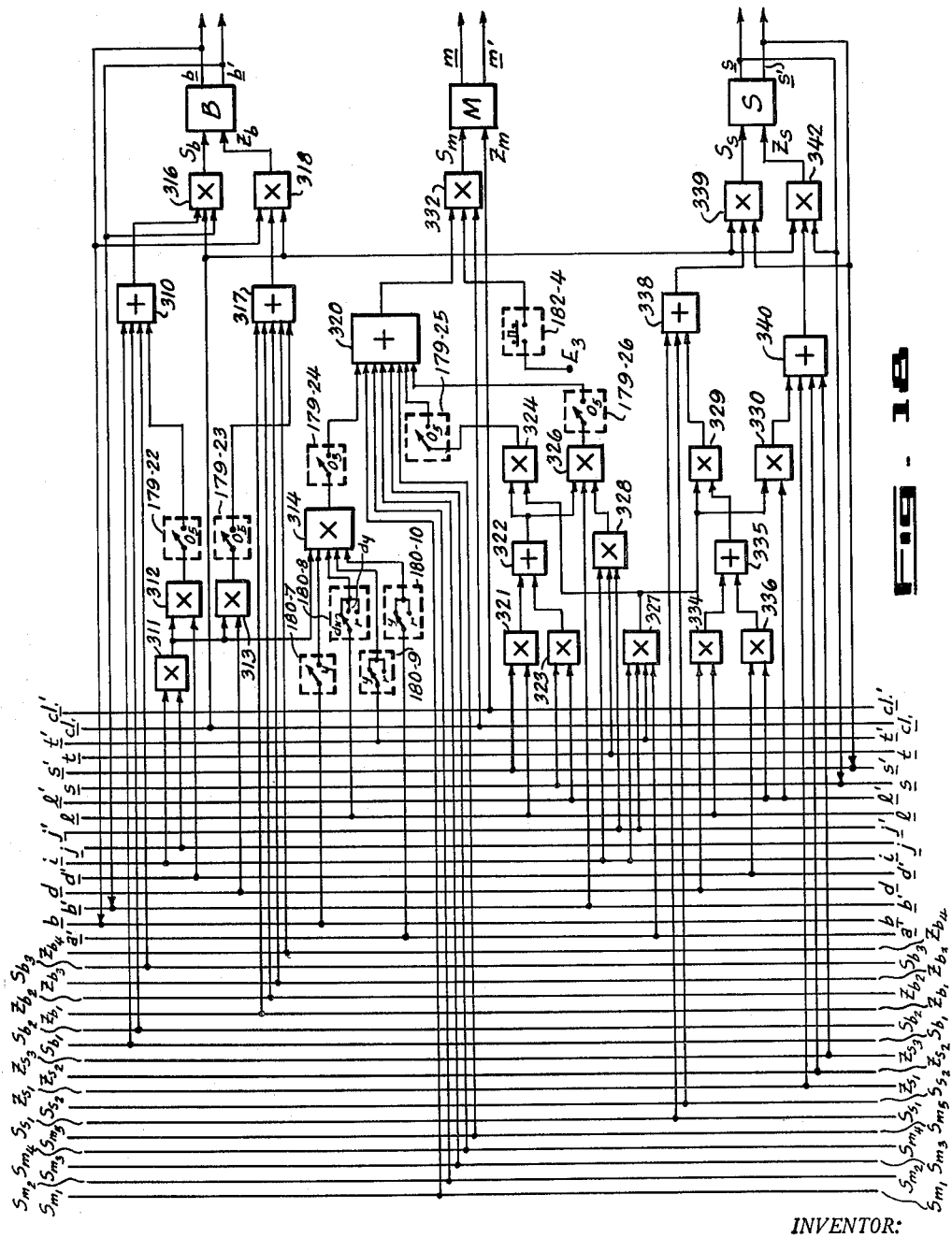

The other input terminal of circuit 254 is connected to the signal $l'$ conductor with its output terminal being connected to one input terminal of an "and" gating circuit 253 as well as providing the designated $Z_{s_3}$ and $S_{s_2}$ signals for further use in FIGURE 18. The other input terminal of circuit 253 is connected to the signal $s$ conductor with its output terminal being connected to another input terminal of "or" circuit 251.

Signal $b$ is applied to the movable switch arm of each of operation switch sections 179-9 and 180-2, the $O_5$ and $dy$ contact points of sections 179-9 and 180-2, respectively, being mutually coupled to the movable switch arm of another mark operation switch section 177-7. The Off contact point of section 177-7 is connected to another input terminal of "and" gating circuit 255. Two other input terminals of circuit 255 are connected to the signal $i'$ and $j$ conductors with the final input terminal thereof being mutually connected to the $dx$, $y$ and $r$ fixed contact points of a fill operation switch section 180-3, to the $O_5$ fixed contact point of another compute operation switch section 179-11, and finally to the $O_4$ and $O_2$ switch contact points of yet another mark operation switch section 177-8. The movable switch arms of the respective sections 180-3, 179-11, and 177-8 are each connected to the signal $l$ conductor.

The output conductor of gating circuit 255 is connected to the movable switch arm of a compute operation switch section 179-10, the $O_5$ contact point therein being connected to the final input terminal of "or" circuit 251 with the signal appearing on the $O_3$ contact point being designated $S_{m_4}$.

The output conductor of "or" circuit 251 is connected to one input terminal of each of "and" gating circuits 258, 259 and 260, and to one input terminal of each of "or" gating circuits 261 and 262. Signal $r$ is applied to the other input terminal of circuit 258 with the output signal thereof being applied to the final input terminal of "or" circuit 246, and to one input terminal of an "or" circuit 265. The output signal produced by "or" circuit 246 is applied to an "and" gating triggering circuit 264 as are timing signals $cl$ and $q'$ the output terminal of circuit 264 being, in turn, connected to the $S_q$ input conductor of flip-flop Q to apply triggering signals thereto.

The output signal of gating circuit 241 is applied to the remaining input terminal of "or" circuit 265, the output terminal of which is connected to one input terminal of a three terminal "and" triggering circuit 266, circuit 266 receiving signals $cl$ and $q$ on its two other input terminals. The output terminal of circuit 266 is connected to the $Z_q$ input conductor of flip-flop Q.

The remaining input terminals of circuit 259 are connected to the signal $q$ and $r$ conductors with the output signals of "and" circuits 248 and 259 being applied to the two input terminals of a two terminal "or" gating circuit 268, respectively, whose output signal, in turn, is applied to one input terminal of a three terminal "and" triggering circuit 269. Circuit 269 receives signals $cl$ and $p'$ on its two remaining input terminals and its output conductor is coupled to the $S_p$ input conductor of flip-flop P to thereby provide triggering signals therefor. Signals $q$, $r$, $p$ and $cl$ are applied to the remaining input terminals of "and" triggering circuit 260 whose output conductor, in turn, is coupled to the $Z_p$ input conductor of flip-flop P.

The output terminal of "and" circuit 242 is applied to the other input terminal of "or" circuit 261 the output terminal of which is coupled to one input terminal of a three terminal "and" triggering circuit 270, circuit 270 receiving signals $r'$ and $cl$ on its two remaining input terminals. The output signal of circuit 270 is applied to the $S_r$ input conductor of flip-flop R.

The output terminals of circuits 243 and 248 are connected to the remaining input terminals of "or" circuit 262 whose output terminal, in turn, is connected to one input conductor of a three terminal "and" triggering circuit 271. Signals $r$ and $cl$ are applied to the remaining two input terminals of circuit 271, the output signal of circuit 271, in turn, being applied to the $Z_r$ input conductor of flip-flop R.

Figure 17:
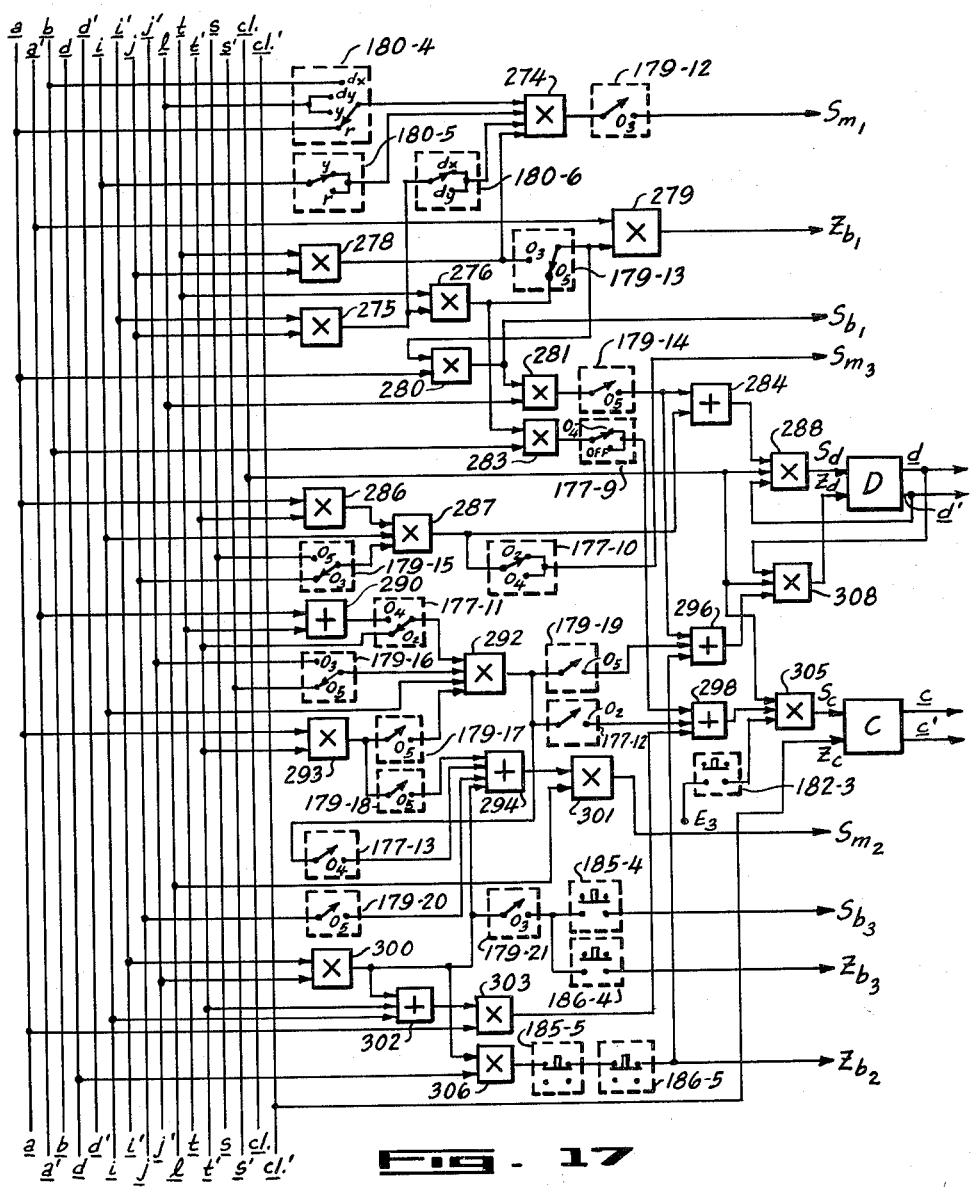

Referring now to FIGURE 17 there is illustrated the triggering circuitry associated with programming flip-flop D and the short channel record flip-flop C. Here, signals $b$ and $a$ are applied to the $dx$ and $r$ contact points of a fill operation switch section 180–4, with signal $l$ being applied to both the $dy$ and $y$ contact points therein. The movable switch arm of section 180–4 is connected to one input terminal of a four terminal "and" circuit 274, another input terminal thereof being connected to the $y$ and $r$ contact points within an operation switch section 180–5 whose movable switch arm is connected to the signal $i$ conductor. Signals $i'$ and $j$ are applied to the two input terminals of an "and" gating circuit 275 whose output conductor is connected both to one input terminal of an "and" gating circuit 276 and to the movable switch arm within an operation switch section 180–6 whose $dx$ and $dy$ contact points are connected to another input terminal of circuit 274. Signals $j$ and $t$ are applied to the two input terminals of a two terminal "and" circuit 278, the output terminal thereof being coupled to the final input conductor of circuit 274. The output signal of circuit 274 is applied to the movable switch arm of a compute operation switch section 179–12, the signal appearing on the $O_3$ contact therein being designated $S_{m_1}$, again found in FIGURE 18.

The output conductor of "and" gating circuit 278 is also coupled to the $O_3$ contact point within a compute operation switch section 179–13. Signal $t$ is applied to the remaining input terminal of circuit 276, the output conductor of which is connected to the $O_5$ contact point within section 179–13 as well as to one input terminal of "and" gating circuit 283. The movable switch arm within section 179–13 is connected to one input terminal of gating circuit 279 the other input terminal thereof being connected to the signal $a'$ conductor. The output signal of circuit 279 is designated $Z_{b_1}$, again found in FIGURE 18.

One input terminal of circuit 280 is connected to the signal $a$ conductor with its remaining input terminal being connected to the movable switch arm within section 179–13. The output signal of circuit 280 is both designated $S_{b_1}$ and is applied to one input terminal of a two terminal "and" gating circuit 281, the other input terminal of which is connected to the signal $l$ conductor. The output terminal of circuit 281 is connected to the movable switch arm of an operation switch section 179–14, the $O_5$ contact point therein being connected to one terminal of each of "or" gating circuits 284 and 296.

Signals $a$ and $t'$ are applied to the two input terminals of an "and" gating circuit 286 whose output conductor is connected to one input terminal of three terminal "and" circuit 287. The $O_5$ and $O_3$ contact points within an operation switch section 179–15 are connected to the signal $s$ and $j$ conductors, respectively, the movable switch arm therein being connected to another input terminal of circuit 287. Signal $i$ is applied to the final input terminal of circuit 287 with the output terminal being connected to the remaining input terminal of "or" circuit 284. This output conductor is also connected to the movable switch arm of an operation switch section 177–10 whose $O_2$ and $O_4$ contact points are joined together to form, in turn, the $S_{m_3}$ signal conductor.

The output signal of "or" circuit 284, signal $cl$, and signal $d'$ are applied to the three respective input terminals of a three terminal "and" triggering circuit 288 whose output signal in turn, is applied to the $S_d$ input conductor of flip-flop D.

Signals $a'$ and $t$ are applied to the two input conductors of an "or" circuit 290, the output terminal of which is coupled to the $O_4$ contact point of a mark operation switch section 177—11. The $O_2$ contact point in section 177–11 is coupled to the signal $t'$ conductor with its movable switch arm being connected to one input terminal of a four terminal "and" gating circuit 292. Signals $j'$ and $s'$ are applied to the $O_3$ and $O_5$ contact points, respectively, within an operation switch section 179–16, the movable switch arm therein being coupled to another input terminal of circuit 292. Signals $a$ and $t'$ are applied to an "and" circuit 293 whose output signal is applied to the movable switch arms of a pair of operation switch sections 179–17 and 179–18, respectively. The $O_5$ contact point in the respective 179–17 and 179–18 sections are connected to another input terminal of circuit 292 and to an input terminal of a four terminal "or" gating circuit 294, respectively. The final input terminal of circuit 292 is connected to the signal $i$ conductor with its output signal being applied to the movable switch arms within operation switch sections 179–19 and 177–12, respectively, the $O_5$ and $O_2$ fixed contact points therein being connected to another "or" gating circuit 296 input terminal and one "or" gating circuit 298 input terminal, respectively. In addition, this output terminal of circuit 292 is connected to the movable switch arm of an operation switch section 177–13, the $O_4$ contact point therein being connected to another input terminal of "or" circuit 294.

Returning now to "and" circuit 283, the other input terminal thereof is connected to the signal $b$ conductor and its output signal is applied to the movable switch arm of an operation switch section 177–9, the Off and $O_4$ contact points being jointly connected to another input terminal of "or" circuit 298.

Signal $j$ is applied to the switch arm of switch section 179–20, the $O_5$ contact point therein being connected to another input terminal of "or" gating circuit 294. The final input terminal of circuit 294 is connected to the output terminal of "and" gating circuit 300 receiving input signals from the $i'$ and $j'$ signal conductors. The output signal produced by "or" circuit 294 along with signal $l$ are applied to the two input terminals of a two terminal "and" circuit 301, the output signal thereof being designated $S_m^2$. Signals $i$ and $t'$ are applied along with the output signal of circuit 300 to the input terminals of a three terminal "or" gating circuit 302, whose output signal, in turn, is applied to one input terminal of an "and" gating circuit 303. The other input terminal of circuit 303 is connected to the signal $a$ conductor, its output signal, in turn, being applied to the remaining input terminal of circuit 298.

The output signal of circuit 298 is applied to one input terminal of an "and" gating circuit 305, circuit 305 receiving timing signal $cl$ as another input signal. The remaining input terminal of circuit 305 is connected to one of the lower contact points of a clear pushbutton section 182–3, the other lower contact point thereof being coupled to the $E_3$ terminal. The output signal of circuit 305 is applied to the $S_c$ input conductor of flip-flop C.

The output signal of circuit 300 is also applied to the switch arm of a compute switch section 179–21 which has its $O_3$ contact point connected to one of the lower contact points of each of pushbutton sections 185–4 and 186–4. The other lower contact point of pushbutton section 185–4 is connected to the $S_{b_3}$ signal conductor, while pushbutton section 186–4 has its other lower contact point connected to the $Z_{b_3}$ signal conductor.

The output signal of circuit 300 is further applied to one input terminal of a two terminal "and" gating circuit 306, the other input terminal thereof being connected to signal $d$ conductor. The output terminal of circuit 306 is coupled serially through the upper contact points of pushbutton sections 185–5 and 186–5 to appear both as a signal designated $Z_{b_2}$ as well as being applied to the remaining input terminal of "or" circuit 296.

The output signal of "or" circuit 296 is applied, along with signals $cl$ and $d$ to a triggering "and" circuit 308 whose output signal is applied to the $Z_d$ input conductor of flip-flop D. Finally, the complementary timing signal $cl'$ is applied to the $Z_c$ input conductor of flip-flop C.

Referring now to FIGURE 18 there is illustrated the gating circuitry associated with precessing flip-flop B, the long channel record flip-flop M, and the summation $dy$ flip-flop S. Signals $S_{b_1}$, $S_{b_2}$, and $S_{b_3}$ are applied to the three of the respective input terminals of a four terminal "or" gating circuit 310. Signals $i$ and $j$ are applied to the two input terminals of an "and" circuit 311 whose output signal, in turn, is applied to one input terminal of each of two terminal "and" gating circuits 312 and 313, as well as a five terminal "and" circuit 314. Signal $d'$ is applied to the remaining input terminal of circuit 312 with the output signal thereof being applied to the movable switch arm within a compute operation switch section 179–22. The $O_5$ contact point therein is coupled to the remaining input terminal of "or" circuit 310, the output signal of circuit 310 being applied with signals $cl$ and $b'$ to the input terminals of a three terminal triggering "and" gating circuit 316. The output terminal of circuit 316 is coupled to the $S_b$ input conductor of flip-flop B.

Signal $d$ is applied to the other input terminal of circuit 313, the output terminal of circuit 313 being connected to the movable switch arm of an operation switch section 179–23, the $O_5$ contact point therein being connected to one input terminal of a five terminal "or" gating circuit 317. Signals $Z_{b_1}$, $Z_{b_2}$, $Z_{b_3}$ and $Z_{b_4}$ are applied to the remaining four input terminals of circuit 317, the output signal thereof being applied along with signals $b$ and $cl$ to the three input terminals of three terminal triggering "and" gating circuit 318. The output terminal of circuit 318 is, in turn, connected to the $Z_b$ input conductor of flip-flop B.

Signals $b$, $l$, $t'$ and $a'$ are connected to the movable switch arms of register operational switch sections 180–7, 180–8, 180–9 and 180–10, respectively. The $y$ contact point of switch section 180–7 is connected to another input terminal of circuit 314 with the $dx$, $dy$ and $r$ contact points of section 180–8 being connected to another input terminal circuit 314. In the same way, the $y$ and $r$ contact points of each of sections 180–9 and 180–10 are connected to the final two input terminals of circuit 314, respectively. The output terminal of circuit 314 is connected to the movable switch arm of a compute operation switch section 179–24, the $O_3$ contact point therein being connected to one input terminal of an eight terminal "or" gating circuit 320. Signals $S_{m_1}$, $S_{m_2}$, $S_{m_3}$, $S_{m_4}$ and $S_{m_5}$ are applied to the next five input terminals of "or" circuit 320.

Signals $l$ and $s'$ are applied to the two input terminals of an "and" circuit 321 whose output signal, in turn, is applied to one input terminal of an "or" circuit 322. The two input terminals of an "and" gating circuit 323 are connected to the signal $l'$ and $s$ conductors with the output terminal thereof being connected to the other input terminal of "or" circuit 322. The output conductor of circuit 322 is connected to one input terminal of each of the "and" gating circuits 324 and 326. An "and" gating circuit 327 receives as input signals, the $i$, $j'$, $t'$ and $a'$ signals with its output signal being applied to the other input terminal of circuit 324 as well as to one input terminal of each of two terminal "and" gating circuits 329 and 330. Signals $i$, $j'$ and $t$ are applied to the input terminals of an "and" circuit 328, the output signal thereof being applied along with signal $b'$ to the two remaining input terminals, respectively, of "and" circuit 326. The output signals of circuits 324 and 326 are applied to the movable arms of compute operation switch sections 179–25 and 179–26, respectively, the respective $O_5$ contact points therein being coupled to the two remaining input terminals of "or" circuit 320.

The output signal of "or" circuit 320 and timing signal $cl$ are applied to two of the input terminals of a three terminal triggering "and" gating circuit 332, its remaining input terminal being connected to one of the lower contact points of clear pushbutton section 182–4, the other lower point thereof being connected to the $E_3$ terminal. The output signal of circuit 332 is applied to the $S_m$ conductor of flip-flop M, with the complementary timing signal $cl'$ being applied to the $Z_m$ input conductor thereof.

Signals $d$ and $l$ are applied to the two input terminals of an "and" circuit 334, the output signal of which is applied to one input terminal of an "or" circuit 335. The input terminals of an "and" circuit 336 are connected to the signal $d'$ and $l'$ conductors with the output signal thereof being applied to the other input terminal of circuit 335. The output terminal of circuit 335 is connected to the remaining input conductor of "and" circuit 329, the output signal thereof being applied to one input terminal of a three terminal "or" gating circuit 338, the remaining input terminals thereof being connected to the $S_{s_1}$ and $S_{s_2}$ conductors. The output signal of circuit 338 along with signals $cl$ and $s'$ are applied to the three input terminals of a three terminal "and" triggering circuit 339 whose output terminal is, in turn, connected to the $S_s$ input conductor of flip-flop S.

Signal $l'$ is applied to the other input terminal of "and" circuit 330, the output terminal thereof being coupled to one input terminal of a four terminal "or" gating circuit 340. Conductors $Z_{s_1}$, $Z_{s_2}$ and $Z_{s_3}$ are connected to the three remaining input terminals of circuit 340, the output signal of circuit 340 being applied along with signals $s$ and $cl$ to the three input terminals of a final three terminal triggering "and" gating circuit 342. The output signal of circuit 342 is applied to the $Z_s$ input conductor of flip-flop S.

(5) MEMORY INFORMATION ARRANGEMENT

Turning now to FIGURE 19, there is schematically illustrated the arrangement of information on both short and long channels considered in conjunction with the timing track information. Considering first the timing data, as was previously stated in connection with FIGURES 5 and 6, such information comprises an endless series of permanently recorded cells of magnetic polarization around the circumference of the drum, adjacent cells having oppositely directed magnetic alignments of their individual magnetic particles, the alignments being parallel to the direction of drum travel. As was also demonstrated, each consecutive pair of such cells produced an adjacent low and high voltage level in signal $cl$, termed a timing interval. Now, since only a single binary one value may be represented on an information channel during one timing interval, it is apparent that each recorded binary one value corresponds to a pair of oppositely aligned areas or cells on the timing track. Thus, for convenience, if the length along an information channel utilized to represent magnetically a single binary bit of information is termed a space, then each pair of alternately aligned cells or areas on the timing track will correspond to, as defined, a single space.

Timing channel 62 is preferably 1680 spaces in length in the present analyzer and hence will, during each single memory drum revolution, produce in timing signal $cl$, 1680 consecutive timing intervals. The short channel contains, in the present analyzer, 40 cells representing 40 bits of binary information, and, consequently, only a relatively small arcuate length around the drum need be utilized therefor, it being, as is indicated, 40 spaces in length between its respective "read" and "write" points. Thus, upon recirculation, each cell after being written will reappear at the "read" point 40 timing intervals later. The remaining unused portion of this short channel during the period indicated by FIGURE 19, that is that portion of the channel between the "read" and "write" points in the designated direction of track travel is termed the non-working arc and is 1640 spaces in length. The previously mentioned continuous erasure of the channel information is performed in this non-working portion at the point designated.

The long information channel, as stated before, is divided into twenty sections arranged serially between "read" and "write" points. Each section has a capacity for storing 80 binary bits of information and hence occupies 80 spaces on the channel, thereby making a total channel length of 1600 spaces. Accordingly, 1600 timing intervals are required between the recording of a cell representing a given binary bit and its reappearance at the "read" point or, considered differently, the total recorded information makes one complete recirculation each 1600 timing intervals. The remaining portion of the long channel during the period indicated by FIGURE 19, that is, that portion of the channel between the "read" and "write" points in the designated direction of travel, is the non-working arc and is 80 spaces in length. The erasure takes place within this portion as similarly described for channel 58.

Although the "read" and "write" points along the short channel are here illustrated as being 40 spaces apart, in actual practice however, a slight shortening of this length will be required owing to the delay afforded each "read" binary digit, as will be recalled from the "read" circuitry description by its being passed serially through flip-flop E. This delay will be as seen by reference again to FIGURE 10, of substantially ¾ of a timing interval measured between each value appearance in flip-flop E and its subsequent appearance in signal $a$. This delay, in turn, corresponds to ¾ of a space measured around the periphery of the drum. Thus, since the total information to be recorded and recirculated is only 40 digits in length, it is necessary to shorten the physical spacing between the "read" and "write" points on the short channel an amount corresponding to this ¾ of a space leaving then, an actual distance between the "read" and "write" points of approximately 39¼ spaces. In the same way, owing to the similarity of the long channel "read" circuitry to the "read" circuitry associated with the short channel, the working arc on the long channel will be, in practice, approximately 1599¼ spaces in length.

Referring now to FIGURE 20, there is illustrated the individual space contents of a typical section of the long channel as well as the space contents of the short channel during its two complete recirculations during the appearance of this typical section. These two short channel excursions take place, as stated before, owing to its being one-half the length of a single long channel section. By way of example then, the seventh long channel corresponding to the seventh integrator section is illustrated, it being represented during successive timing intervals by the contents of read flip-flop L, or signal $l$, with the contents of flip-flop A or signal $a$, simultaneously representing the short channel information. Also illustrated are the consecutive spaces, as defined, of the timing signal channel, each space containing a magnetized cell representing binary digit 1 therein to indicate one complete timing interval. Likewise included, are the contents of flip-flop T, represented by signal $t$, flip-flop T, as before stated, being operated as a single stage binary counter to count alternate 0 and 1 timing intervals of signal $cl$. As will be noted, the space values represented by the timing signal, the flip-flop T contents, the flip-flop A contents, and the flip-flop L contents, are arranged vertically with respect to each other such that, for any interval, all four values may be simultaneously considered.

Considering first the short channel, the information recorded therein represents, at any instant, the most recently produced output $dz$ values resulting from the integrations performed in the various integrator sections of the analyzer of the present invention. Stated differently, the short channel constitutes what may be termed a $dz$ register for storing the most recent $dz$ output bits, as shown in FIGURE 1, for all of the integrator sections. Now, the first cell of the $dz$ register appearing concurrently with the first space of each long channel section, is of a binary one value, termed the $m$ mark and always will be recognized since it will appear during a signal $t=0$ interval, each of the other $t=0$ interval cells of the $dz$ register always being of a binary zero value, as represented in FIGURE 20 by ".". In the remaining twenty consecutive $t=1$ spaces of the $dz$ register, are found recorded cells representing the consecutive $dz$ output values of the consecutive integrator sections, each space number corresponding to the number of its associated integrator section. In particular, the cell following the $m$ mark is designated 5 and hence represents the 5th integrator section's most recent $dz$ output value with the next following $t=1$ cell retaining the most recent $dz$ value of the 4th integrator section. This continues until the 1st $dz$ section value appears followed by, as indicated, the 20th section value and from there consecutively down through the 6th integrator section value, it appearing just prior to the second $m$ mark appearance during this recirculation of the 7th long channel section.

At this point, it is well to recall from the previous description of the "read" and "write" circuitry, a full timing interval is required for the serial transfer of the contents within a first flip-flop into a second flip-flop since the particular output signal of the first flip-flop having a high output voltage level, in remaining high for a timing interval serves with the high voltage level in signal $cl$ during the last half of the interval to charge up the corresponding input capacitor of the second flip-flop. Then, upon change of the timing signal to its low voltage level, at the beginning of the next interval, the actual triggering of the second flip-flop is accomplished and the transfer completed, the resulting delay between the transfer obviously being a full timing interval. Thus, if information were recirculated directly from flip-flop A to flip-flop C, each signal appearing in flip-flop A during a $t=0$ interval will appear in flip-flop C and, hence be recorded, during a $t=1$ interval. In the same way, each $t=1$ signal in flip-flop A will appear in and be recorded by flip-flop C during the following $t=0$ interval.

It is also desirable to note at this time that during certain periods of operation, the $dz$ register information is precessed that is, the pulses appearing during $t=1$ intervals in signal $a$ are stepped serially from flip-flop A to flip-flop B, remain inactive in flip-flop B for one timing interval and are then stepped from flip-flop B to flip-flop C for recording. Accordingly, the pulses will appear in flip-flop B for the next $t=0$ and $t=1$ intervals and then be recorded by flip-flop C during the next following $t=0$ interval. On the other hand, the $t=0$ pulses of signal $a$ are jumped immediately to flip-flop C for recording during the next $t=1$ interval. Since the $m$ mark occurs when $t=0$ it is seen that this precession process effectively displaces, in a lagging direction, by two spaces each numbered $dz$ square relative to the $m$ mark and hence gives the appearance of jumping ahead, so to speak, the $m$ mark relative to the remaining $dz$ information. Although an actual precession example is later set forth, the results thereof are exemplified in the second $dz$ register appearance in this FIGURE 20 where, as seen, the $dz$ output value of the 6th integrator section follows the $m$ mark rather than the 5th section value as was the case for its preceding excursion. In successive $t=1$ spaces to the left thereof are found the 5th, 4th, etc. through the 1st, and then from the 20th through the 7th section's output $dz$ values.

This change of relative information placement may be most readily understood by recalling, first of all that the $dz$ register is only 40 spaces in length, and hence each value, one interval following its appearance in flip-flop A, will be recorded by flip-flop C and thus appear again only 40 timing intervals later in signal $a$. Accordingly each space content in the second $dz$ register appearance is actually being recorded immediately after its appearance in flip-flop A during the first $dz$ register recirculation. Now, by precessing the information during its first recirculation excursion, the above noted change of relative information placement becomes effective and is observed during the second illustrated appearance of the $dz$ register. As should also be here noted, during the recirculation or recording of this $dz$ register during its second appearance, it is not precessed, that is, it is transmitted directly from flip-flop A to C and hence will appear during the recirculation of the first half of the following or 8th long channel section with the same form as illustrated here.

By precessing the information stored in the $dz$ register during its first passage during each integrator section appearance, and recirculating the $dz$ information without change during its next or second passage, it is evident that the information placement relative to the $m$ mark on the short channel will be different for each long channel section appearance. Furthermore, since twenty sections are employed with twenty corresponding precessions of the $dz$ line for each single turn of the long channel, the relative $dz$ information placement will always be constant for any given long channel section since, recalling the 40 space $dz$ length, the $m$ mark is effectively "jumped" over two spaces during each precession. In this way, as will be seen later, the output $dz$ value of each integrator section, it comprising the overflow or carry digit emanating from the $r$ register thereof, may be very readily disposed in the integrator section's corresponding space in the $dz$ register and hence eliminate any necessity for special storage devices before the informational bit may be placed in the short channel.

As will also become more evident later, the $dz$ value in the numbered 6 space following the second $m$ mark appearance represents the most recent $dz$ value produced just prior to this seventh section appearance by the sixth section while the numbered 6 space value immediately preceding this $m$ mark represents the old $dz$ value produced by the sixth section during the previous long channel excursion.

Considering now the seventh section of the long channel, the first space of the seventh section is reserved for the before mentioned fiducial or T* mark, represented by a binary one value appearing in signal $l$ concurrently with the $m$ mark during a $t=0$ interval. This T* mark will be found in the first space of only one of the twenty long channel sections at any given time, each of the remaining sections having a zero binary value cell recorded therein, the section containing the mark being indicated by pointer 189 of indicator mechanism 187, previously shown in FIGURE 11. This T* mark permits the beginning space of the particular section in which it located to be immediately recognized by the computer circuitry upon each recirculation of the section with the result that, during the fill operation, for example, the registers of that section may have their initial values recorded in. Furthermore, during the compute operation, the registers of the section containing the T* may be readily examined as to content owing once again to the fact that that section may be recognized during its recirculation cycles.

For the next 40 spaces following the fiducial mark space are found, in interplexed form, the consecutive $dx$ and $dy$ code register spaces, the $dy$ code space contents appearing during consecutive signal $t=0$ intervals with $dx$ code space contents appearing during consecutive $t=1$ intervals. In particular, the pair of $dx$ and $dy$ code spaces immediately following the T* mark space, are each designated 5 to correspond to the 5th integrator section output value represented in the space immediately following the $m$ mark in the $dz$ register. In the same way, the next pair of $dx$ and $dy$ code spaces are numbered 4 to correspond to the 4th section value represented in the next $t=1$ space of the $dz$ register. In the same way, the remaining numerical designations given the $dx$ and $dy$ code spaces may be readily understood.

Binary value representations are initially placed in each space of the $dx$ and $dy$ registers prior to the actual operation of the machine and will remain fixed throughout the solution of any particular problem. Briefly, all $dy$ code spaces of each long channel section which contain a binary one valued cell are associated with the output values, as represented in the $dz$ spaces, of other integrator sections whose $dz$ output values are to be used as the $du(v, dv)$ input function, as in FIGURE 2, and subsequently accumulate in the section's $y$ register as the $u(v)$ function. In other words, the information stored in the $dy$ register of each long channel section is actually code data indicating which of the output data from the other integrator sections, as stored in the $dz$ register, is to be applied as the $dy$ input to the $y$ register of that section, as shown in FIG. 1. All zero valued $dy$ cells cause their corresponding $dz$ space contents to be ignored insofar as that particular integrator section's operation is concerned. As an example of this procedure, integrator section 34 in FIGURE 3 would have a one cell placed in its $dy$ register spaces corresponding to the $dz$ output values of integrator sections 35 and 39 which, as shown, furnish the $dy$ input information thereto.

In the same way, the contents of the $dz$ spaces corresponding to $dx$ code spaces having binary one valued cells determine whether the $y$ number is added to or subtracted from the $r$ number during the remaining time of the section's recirculation. In other words, the information stored in the $dx$ register of each long channel section is actually code data indicating which of the output data from the other integrator sections, as stored in the $dz$ register, is to be applied as the $dx$ input to the transfer medium, as shown in FIG. 1. For example, returning to FIGURE 3 again, $dx$ code values would be present in the spaces of the $dx$ register of integrator section 35 corresponding to the $dz$ output values of both integrator sections 36 and 37 to thereby represent the $-dv$ input function values.

Following the 40 interplexed $dx$ and $dy$ registers of each long channel section are found the $r$ and $y$ registers, also in interplexed form, and having a combined length of 39 spaces. In particular, the first $r$ register space following the final $dy$ space is designated 0, the next adjacent pair of $y$ and $r$ space contents each being designated 1, and the consecutive $y$ and $r$ space pairs being progressively higher numbered with the final $r$ and $y$ space pair being designated 19. The $y$ register contains the cells representing the $y$ number and its sign, as mentioned previously in connection with FIGURE 1, the sign being represented the $y-19$ space with consecutive lower place digits of the $y$ number being represented in the consecutive spaces to the right thereof. Since the binal point is assumed to exist between the $y-19$ and $y-18$ spaces, the cell appearing in the $y-18$ space represents the halves place digit of the $y$ number with the cell in the $y-17$ space representing the fourths place value, and so forth. In the same way, the most significant digit of the $r$ number, is represented in the cell in the $r-19$ space with the consecutive $r-18$, $r-17$ etc., spaces to the right thereof containing cells representing consecutively lower valued place digits thereof.

The designations herein given for the $r$ and $y$ number spaces in this seventh long channel section are the same in all sections since no direct operational relationship exists between them and the $dz$ register values. This, it will be noted, is in contradistinction to the relative $dx$ and $dy$ code spaced designations which will change from section to section in accordance with the changes in the informational relationship found in the $dz$ register.

It can now be seen how the specific integrator sections of FIGURES 1 through 3 are embodied in the analyzer of the present invention. More particularly, both the $r$ number register and the $y$ number register of FIGURE 1 are actually interplexed spaces of one section of long information channel 54, with the information therein being read out by read unit 52 and flip-flop L and new information being written therein by flip-flop M and write unit 53. The input information to the integrator section, that is the $dx$ and $dy$ information shown in FIG- URE 1, is actually stored in the *dz* register or short information channel 58 having associated therewith read unit 56 and flip-flop A for reading information from this channel, and write unit 57 and flip-flop C for writing new information therein. In order to introduce the *dx* and *dy* information into the integrator section of FIGURE 1, the long channel section associated therewith is also provided with interplexed *dx* and *dy* code registers which contain, respectively, *dx* and *dy* code information enabling the integrator section to pick out and operate upon the associated information.

In the description of the integrator section of FIGURE 1, it was stated that the *y* number register performed the the counting function, that is combined the *y* number with *dy* number, and that the *r* number register performed the accumulation function, that is combined the *r* number with either the old or new *y* number and produced a signal representing the overflow digit from such combination. On the other hand, in the analyzer thus far described none of these functions either is or can be performed by the *r* and *y* number of registers per se. As will be described in greater detail below, all of the functions of counting, accumulating and overflow generation are actually carried out by the diode gating circuits described in FIGURES 14 through 18 under the control of programming flip-flops I, J and D and operation control switches 177, 179 and 180. Similarly, although the transfer medium between the *r* and *y* number registers was described as a separate entity in FIGURE 1, it also is a part of the gating circuits previously referred to. In order to point out the structure for performing all of these functions and to permit more complete understanding of the analyzer of the present invention, detailed consideration will now be given to the various operations and suboperations of the analyzer.

(6) OPERATION: GENERAL

Before actually utilizing a digital differential analyzer for obtaining the approximate solution of a given differential equation, certain preliminary steps are required in order to transform the equation into a form suitable for insertion into and use by the analyzer. For example, the equation should first be coded such that the interconnecting input and output loops between the various integrator sections required for the equation are established. Coding is broadly exemplified in FIGURE 3 wherein one possible set of interconnections between integrator sections is set forth for the particular equation given there by way of example.

Once the coding has been completed, the problem should then be scaled in accordance with a pair of scaling equations, the use thereof being determined primarily by the accuracy of solution desired which, in turn, will basically determine the magnitudes of the various *y* numbers. Consideration should be given in the scaling operation so that the *dz* or, from FIGURE 2, the $u(v)dv$ output values of all integrator sections which are applied to the same *y* or counting register of a given integrator section have the same relative magnitudes. In the same way, the initial values of the equation should be determined to be later placed in the proper *y* and *r* registers of all integrator sections required in obtaining the solution. Additionally, consideration should be given to the fact that a normal *y* register overflow, produced by the *y* number therein exceeding in magnitude its capacity, should be avoided in order to eliminate the ensuing automatic compute operation stoppage and necessity of re-scaling the problem. As will be noted later, in some cases this overflow may be utilized in securing values of the solution after generations of predetermined numbers of *dx* or independent variable increments or may be used to stop the machine after the region of interest in the solution has been passed.

The methods employed for coding and scaling differential equations for solution by digital differential analyzers are comparatively well known, there being publications and articles on the subject. Accordingly, since the manner of coding and scaling the present digital machine will be similar to that previously established for the "Maddida" type of analyzer, no detailed explanation thereof is presented in the present disclosure.

Assuming now, that a particular problem has been coded and scaled, with the number of integrator sections required being known, the particular informational interconnections between the various integrator sections as well as the initial values to be placed in the registers of each section being also known, to transfer into the machine and subsequently solve such a problem involves the sequential performance of a series of operations or steps, each of the operations, except the first, being determined by the various operation switch settings and initiated by depression of either the 1 or 0 pushbutton. Briefly, the first step or clear operation involves completely erasing or clearing the information on both long and short channels, represented by all zero valued cells thereon, this result being obtained by depressing "clear" pushbutton 182 on front panel 175, as illustrated in FIGURE 11. In addition to the erasure result, depression of the clear button also causes the later described programming flip-flops I, J, and D to be each zeroed, their resulting conduction state sequence being entitled the idle program.

Next, with both information channels cleared, a mark operation, so named, causes the *m* mark to be recorded on the short channel during a signal $t=1$ interval such that it will then always reappear in the A flip-flop during $t=0$ intervals, as shown in FIGURE 20. A single T* mark is next automatically recorded during the mark operation concurrently with a re-recording of the recirculating *m* mark such that during subsequent recirculation times, the *m* and T* marks will appear simultaneously in the A and L flip-flops, respectively. Also, this T* mark will, by definition, appear in the first space of the long channel section indicated by pointer 189 of indicator 187.

Next, in accordance with the coding and scaling data previously derived, the *dx, dy, r* and *y* registers of the particular long channel section containing the T* mark are sequentially filled during, as designated, a fill operation, the filling being done by manually pressing in proper sequence the 1 and 0 pushbuttons on the front panel after proper setting of the front panel operation switches. Then, the fiducial mark may be shifted during, as designated, a shift operation by rotating knob 190 of the indicator mechanism to another long channel section to be used, again indicated by pointer 189, with the *dy, dx, r* and *y* registers of that section being at that time filled, again during a fill operation.

These alternate filling and shifting operations continue until each of the required long channel sections has been filled, at which time in accordance with a new arrangement of the operation switch positions, the actual computing operation may be started. This compute operation will then continue with no further attention on the part of the operator until either stopped by depression of halt button 184 or until the *y* register in any section overflows. In either case, the compute operation is automatically halted and the information arrangement in both channels is maintained without change by a normal recirculation thereof.

Considering now some broad principles involved in the present computer's operation as related to each of the above noted operations, it will be recalled from the description of memory operation that the informational bits on each information channel are recirculated and appear simultaneously, digit by digit, in electrical form as the respective A and L "read" flip-flop contents. Accordingly, all data manipulations performed within and between the various integrator sections must take place on a digit by digit basis during their serial appearance in electrical state external from the memory. The particular operation performed on each recirculating digit is determined during the time of its passage by two major entities, namely, the particular front panel switch and pushbutton positions and the conduction state sequence of programming flip-flops I, J and, at specified times, flip-flop D. This is true since, as will be more clear later, the sequence of programming flip-flop conduction states serves, at any instant, by use of the diode gating circuitry, to determine the triggering functions performed by the other analyzer flip-flops with each usable combination of switch positions, in turn, serving to apply their conduction state in different arrangements to these flip-flops to accordingly provide different triggering functions therefor.

Also, for each switch position combination, and hence for each operation, the programming conduction state sequences will undergo successive changes such that each operation will have in effect a plurality or series of successively occurring different sequences, with each sequence being automatically generated from the previous one by the occurrence of a predetermined value combinations of the recirculating information, such as a $m$ mark appearance, or simultaneous $m$ and $T^*$ mark appearances. Thus, for each usable switch combination, the recirculating information itself will cause a series of successive programming flip-flop conduction state sequence changes to occur, each sequence of states, in turn, determining in conjunction with the switch settings, the type of operation, termed sub-operation, performed at that time on the information. By having approximately the same series of programming state sequences for each of the above operations, except the clear one, it is possible to achieve a considerable saving in the total number of diodes required in the gating network since a large number of them may be used in more than one operation by the expedient of having them switched by means of the operation switches to different electrical positions in the gating network.

The principle of programming conduction state sequences and switch settings to achieve different computer operations and sub-operations is more clearly exemplified in the so-called flow diagram chart illustrated schematically in FIGURE 21. In this figure are set forth again, in the schematic fashion, the three operational switches 179, 177 and 180, the 1, 0 and halt pushbutton positions, and, finally the various sequences of programming tube conduction states for each of the computer operations, except the clear one. Although the series of sub-operations and hence the series of programming tube conduction state sequences constituting each major operation will be set forth in more detail during detailed individual discussions of them, it is well to note at this point that two conduction state sequences are completely independent of the switch contact positions and are accordingly common to all major operations. These two independent sequences are entitled the Idle, as illustrated in block 350 of FIGURE 21 and the Dawdle in block 352. In particular, the Idle program is represented by each of the I, J and D programming flip-flops being at its low conduction level with their resulting output signals $i$, $j$ and $d$ representing the binary digit value sequence of 0, 0, and 0, respectively, as indicated by 000 in the Idle block. The remaining common Dawdle program is exemplified by signals $i$, $j$, and $d$ being representative of binary values of 0, 0 and 1, respectively, as indicated by 001 in block 352. This Dawdle program is always automatically switched or transformed, in a manner to be later described in more detail, into the Idle one only upon both 1 and 0 pushbuttons being simultaneously in their normally up position, as is indicated by their series connection between the two blocks. Each of the major operations is initiated from the Idle program, as by a pushbutton depression or rotation of knob 190, with the first of the series of programming sequences, constituting that operation, being transformed directly out of the Idle program. Also, upon completion of the final sub-operation in each major operation, the Dawdle program of 001 is generated which will, as above noted, be automatically transformed into Idle.

During the Idle and Dawdle programs, the memory information in both channels is recirculated without change, that is, the signals serially appearing in flip-flops A and L are transferred directly without change to record flip-flops C and M, respectively. In this way, no changes are made in the recirculating information and thus, when the machine is actuated to begin another operation, it will proceed to act on the same information in the channels as existed immediately after completion of the prior operational cycle.

This insertion of the Dawdle program before Idle is desirable in that each individual operation must be completed before initiation of the next since both 1 and 0 pushbuttons must be in their up position prior to Idle program attainment. In this way, possible computational errors are eliminated by requiring electronically, the full completion of each major operation.

(7) OPERATION: CLEAR

The clear operation, as before stated, is independent of the front panel switch positions and is effected by manual depression of clear pushbutton 182 on front panel 175. This actuation causes two simultaneous functions to be performed by the computer, the first being, as before mentioned, complete erasure of both information channels. This is accomplished, as will be seen from FIGURE 17, by the shorting contact arm in clear switch section 182–3 applying the 100 volt or $E_3$ terminal voltage level to its corresponding input terminal of "and" gating circuit 305 connected to the $S_c$ input conductor of "record" flip-flop C. During the time of this application, the output signals of circuit 305 will be at the same low voltage level and hence will effectively prevent any triggering signals being applied to this "record" flip-flop on its set of $S_c$ input conductor. On the other hand, since only the primed clocking signal $cl'$ is applied to the $Z_c$ input conductor and since signal $cl'$ remains high for half of each timing interval, a succession of triggering impulses will be applied through the $Z_c$ input conductor with the result that flip-flop C will be triggered to its low conduction state and signal $c$ will accordingly remain low throughout at least the time that the clear button is in its down contact position. Owing to the continuous low voltage level in signal $c$, the erase polarization will be effective to induce an effective stream of consecutive zero binary digit cells on the short channel representing, as defined, the cleared condition.

In the same way, referring briefly now to FIGURE 18, the clear pushbutton section 182–4 will apply, during the time of the clear pushbutton depression, a low voltage level to "and" circuit 332 and hence prevent flip-flop M from receiving any triggering impulses on its $S_m$ conductor. At the same time, owing to signal $cl'$ being applied to the $Z_m$ input conductor, flip-flop M will be immediately triggered to its low conduction level and remain there during the time of the depression. This, as formerly, causes the zero bias value normally applied to the long channel by the erase head to pass unchanged past the M flip-flop with the ensuing result that the long channel accordingly takes the magnetic zero valued binary state. It will be here noted that since the long channel will recirculate in slightly less than 1/30 of a second, the clear pushbutton and its corresponding relay should remain actuated for at least that interval of time.

The second and other important function accomplished by depressing the clear pushbutton is that of directly zeroing programming flip-flops I and J, if either or both, preceding this clearing operation, are at their set state. These flip-flops, when zeroed, automatically cause the zeroing of flip-flop D to thereby produce, in combination, the before mentioned Idle program. Considering first, the zeroing of flip-flop I, as in FIGURE 14, it is seen that one input terminal to the $Z_i$ triggering gating circuit 222 is connected serially with clear pushbutton section 182–1 and with the clear pushbutton depressed, only signals $i$ and *cl* are applied to circuit 222. Stated differently, with clear pushbutton section 182–1 depressed, the input terminal of triggering gating circuit 222 which is connected thereto is effectively open circuited and, as can be seen by reference to "and" gating circuit 140 of FIGURE 9, the diode associated with this terminal is ineffective in controlling the operation of gating circuit 222. Accordingly, with clear pushbutton section 182–1 depressed, gating circuit 222 is operative as a two-terminal triggering circuit responsive only to signals $i$ and *cl*. Hence, if flip-flop I is initially in its high conduction state, then signal $i$, in being high, will cause a triggering signal to be applied to this zeroing terminal with the result that the flip-flop's conduction state will be reversed with signal $i$ accordingly representing the 0 binary value. In the same way, if flip-flop J is initially high, then, as will be seen by reference to FIGURE 15, the clear pushbutton section 182–2 will effectively disconnect one input terminal of the zeroing gating circuit 232 with the result that gating circuit 232 will be operative as a two-terminal circuit and the other signals $j$ and *cl* applied thereto will effectively trigger flip-flop J to its low conduction level with signal $j$ being consequently representative of binary value 0.

The Idle program is completed with the zeroing of flip-flop D which is automatically accomplished after signals $i$ and $j$ have attained, in the manner explained above, their low voltage levels. Thus, from FIGURE 17, signals $i'$ and $j'$ are applied to "and" circuit 300, the output signal of which is applied along with signals $d$ to "and" circuit 306. The output signal of circuit 306 is applied, through 1 and 0 pushbutton sections 185–5 and 186–5, respectively to "or" gating circuit 296 and from there to the $Z_d$ input triggering "and" circuit 308 along with signals $d$ and *cl*. Thus, when signals $i'$ and $j'$ are each high, representing signals $i$ and $j$ equal to 0 and 0, respectively, and flip-flop D is in its set state, then a triggering signal will be applied to this $Z_d$ conductor and flip-flop D will accordingly have its conduction state reversed such that signal $d$ becomes low or representative of binary value 0. With this accomplished, then the conduction state of flip-flops I, J and D are representative of 0, 0, and 0, respectively, and hence the Idle program of block 350 of FIGURE 21 is attained.

As stated previously, at the conclusion of each major operational cycle, the Dawdle program of 001 is generated and this Dawdle program in turn is automatically changed into the Idle program of 000. It is seen, from the circuit as traced above, that whenever the $i$ and $j$ are representative of binary values 0 and 0, respectively, signal $d$ represents 1, and both 1 and 0 pushbutton sections 185–5 and 186–5 are in their up position, then a triggering signal will be passed from "and" circuit 306, through "or" circuit 296, and "and" circuit 308 to the zero terminal of D flip-flop.

It should also be noted at this point that flip-flop B is likewise zeroed during this clearing operation although no special attempt is made to accomplish this result. This zeroing signal is received from the $Z_{b_2}$ conductor in FIGURE 18 which, in turn, is connected through sections 185–5 and 186–5 to the output terminal of "and" circuit 306 of FIGURE 17.

(8) OPERATION: MARK

After both channels have been cleared, the next step in solving a given problem is to record the *m* and T* marks on the short and long channels, respectively. This is accomplished by throwing the movable switch arms of switches 179, 180 and 177 to engage the $O_3$, *dy*, and $O_2$ contact points, respectively, as in FIGURE 21. With this switch position combination, the Idle program of block 350 is maintained with the information on both channels, comprising, all zero values, being recirculated, the mark cycle being started by either the 1 or 0 pushbutton, indicated by 185 and 186, respectively, in FIGURE 21, being pressed to its down contact position.

With this done, then, during the next occurring $t=1$ timing interval, the order to set flip-flop I is generated, as will be seen by reference to FIGURE 14, by signals $d'$, $j'$, $t$, $i'$, and *cl* being applied through the various switch sections and gating circuits to the final clock triggering circuit 219. The expressions, "order to set" or "order to zero" a designated flip-flop "is generated," extensively used herein, signifies that during the stated timing interval, each of the signals applied to the final "and" triggering circuit for the given flip-flop input conductor will be at its high voltage level with the result that the flip-flop will be triggered into the designated conduction state at the beginning of the next interval. Thus, the order to set flip-flop I, as generated during a $t=1$ interval, is effected at the beginning of the next or $t=0$ interval and the program 10X of the block 353 is obtained. As will be readily apparent, since during the Idle program, signals $i$, $j$ and $d$ were each at their low voltage levels, the $i'$, $j'$, and $d'$ signals must be used for the gating circuits since they, in turn, would each be at their high voltage level and hence capable of raising the "and" gating circuits to which they are applied. The X in block 353, representing the flip-flop D conduction state signifies that it is no longer used, during this sub-operation, as a programming means and hence its conduction state takes no part in determining the computer's operation.

During this $t=0$ interval, two orders are simultaneously generated by the diode gating network, these being (1) Set flip-flop J, and
(2) Set flip-flop C.

The circuitry forming order (1) above, may be traced in FIGURE 15 where signal $i$ is applied through the $O_2$ switch contact position of mark operation switch section 177–3 to circuit 229. Also applied to circuit 229 are signal $j'$, signal $t'$ through mark operation switch section 177–5, and finally timing signal *cl*. It should be noted that even though circuit 229 has seven input terminals three of these terminals are open-circuited during the mark operation. More particularly, during the mark operation mark operation switch sections 177–2, 177–4 and 177–6 and their associated input terminals remain open and circuit 229 is operative as a four terminal circuit having signals $i$, $j'$, $t'$ and *cl* applied thereto. Thus, since each of these signals will be high during tthis $t=0$ interval, circuit 229 is effective at the end thereof, owing to the normal switching of *cl* to its low level, to trigger flip-flop J through its $S_j$ terminals with the result that its output signal $j$ goes high hence making the program at that time 11X, the X again representing that flip-flop D takes no part in the programming sequence.

Order (2) above may be traced circuitwise in FIGURE 17 in which "and" circuit 292 is operative as a three terminal circuit since compute operation switch section 179–17 remains open during the mark operation. Under these conditions, signal $j'$ is applied through section 179–16 to "and" circuit 292, signal $t'$ is applied through mark operation switch section 177–11 and signal $i$ being applied directly thereto. The output signal of circuit 292 is passed serially through mark operation switch section 177–12, "or" circuit 298, and finally to the triggering circuit 305. It should be noted that during all operations but the clear operation, circuit 305 is operative as a two-terminal circuit since clear pushbutton section 182–3 remains open. Thus, the high voltage level of signals $i$, $t'$ and $j'$ will act during this $t=0$ interval to trigger flip-flop C which will, as will be recalled from the description of FIGURES 9 and 10, cause a cell having binary value of one, the *m* mark, to be recorded on the short memory channel at the beginning of the next or signal $t=1$ interval. Since signal $j'$ is set to its low level at the beginning of this next $t=1$ interval, owing to order (1) above, no additional or further triggering of flip-flop C will be produced.

Program 11X of block 354 continues until the *m* mark reappears in signal $a$, it being recognizable therein, as noted previously in connection with FIGURE 20, since signal $a$ will be high or equivalent to binary 1 simultaneously when $t=0$. This $m$ mark appearance is noted in FIGURE 21 by the Boolean expression $a.t'$, signifying signals $a$ and $t'$ are simultaneously high and upon satisfaction of this expression, four orders are simultaneously generated, these being:

(1) Zero flip-flop I,
(2) Zero flip-flop J,
(3) Set flip-flop D, and
(4) Set flip-flop M.

Order (1) above, referring to FIGURE 14, is effected by reason of signals $a$ and $t'$ both high, being applied through "and" circuit 220 to one terminal of "and" circuit 222, the other input signals thereto being $i$ and $cl$. Thus, circuit 222 acts to apply a triggering signal to the $Z_i$ input conductor of flip-flop I with the result that its output signal $i$ returns to its low level equivalent to the zero binary value.

Order (2) above is effected in FIGURE 15 by signals $a$ and $t'$ being applied to circuit 230, the output signal thereof passing through compute operation switch section 179–2 to "and" circuit 231, receiving, in turn, signal $i$ as its other input signal. The other two input terminals of circuit 231 remain open during the mark operation because of the open condition of compute operation switch sections 179–3 and 179–4. The output signal from circuit 231 passes serially through section 182–2, and 184–1 to circuit 232, signals $j$ and $cl$ being also applied to circuit 232. Hence, circuit 232 acts to thereby zero flip-flop J through its $Z_j$ input conductor.

Order (3) above is primarily produced, in FIGURE 17, by signals $a$ and $t'$ being applied through "and" circuit 286 and from there, along with signals $i$ and $j$, to "and" circuit 287, the output signal of which passes through circuits 284 and 288 to the $S_d$ conductor of flip-flop D.

Order (4) above is primarily effected, from FIGURE 17, by signals $a$ and $t'$ being applied to "and" circuit 286, the output signal of which is applied along with signals $i$ and $j$ to circuit 287. The output terminal of circuit 287 after connection through mark operation switch section 177–10 constitutes the $S_{m_3}$ input conductor in FIGURE 18 and, as illustrated, will provide the triggering signal to the $S_m$ conductor of flip-flop M.

This triggering of flip-flop M causes a binary one value, the T* or fiducial mark, to be recorded on the long channel simultaneously as the $m$ mark is rerecorded by flip-flop C on the short channel, the successive signal $a$ values being continuously transferred to flip-flop C during consecutive timing intervals. The completion of the above four orders leaves the Dawdle programming sequence of 001 and this, in turn, is automatically transformed into the Idle program, in the manner before mentioned once the particular pushbutton utilized originally to start the mark operation returns to its normally up position.

(9) OPERATION: FILL

After completing the mark operation, the operator may then proceed to fill the $dy$ register of the long channel section containing the freshly recorded fiducial mark by throwing the movable switch arm of mark operation switch 177 to its Off contact position. Then, the successive numerical values of the space contents of the section's $dy$ register may be inserted by proper sequential depression of the 1 and 0 pushbuttons corresponding to the one and zero binary values, respectively. The first depression, as will be soon understood, should correspond to the value desired for eventual recordment in the $dy$ space just preceding in time the second $m$ mark appearance, with the succeeding depressions serving to sequentially fill in the $dy$ spaces to the right thereof until, finally, the first space following the T* mark space has been filled.

Thus, considering the seventh long channel section shown in FIGURE 20 by way of example, the $dy-7$ space value would be first pressed, followed by the $dy-8$, $dy-9$, etc., on through $dy-20$, $dy-1$, etc. to the $dy-5$ space. The $dy$ code position coinciding with the second $m$ mark in this example the 6th one, must remain blank in order not to be confused with the T* mark and initiate a spurious cycle of operation. Hence, each section is incapable of receiving as a $dy$ input, the $dy$ output of the immediately preceding integrator section. As will be apparent, this feature does not impose a limitation on the machine's operation but rather requires a coding arrangement where any given integrator section does not use the output from the preceding section as one of its $dy$ inputs. As will be shortly observed, one final depression of either button is required to complete this and each $dy$ register filling process.

Each fill $dy$ pushbutton depression occurs while the Idle program is in effect, and upon either pushbutton being depressed its value is initially transferred into flip-flop B as the content thereof. Then, the pushbutton still being in its down contact position, the order is generated to set flip-flop J during the next following simultaneous appearance of the $m$ and T* marks, as indicated by the Boolean expression $a.l.t'$ in FIGURE 21, signifying, in turn, that signals $a$, $l$ and $t'$ are to be simultaneously at their high voltage or binary one value. As a further caution to prevent incorrect entry of desired values, the gating network is so connected that the content of flip-flop B must correspond exactly to the particular pushbutton depressed before the above noted programming change is accomplished.

Assuming then, that the pushbutton depressed and the B flip-flop content are identical, the above-noted programming change is completed at the beginning of the timing interval following the $m$ and T* mark appearance with the fill $dy$ program 10X of block 361 then being in effect. During this program, the combination of switch positions and the sequence of programming flip flop conduction states orders a particular sub-operation or routine, termed fill $dy$, performed by the computer on the recirculating information, which sub-operation will be soon described.

This fill program continues until the next $m$ mark appearance, indicated by the expression $a.t'$, at which time a programming change order to set flip-flop I is generated, which, in turn, will be completed at the beginning of the timing interval following the $m$ mark appearance. This program, entitled "wait" as indicated by 11X in block 362, serves to order another specified sub-operation and will continue until the next $m$ mark appearance, denoting the beginning of the next following integrator section. Upon such an $m$ mark appearance, the programming is ordered changed such that flip-flops I and J become zeroed and flip-flop D becomes set with the result that the Dawdle program of block 352 is in effect. Then, as formerly, upon both pushbuttons attaining their up contact position, the Dawdle program will be automatically switched into the Idle program of block 350 and the computer prepared for entry of the next right $dy$ space value by another pushbutton depression procedure. Each of the remaining pushbutton depressions, corresponding to the remaining $dy$ code values, similarly causes the program to automatically cycle from Idle to $dy$ fill of block 361, to wait of block 362, to Dawdle, and then back to Idle.

Considering now the instructions generated during the fill $dy$ sub-operation of block 361 for both $t=1$ and $t=0$ intervals:

(1) When signal $t=0$, the contents of flip-flops A and B are ordered transferred to flip-flops C and M, respectively, such that, during each $t=1$ interval, the values of signals $a$ and $b$ during the previous $t=0$ interval are recorded on the short and long channels, respectively.

(2) When signal $t=1$, the contents of flip-flops A, B and L are ordered transferred to flip-flops B, C and M, respectively, such that the $t=1$ signal $b$ and $l$ values are recorded during the following $t=0$ intervals on the short and long channels, respectively, while the $t=1$ contents of flip-flop A appear in flip-flop B during the following $t=0$ intervals.

The above two sets of instructions may be summarized as:

(1) During $t=0$ intervals, (A)→(C)
(B)→(M)

(2) During $t=1$ intervals, (B)→(C)
(A)→(B)
(L)→(M)

The instructions generated during the wait $dy$ program 11X of block 362 are:

(1) When signal $t=0$, the contents of flip-flops A and L are ordered transferred to flip-flops C and M, respectively, such that the $t=0$ values of signals $a$ and $l$ are recorded during $t=1$ intervals on the short and long channels, respectively.

(2) When $t=1$, the content of flip-flop A is ordered transferred into both flip-flop B and flip-flop C such that the $t=1$ signal $a$ values appear in and are recorded during the following $t=0$ intervals in signal $b$ and the short channel, respectively. Also, the content of flip-flop L is ordered transferred into flip-flop M such that the $t=1$ values of signal $l$ are recorded on the long channel during the following $t=0$ intervals.

The above two sets of instructions may be summarized briefly as:

(1) During $t=0$ intervals, (A)→(C)
(L)→(M)

(2) During $t=1$ intervals, (A)→(B)
(A)→(C)
(L)→(M)

As is apparent, during both signal $t$ intervals of program 11X, the contents of flip-flops A and L are ordered transferred into flip-flops C and M, respectively, with the result that the information on both channels is recirculated without change. The gating circuitry in FIGURES 14 through 18 for accomplishing the above stated flip-flop triggering operations, both for the memory information rearrangements and for the programming changes may be readily traced from the circuit diagrams in the manner formerly done in detail for the clear and mark operations.

Figure 22:
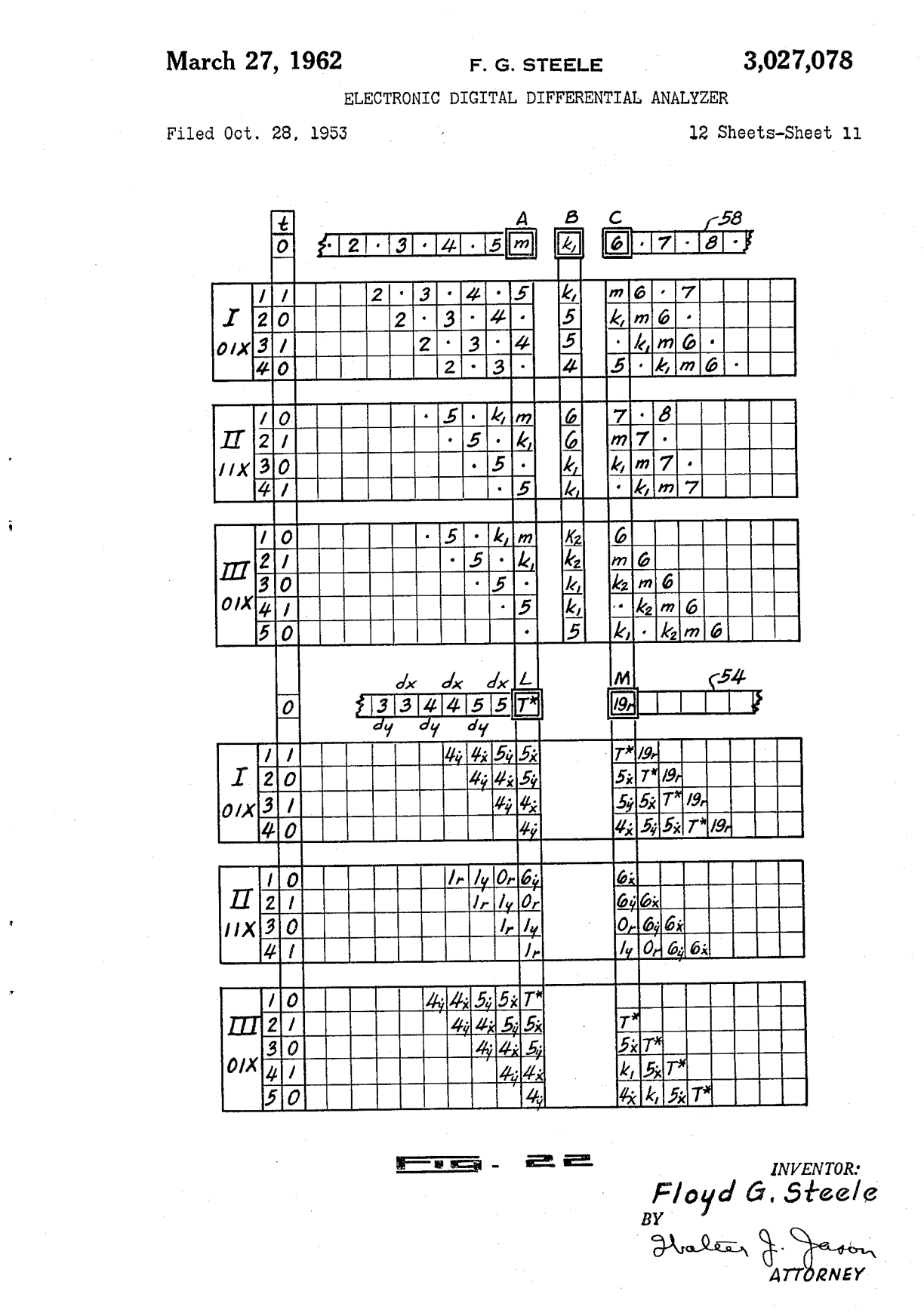

Referring now to FIGURE 22, there is illustrated in schematic form, the information flow of the two channels during portions of a pair of $dy$ fill cycles in order that the principles involved therein may be more readily understood. Channels 58 and 54 are again illustrated with the same binary information arrangement as previously illustrated in FIGURE 20 being contained thereon during, as indicated in the signal $t$ column to the left, the $t=0$ interval that the $m$ and T* marks appear simultaneously in flip-flops A and L, respectively. Assuming now that the particular pushbutton corresponding to the value to be recorded in the $dy-7$ space is in its down contact position, then, during the $t=0$ interval, the fill $dy$ program 01X is ordered generated, the Idle program continuing in effect until the next timing interval. Since the Idle program recirculates the memory, the $m$ and T* marks are transferred through flip-flops C and M, to channels 58 and 54, respectively, as indicated on the top or first line in each of sections I, as they appear under the respective channels. Simultaneously with this occurrence, as noted above, the binary value $k_1$, representative of the particular key pressed, is transferred into flip-flop B, as is indicated by the $k_1$ beneath the flip-flop B column.

Continuing down, on lines 2, 3 and 4 in both sections I, are illustrated the informational manipulations performed during the first three alternate $t=0$ and $t=1$ timing intervals of the 01X fill program, these manipulations being made in accordance with the previously set forth instruction pairs for each channel. As will be noted, $k_1$ is recorded following the $m$ mark on the short channel and does not appear during this particular fill cycle on the long channel. It should also be noted that the information bit stored in flip-flop M during the $t=1$ time interval after the 01X program is initiated, that is information bit $5y$ of line 3 is the same information bit stored in flip-flop B during the $t=0$ time interval, that is information bit 5 of line 2. This transfer is in accordance with the previously set forth instruction.

On line 1 of section II under each channel are illustrated the information arrangement at the time of the second $m$ mark appearance, the order accordingly being generated thereby to change the 01X program to the 11X program. The $m$ mark is transferred in accordance with the 01X program and lines 2 of sections II indicate the first timing interval of the 11X program, with lines 3 and 4 thereunder illustrating the information transfer in accordance with the $t=0$ and $t=1$ instruction sets given above for this sub-operation or program. At the completion of program 11X, as caused by the next $m$ mark appearance, not here illustrated, signifying the beginning of the next integrator section recirculation, the program is automatically transformed, as before explained, to the Dawdle program and then from there to the Idle, the memory being recirculated without change during each.

Next, the particular pushbutton corresponding to the value to be eventually placed in the next right or, from FIGURE 20, the $dy-8$ space of the seventh long channel section, is pressed, with the information changes resulting thereby in the memory being illustrated in sections III under both channels. In particular, sections III correspond to sections I in that during the first $t=0$ thereof the Idle program is in effect during the simultaneous appearance of the $m$ and T* marks. At the beginning of the next or $t=1$ interval, the program 01X is again in effect and the $k_2$ value, corresponding to the value of the pushbutton depressed, being placed in the B flip-flop. Then, during the successive 3rd, 4th and 5th lines of these sections III, the same sequence of informational changes as above noted in sections I are again performed by the computer with the result that the $k_1$ value from the previous operational cycle stored in flip-flop B during the $t=0$ interval of line 3, is recorded for the first time on the long channel, as on line 4, with the $k_2$ value being recorded just prior to the $m$ mark in the short channel as on line 3. Thereafter, upon the next $m$ mark appearance, not here illustrated, the 01X program will be transformed, as previously explained, to the 11X program and from there, upon the next $m$ mark appearance, to Dawdle and then to Idle with the computer then being prepared for the insertion of the next or $k_3$ value by the next pushbutton depression.

Upon recording in the third or, from FIGURE 20, the $dy-9$ space code value, not here illustrated, it would be found that this third or $k_3$ value, would appear initially in the short channel just after the $m$ mark with the previously recorded $k_2$ and $k_1$ values being found in alternate $dz$ spaces to the left thereof. Also, during this $k_3$ value recordment in the short channel, the $k_2$ value would be recorded for the first time in the long channel in the space as illustrated on line 4 of section III under the long channel where the $k_1$ value appears, the $k_1$ value being shifted to the left two spaces to appear where, in FIGURE 20, the $dy-4$ space is shown.

In this way, it is seen that each $dy$ code space value is recorded on the long channel only after the next following dy space value is recorded on the short channel. Accordingly, to insure that all dy spaces are filled in a given long channel section, it is necessary as a final step to arbitrarily punch one extra value, with either pushbutton, as the final dy fill operation in order that the immediately preceding value recorded in the short channel and representing the final or fartherest right, as viewed from FIGURE 10, dy space value, will be transferred to its proper space in the long channel. It will be noted that this final value serves only to produce this transfer and, since it remains only in the short channel will have no significance insofar as the analyzer's operation is concerned.

To fill the dx register of the particular long channel section containing the T* mark, it is necessary to throw the movable switch arm of register operation switch 180 to engage the dx contact point, switches 177 and 179 remaining at their Off and $O_3$ contact positions, respectively. With this accomplished, the successive dx code values, beginning with the value for the extreme left dx space or, from FIGURE 20, the dx—6 space may be sequentially recorded in by proper depressions of the 1 and 0 pushbuttons, the depression of which, as formerly, causing one and zero binary valued cells, respectively, to be placed in the register.

As was the case for the fill dy operation, the depression of a pushbutton causes its corresponding value to be immediately transferred into flip-flop B, and upon the next simultaneous appearance of the m and T* marks, additionally orders, assuming the B flip-flop content agrees in value with the still depressed pushbutton, flip-flop J set such that the fill dx program 01X of the block 364 will be produced at the beginning of the following $t=1$ interval. Then, upon the next m mark appearance this 01X program is automatically transformed into the wait program 11X of the block 365 and this program, in turn, at the third m mark appearance is changed into Dawdle which, as formerly, goes to Idle when the particular pushbutton depressed returns to its normally up position.

During the fill dx program of 01X, the following instructions are generated:

(1) When signal $t=0$, the contents of flip-flops A and L are ordered transferred into flip-flops C and M, respectively.

(2) When signal $t=1$, the content of flip-flop B is ordered transferred into each of flip-flops C and M while the content of flip-flop A is ordered transferred into flip-flop B.

The above sets of instructions may be summarized as:
(1) During $t=0$ intervals, $(A) \rightarrow (C)$
$(L) \rightarrow (M)$ (2) During the $t=1$ intervals, $(B) \rightarrow (C)$
$(B) \rightarrow (M)$
$(A) \rightarrow (B)$ The instructions generated during the wait program 11X generated as above stated, by the next m mark appearance, are:

(1) When signal $t=0$, the contents of flip-flops A and L are ordered transferred into flip-flops C and M, respectively.

(2) When signal $t=1$, the content of flip-flop A is ordered transferred into flip-flops B and C and the content of flip-flop L is ordered transferred into flip-flop M.

These instructions may be summarized as:
(1) During $t=0$ intervals, $(A) \rightarrow (C)$
$(L) \rightarrow (M)$ (2) During $t=1$ intervals, $(A) \rightarrow (B)$
$(A) \rightarrow (C)$
$(L) \rightarrow (M)$ Although no repetition of the detailed changes of information arrangement occurring during a dx fill operation is given, similar to that of FIGURE 22 for portions of a dy fill operation, it may be briefly stated that the progressive dx code values are recorded simultaneously in both channels and hence, no extra dx value need be punched in at the conclusion of the dx fill for accomplishing a final value transfer as was the case for the dy fill operation.

Considering now, the r and y register fill operations, it is apparent from FIGURE 20, that the interplexed r and y registers will not be available for filling until after passage of the interplexed dy and dx registers corresponding to the fill dy and fill dx programs 01X of FIGURE 21. Accordingly, as indicated by blocks 367 and 370, the 01X program for these r and y fill operations, respectively, is a wait one, and upon triggering in each instance to the 11X program, produced again by the second m mark appearance, the actual fill operation is begun. These r and y fill operations, of blocks 368 and 371, respectively, of FIGURE 21 are continued until, as was the case during the dy and dx fill operations, transformed by the next or third occurrence of the m mark into the Dawdle program which, in turn, goes into the Idle program upon the previously specified up pushbutton positions.

In particular, the r register may be filled after the r switch position of switch 180 has been made, with the Off and $O_3$ positions being retained by switches 177 and 179, respectively. As in the previously described fill operations, the successive r number space values, beginning with the furthest left or r–19 space and continuing from right to left as viewed from FIGURE 20 are successively filled by sequential depression, in proper order, of the 1 and 0 pushbuttons, each depression causing its corresponding value to be initially entered in the B flip-flop.

The instructions generated during the wait r or 01X program of block 367 of FIGURE 21 are:

(1) When signal $t=0$, the contents of flip-flops A and L are ordered transferred into flip-flops C and M, respectively.

(2) When signal $t=1$, the contents of flip-flops A, B and L are ordered transferred into flip-flops B, C and M, respectively.

These instructions may be summarized as:
(1) During $t=0$ intervals, $(A) \rightarrow (C)$
$(L) \rightarrow (M)$ (2) During $t=1$ intervals, $(A) \rightarrow (B)$
$(B) \rightarrow (C)$
$(L) \rightarrow (M)$ The instructions generated during the fill program 11X of block 368 are:

(1) When signal $t=0$, the contents of flip-flops A and L are ordered transferred into flip-flops C and M, respectively.

(2) When signal $t=1$, the content of flip-flop A is ordered transferred into flip-flops B, C and M.

These instructions may be summarized as:
(1) During $t=0$ intervals, $(A) \rightarrow (C)$
$(L) \rightarrow (M)$ (2) During $t=1$ intervals, $(A) \rightarrow (B)$
$(A) \rightarrow (C)$
$(A) \rightarrow (M)$ To fill the y register of the integrator section containing the T* mark, switch 180 is thrown to its y contact position and the successive y number digits starting with the most significant or $y-19$ space value and continuing from left to right as viewed from FIGURE 20, are sequentially recorded, again by use of the 1 and 0 pushbuttons. As formerly, in each case, the value is initially entered as the content of flip-flop B and then, upon the simultaneous $m$ and T* mark appearance, causes the ensuing fill cycle of operation to begin.

The instructions generated during the wait $y$ or 01X program of block 370 are:

(1) When signal $t=0$, the contents of the A and L flip-flops are ordered transferred into the C and M flip-flops respectively.

(2) When signal $t=1$, the contents of flip-flops A, B and L are ordered transferred into flip-flops B, C and M.

The above instruction may be summarized as:
(1) During $t=0$ intervals, $$(A) \to (C)$$
$$(L) \to (M)$$

(2) During $t=1$ intervals, $$(A) \to (B)$$
$$(B) \to (C)$$
$$(L) \to (M)$$

The instructions generated during the fill $y$ program of block 371 are:

(1) When signal $t=0$, the contents of flip-flops A and B are ordered transferred into flip-flops C and M, respectively.

(2) When signal $t=1$, the content of flip-flop A is ordered transferred into both of flip-flops B and C, and the content of flip-flop L is ordered transferred into flip-flop M.

These instructions may be summarized as:
(1) During $t=0$ intervals, $$(A) \to (C)$$
$$(B) \to (M)$$

(2) During $t=1$ intervals, $$(A) \to (B)$$
$$(A) \to (C)$$
$$(L) \to (M)$$

(10) OPERATION: SHIFT

As noted above in the fill operation description, only the registers of the particular long channel section containing the T* mark may be filled at any given time. Accordingly, in order that all long channel sections necessary for solving a given problem may be filled, the T* mark must be capable of being shifted from section to section such that each section, at the time it contains the fiducial mark, may have its respective registers filled. This shifting operation is accomplished by throwing switches 177, 180 and 179 to their $O_4$, $dy$ and $O_3$ contact positions, respectively, and rotating knob 190 on front panel 175.

Before considering in detail the computer's electronic operation during a shift cycle of operation, it is well first to consider the mechanical structure and operation of shifting mechanism 187 as illustrated in detail in FIGURE 23. This mechanism includes front and rear plates 380 and 381, respectively, maintained in spaced parallel relationship with each other by spacers 382 and bolts 191 located at each of the four corners thereof. In addition, these bolts shown here in extended form, serve to clamp front plate 380 against front panel 175, not here again illustrated. Positioned between these plates is a gear 384 mounted on a shaft 385, shaft 385, in turn, being suitably disposed for rotational movement, as by bearings, for example, within both plates. The forward end of shaft 385 extends beyond panel 175 and includes a knurled tip portion 386 for receipt of knob 190, also not again here illustrated.

Gear 384 is in meshing engagement with another gear 388 of the same diameter, gear 388 being suitably attached to a shaft 390, the ends of which are rotatably secured, as by bearings, within front and rear plates 380 and 381. Also attached to shaft 390 is a cam 391, positioned just rearwardly of gear 388, cam 391 having a dwell portion of a substantially constant diameter extending around a major portion of its periphery, the remaining portion thereof forming a recess. Also attached to shaft 390, just rearwardly of cam 391 is a gear 392 of a relatively small diameter. Gear 392 is in meshing engagement with a gear 394 of a relatively large diameter, gear 394 being affixed to a shaft 395, only the end of which being here visible. A 20 to 1 speed reduction exists between gears 392 and 394 with shaft 395 being likewise disposed for rotational movement within front and rear plates 380 and 381. On the end of shaft 395 is attached the integrator section dial 188, only a portion of which is here illustrated.

A circular cam follower 396 rides on the outer surface of cam 391, it being rotatably fixed to a resilient spring arm 398 so disposed that when follower 396 rides along the dwell portion of the cam, spring 398 depresses a pushbutton 399 of toggle switch 206, previously illustrated in electrical schematic form in FIGURE 13. This pushbutton 399 depression, in turn, corresponds to, in FIGURE 13, movable switch arm 208 being actuated to engage the lower contact point 209 therein. Toggle switch 206 is, in turn, secured to rear wall 381, as by a clamping element 401, the output conductors 207 of the toggle switch being connected, as in FIGURE 13, to the 1 pushbutton relay assembly.

Finally, a ratchet mechanism 404 is included, it comprising an angularly movable arm 406 pivotally supported between the front and rear plates and biased by spring 407 in a counter-clockwise direction such that its end makes positive engagement with the teeth in gear 384. Accordingly, gear 384 is prevented from being rotated in the clockwise direction.

In operation, all counter-clockwise movement imparted knob 190 will be transmitted by way of gear 388 and 392 to gear 394 which in turn causes the dial 188 to be rotated in the designated counter-clockwise direction. Now, owing to the 20 to 1 gear ratio between gears 392 and 394, recalling that gear 384 and 388 are of the same diameter, a single complete rotation of knob 190 will cause dial 188 to be rotated $\frac{1}{20}$ of a turn which, in turn, corresponds to the angular spacing between consecutive integrator section marks thereon. During such a rotation, cam follower 396 will be elevated out of the cam 391 recess and will ride, during most of the rotational cycle, on the dwell portion with the result that pushbutton 399 is depressed and makes the previously noted conductive contact in the circuit of FIGURE 13. The results of such a shorting contact, as noted previously, is similar in all respects to a 1 pushbutton depression since the 1 pushbutton relay 206 will be actuated thereby.

It will be further observed that the operator will be able to manually sense when each knob rotation is completed by reason of the cam follower's falling into the cam recess which acts, in turn, to impart a different "feel" to continued angular rotation of the knob. Thus, cam 391 and cam follower 396 act additionally to form a detent arrangement providing a manual point of stoppage for the operator in addition to the visual method provided by the dial 188 and pointer 189 relationship.

Returning now to the computer's operation during a shift cycle of operation, upon initiation of knob 190 rotation, toggle switch 206 is actuated, as pointed out above, the actuation, in turn, causing a corresponding actuation of the 1 pushbutton relay circuitry. Upon this latter actuation, an order is generated within the gating circuitry to set flip-flop I during the next following $t=1$ interval. This order will be accomplished at the beginning of the $t=0$ interval immediately following the order generation, with the wait program 10X in the block 357 of FIGURE 21 being produced thereby.

During this wait program, the memory is recirculated as it was during the Idle program and upon the next simultaneous appearance of the $m$ and T* marks, the following orders are generated:

(1) Transfer the content of flip-flop A into flip-flop C.
(2) Zero flip-flop M.
(3) Zero and set flip-flops I and J, respectively.

Order (1) above recirculates the $m$ mark that is, transfers it from the A flip-flop back to the memory channel from flip-flop C. Order (2) above effectively erases the old T* mark by zeroing the flip-flop M and hence leaving blank the first space of the long channel section formerly containing the fiducial mark. Finally, order (3) changes the 10X program of block 357 into the program 01X entitled "Erase old T*" of block 358 in FIGURE 21. This new program 01X will be effective at the beginning of the following T*=1 interval after the $m$ and old $t$ mark appearance and during this program the following orders are generated:

(1) When $t=0$, the contents of flip-flops A and L are ordered transferred to flip-flops C and M, respectively.

(2) When $t=1$, the contents of flip-flops A, B and L are ordered transferred to flip-flops B, C, and M, respectively.

These instructions may be summarized as:
(1) During the $t=0$ intervals, $$(A)\rightarrow(C)$$
$$(L)\rightarrow(M)$$

(2) During the $t=1$ intervals, $$(A)\rightarrow(B)$$
$$(B)\rightarrow(C)$$
$$(L)\rightarrow(M)$$

Upon the next $m$ mark appearance in signal $a$, this appearance occurring intermediate the long channel section whose T* mark was just erased, the program 01X is ordered changed to the 11X program of block 359 in FIGURE 21, the program change being generated by ordering the I flip-flop set equal to 1. This program 11X orders the memory merely recirculated as by ordering during both $t=0$ and $t=1$ intervals the flip-flops A and L contents transferred into flip-flops C and M. Program 11X continues during the passage of the last half of the long channel section containing the erased fiducial mark, and upon the next $m$ mark appearance, it appearing in signal $a$ simultaneously with the zero valued first space contents, as in signal $l$, of the next following long channel section, the following orders are generated:

(1) Set flip-flop M.
(2) Zero flip-flops I and J and set flip-flop D.

Order (1) above causes a binary one cell to be recorded in the first space of the next following long channel section to thus represent the new fiducial or T* mark as positioned therein. Order (2) above generates the Dawdle program of 001 which will continue as long as knob 190 is being rotated and pushbutton 399 is still depressed by arm 398. However, once cam follower 396 falls again into the cam recess, then the 1 pushbutton relay circuit will be deactuated, corresponding to the up position of the 1 pushbutton, with the result that the Idle program 000 will again be automatically generated.

It is thus seen that a single shift operation occasioned by a single knob 190 rotation, serves to erase the fiducial mark then in the machine, record a new fiducial mark in the long channel section just following the one having the old mark, with the long channel section containing the new fiducial mark being accordingly indicated by the relative position between pointer 189 and dial 188. Since the mark may be shifted in only one direction, that is, from any given long channel section to the next following section as it appears during the recirculation of the memory, the necessity for ratchet mechanism 404 becomes apparent since it, by preventing dial 188 from being rotated in a direction opposite from the actual T* mark transfer, always maintains an accurate indication of the section having the T* mark.

It is also apparent that in operating the computer, if, for example, the fiducial mark were in the 4th long channel section and the operator desired the mark to be placed in the 3rd section, then knob 190 must be rotated 19 times so that the mark will shift from the 4th to the 5th section, from the 5th to the 6th section, until at last the 3rd section is reached.

It will be also noted that under the worst possible timing conditions the fiducial mark will, upon the first instant of actuation of the 1 pushbutton relay circuit, just have been recorded in the long channel by the M flip-flop and hence, the long channel will have to be completely recirculated again before the fiducial mark reappears with the subsequent cycle of operation. However, since the recirculation time of the long channel as pointed out before is slightly less than $\frac{1}{30}$ of a second owing to the speed of the drum, inaccurate operation will occur only if knob 190 is rotated completely in less than $\frac{1}{30}$ of a second. Such an event is for all practical purposes impossible owing to the inherent friction in the various bearings, the meshing gears, and, finally, ratchet mechanism 404.

(11) COMPUTE OPERATION

The final operation performed by the computer in solving a differential equation is the compute one, it being initiated by depression of either the 1 or 0 pushbuttons after switches 177, 180 and 179 have been thrown to their Off, $dy$ and $O_5$ switch positions, respectively. This compute operation, as noted previously, after once started will automatically recycle with a single operational cycle taking place during the recirculation of each long channel section and each long channel excursion will add one independent variable increment to the solution of the equation. This automatic recycling process continues until either manually stopped by depression of halt button 184 or until an overflow of one of the $y$ registers takes place at which time the analyzer automatically halts the compute operation and causes the Idle program to reappear.

Each compute cycle of operation includes three sequentially appearing programs, these being, as illustrated in FIGURE 21, a decode program 01X of block 372, a wait program 11X of block 373 and, finally, either an add integrate program 101 of block 374 or a subtract integrate program 100 of block 375. The end of both integrate programs 101 and 100 coincides with the conclusion of the particular long channel section being recirculated, it being switched at the beginning of the next section to the decode 01X program without any further activity on the part of the operator. In particular, the decode sub-operation takes place during passage of the interplexed $dx$ and $dy$ registers of the particular long channel section being recirculated, the wait program taking place between the passage of the final $dy$ register space and the first binary zero value in the $r$ register, with one of the integrate programs being in effect during the passage of the remaining interplexed $r$ and $y$ register spaces.

The decode program essentially determines the magnitude and direction, whether positive or negative, of the change to be made in the $y$ register number to form the new $y$ number by counting in, from FIGURE 2 for example, the $du(v, dv)$ values into the summation $dy$ counter, the count therein being termed the $dy$ number. Additionally, the sign of the $dv$ value is also determined, it being stored as the content of flip-flop D to later serve as a programming value to distinguish between the add and subtract integrate sub-operations of 101 and 100, respectively.

The wait program merely recirculates the memory while the add integrate program, determined by a flip-flop D content of one as previously derived during the decode sub-operation, orders the summation $dy$ count also formed during the prior decode suboperation added to the $y$ number and additionally orders the new $y$ number added into the $r$ register number. In the same way, during the subtract integrate operation, the new $y$ number is obtained by use of the summation $dy$ count, but here, the old $y$ number is subtracted from the old $r$ number to form the new $r$ number. In both integrate sub-operations, the new $r$ and $y$ numbers are recorded on the memory and during their next appearance in flip-flops C and L form the old $y$ and $r$ numbers, respectively. Also, in both sub-operations, the overflow $r$ number digit constituting the most recent $dz$ value of the section is stored, at the conclusion of the program, as the content of flip-flop B which is, during the $dz$ line precession taking place during the decode program of the next integrator section recirculation automatically stored in its proper place on the short channel.

As will be evident from the discussion thus far presented, decode program 01X may be generated either from the Idle program as by a pushbutton depression for originally starting the compute operation, or may be automatically generated from either of the integrate programs 101 and 100. For the former case, assuming one of the pushbuttons to be in its down contact position, upon the next simultaneous $m$ and $T^*$ mark appearance, the order is generated to set the J flip-flop which, in turn, will be achieved at the beginning of the next following $t=1$ interval at which time, the second space contents of the section will appear in signal $a$. In the latter case, with the programming flip-flops I and J being equal to 1 and 0, respectively, and with flip-flop D being either 1 or 0, upon the next $m$ mark appearance, coming just after the end of the particular long channel section being recirculated, the order is generated to zero and set the I and J flip-flops, respectively, which, in turn, will again be achieved at the beginning of the following $t=1$ interval and hence form the decode operation 01X.

During this decode operation, the orders generated in connection with the recirculation of the memory are:

(1) When signal $t=0$, the contents of flip-flops A and L are ordered transferred into flip-flops C and M, respectively.

(2) When signal $t=1$, the content of flip-flop A is ordered transferred into flip-flop B, the content of flip-flop B is ordered transferred into flip-flop C, and the content of flip-flop L is ordered transferred into flip-flop M.

The above instructions may be summarized as:

(1) During $t=0$ intervals, $$(A) \to (C)$$
$$(L) \to (M)$$

(2) During $t=1$ intervals, $$(A) \to (B)$$
$$(B) \to (C)$$
$$(L) \to (M)$$

Before proceeding with the discussion of the portion of the computer operation not associated with the memory recirculation, it is thought well to consider first the $dz$ information precession as performed during the decode operation. This precession may be most readily understood by reference to FIGURE 24 wherein is illustrated the recirculation of the first portion of the seventh integrator section, previously illustrated in FIGURE 20. Here, the contents illustrated on lines 1 at the time $t=0$ in the both channels are those appearing at the conclusion of the integrate sub-operation of the previous integrator section, the memory, under which program, as will be later pointed out, being ordered to transfer the $m$ and $T^*$ to flip-flops C and M, respectively. It should be here noted that, although section 7 is repeated for the purposes of this description, it need not include the $T^*$ in this example since it is not required, as mentioned briefly above, for ordering the integrate to decode program change.

Also, as noted briefly above, the $dz$ output value resulting from the just completed integrate sub-operation of the immediately preceding integrator section here the 6th section, is stored as the content of flip-flop B, the value here being accordingly designated 6.

On lines 2 of FIGURE 24 is illustrated the first $t=1$ interval of the decode program 01X with the following lines thereunderneath illustrating the results of the above set forth decode orders (1) and (2) causing precession of the $dz$ information. The manner of achieving the resulting information rearrangement may be readily ascertained by reference to these orders and, as will be noted, a change in the $m$ mark placement relative to the numbered $dz$ spaces is achieved, it originally appearing in signal $a$ immediately prior to the 5th $dz$ space but is recorded by flip-flop C immediately prior to the new 6th section $dz$ space, as was initially in the B flip-flop. It is accordingly seen that this precessing process effectively jumps ahead, so to speak, the $m$ mark into the next following formerly blank $t=0$ interval space such that it appears just before the immediately preceding integrator section's $dz$ output value.

A total of twenty of such precessions will be performed during each complete excursion of the long channel information, one precession for each integrator section appearance, and accordingly will always provide the same relative placement of the $m$ mark within the $dz$ channel during the passage of any given integrator section and furthermore provide a different $m$ mark placement within the $dz$ channel for each integrator section. This precessing arrangement permits the overflow digit from each $r$ register to be readily stored in its corresponding section's respective space on the $dz$ channel without provision of additional delay devices, etc., and further, as will be soon seen, permits each $dz$ register value to be available for comparison purposes to both of its correspondingly numbered $dy$ and $dx$ code spaces in the long channel.

Returning now to the computer's operation, considering a single long channel section, as stated before, a cell having a binary value of one is stored in each of its $dy$ code spaces which correspond to the $dz$ output values of the other integrator sections required to form the $du(v, dv)$ input to that section. During the decode program, zero and one $dz$ cells, corresponding to the $dy$ code cells having a one-binary value, are treated as $-1$ and $+1$ values, respectively, and are accumulated in the summation $dy$ register to be later added to the $y$ register contents during either of the integrate sub-operations. Considering for the moment, the operation of the summation $dy$ counter, the consecutive high to low place digits of the summation number are represented therein by the conduction states of the P, Q, R and S flip-flops, the flip-flop P conduction state serving to represent the sign of the number. In particular, positive numbers are represented by an equivalent count-up from 0000, the zero valued flip-flop P state accordingly representing positive summation $dy$ numbers. On the other hand, negative numbers are equivalently counted down from 0000 with the corresponding one valued P flip-flop state representing negative summation $dy$ numbers.

Accordingly, if equal numbers of 1's and 0's are represented by the information in the $dz$ spaces corresponding to the $dy$ code marks for a given section, the sum of the equivalent $+1$ and $-1$ values thereof should equal zero, and signals equivalent to a count of 0, 0, 0 and 0 should be stored in the P, Q, R and S flip-flops, respectively, to be later added to the old $y$ number representation in the $y$ register. On the other hand, if six zero $dz$ cells appear opposite the six $dy$ code marks, then a minus six, represented by the binary count of 1010, should appear in the summation $dy$ counter to be added to the old $y$ number, the number 1010 being equivalent to a count down of six from 0000. If each of the six $dz$ cell represents plus one, then a plus six or 0110 as represented by the summation $dy$ counter is to be added to the old $y$ number, the 0110 being equal to a count up of six from 0000.

The summation $dy$ counter achieves these desired counting results in the following manner. In the first place, as may be observed by inspection of the diode gating circuitry, whenever the term $a.j'$ appears, the P, Q, R and S flip-flops are set to represent a count of 1100, representing as above defined, a minus four value. Now, if no binary one valued cell appears in a particular $dy$ space, then the value of signal $l'$ is one and a signal is applied to the S flip-flop circuitry of the counter so as to increase the count represented in the counter by one binary digit. As may be seen, if no binary one valued $dy$ cells are present in a particular $dy$ register, twenty counting signals will be applied to the counter with its resulting count being 0000 as desired.

On the other hand, if a binary one valued $dy$ cell appears and the corresponding $dz$ space contains a one cell, then a signal is applied to the R flip-flop circuitry of the counter so as to increase the total count represented in the counter by two binary digits. Finally, if a zero cell appears in the $dz$ space corresponding to a binary one $dy$ cell, nothing is done to the counter with its count remaining the same. All overflows occurring from the P flip-flop are ignored for obvious reasons.

Included below is Table I wherein is set forth the corresponding summation $dy$ counter values and their equivalent decimal numerical values. As will be observed, line 12 of the table presents the initial conditions of the counter at the beginning of each decode program.

*Table I*

| Line | Signal Values | | | | Decimal Value |
|---|---|---|---|---|---|
| | $p$ | $q$ | $r$ | $s$ | |
| 1 | 0 | 1 | 1 | 1 | +7 |
| 2 | 0 | 1 | 1 | 0 | +6 |
| 3 | 0 | 1 | 0 | 1 | +5 |
| 4 | 0 | 1 | 0 | 0 | +4 |
| 5 | 0 | 0 | 1 | 1 | +3 |
| 6 | 0 | 0 | 1 | 0 | +2 |
| 7 | 0 | 0 | 0 | 1 | +1 |
| 8 | 0 | 0 | 0 | 0 | 0 |
| 9 | 1 | 1 | 1 | 1 | −1 |
| 10 | 1 | 1 | 1 | 0 | −2 |
| 11 | 1 | 1 | 0 | 1 | −3 |
| 12 | 1 | 1 | 0 | 0 | −4 |
| 13 | 1 | 0 | 1 | 1 | −5 |
| 14 | 1 | 0 | 1 | 0 | −6 |
| 15 | 1 | 0 | 0 | 1 | −7 |
| 16 | 1 | 0 | 0 | 0 | −8 |

Taking, for the purposes of example, the case where six zero $dz$ cells appear in spaces corresponding to six one $dy$ code cells, it is seen that only fourteen +1 counts are applied to the counter the counts corresponding to the fourteen zero valued $dy$ code cells. The originally appearing count of 1100 is thus increased by fourteen or, in binary terms, 1100, to a count of 11010, count 1010, considering that portion only remaining in the counter corresponds to minus six, as seen from Table I, the previously set forth value for six zeroes appearing in the $dz$ spaces. On the other hand, if each of the six $dz$ spaces corresponding to the six one-valued $dy$ code cells has a binary one value cell, then the initial count of minus four or 1100 would be increased by 14+12 or 26, the 14 corresponding to the 14 zero-valued $dy$ code cells and the 12 corresponding to the 2 counts for each $dz$ one value. Thus the minus four or 1100 original value would be increased by a binary number of 11010 corresponding to 26, to a count of 0110, as on line 2, or plus six as seen from Table I.

A maximum of 6 one-valued $dy$ code cells may be placed in any integrator section to thereby limit the maximum possible summation $dy$ counts between +6 and −6. At first glance, it would appear that 7 $dy$ code marks would be permissible owing to the +7 and −8 counting range, as in Table I but, however, a +7 or 0111 value may, during either of the subsequent integration suboperations later be changed to 1000, owing to the counter being used to store the successive carries produced by $y$ and $r$ register digit additions. In such a case, the +7 value would be subsequentially represented by a −8 value in the counter, all subsequent operations of the computer accordingly being in error.

Although an effective up-down count is produced by the summation $dy$ counter, it actually counts only in the up direction, and, by so doing, achieves a considerable saving in the number of diodes necessary for triggering its component flip-flops.

Considering now the $dx$ decode process, upon initiation of the decode program 01X, flip-flop D will be initially at its low or zero state, regardless of whether the decode program was derived directly from Idle by a pushbutton depression or whether it was generated from the add integrate program 101 taking place during passage of the peceding integrator section. In the former case, flip-flop D will be initially at zero corresponding to its zero state during the Idle program and, in the latter case, it will have been ordered zeroed upon the program change, as will be later described. Now, as stated before, a $dx$ code cell of binary one value is entered in each $dx$ register space of a given long channel section whose corresponding $dz$ values are to serve as the, from FIGURE 2, $dv$ or independent variable input values to that integrator section. Now, during the $dx$ decode, each $dx$ binary one cell is compared with its corresponding $dz$ cell and if the $dz$ value is zero, nothing is done to change the conduction state of the D flip-flop but, however, if the corresponding $dz$ value is one, then a triggering signal is applied to flip-flop D such that its conduction state will be reversed. Thus, flip-flop D is operated as a single stage binary counter whenever a $dx$ binary one cell appears coincidentally with a $dz$ binary one cell.

As will be recalled from FIGURE 3, if the $dz$ values produced by a given integrator section require a sign reversal, as exemplified by the output values of integrator sections 35 and 39, then the output $dz$ values, designated (−), of integrator section 37 are applied to the $dx$ inputs of sections 35 and 39 along with the particular independent variable's $dz$ values applied thereto. This sign reversing $dz$ function from section 37 takes the form of a continuous series of $dz$ one cells and these, in turn, always act to reverse the conduction state of the D flip-flop during the decode programs of the two integrator sections. This reversal will cause the exactly opposite mathematical process, either addition or subtraction, to be performed than that called for by the other or independent $dx$ value thereto. This reversal of the normally ordered mathematical operation, in turn, as may be shown mathematically, serves to reverse the sign of the effective $dz$ output values. Also, since a $dz$ value of one, corresponding to a $dx$ code mark, always reverses the conduction state of flip-flop D it is immaterial whether the sign reversing or $dx$ input function code mark appears first in the given integrator's $dx$ register.

Having discussed above both $dx$ and $dy$ decode processes separately, consideration is now given to their actual performance in the computer during the decode suboperation. Thus, reference again to FIGURE 24 shows that during the first $t=1$ time interval of the decode program as found on lines 2, the 5th $dx$ code space contents appear in flip-flop L while the corresponding $dz$ value of the 5th long channel section appears in signal $a$. Hence, during this interval, a comparison may be made between the $dx$ code signal and the corresponding 5th $dz$ signal with the result being that if signal $l$ equals one, then flip-flop D is or is not triggered in accordance with whether signal $a$ equals one or zero, respectively, in the manner pointed out above. During the following $t=0$ interval, as on lines 3, the 5th $dy$ space content appears in flip-flop L and, simultaneously therewith, the $dz$−5 space content appears in flip-flop B and hence by comparing signals $l$ and $b$ during this $t=0$ interval, the summation $dy$ counter may be actuated in accordance with the manner set forth previously.

Thus, during alternate $t=1$ and $0$ intervals of the decode program, signals $l$ and $a$ and then, signals $l$ and $b$, are alternately compared for the $dx$ and $dy$ decode processes with resulting operations being performed on flip-flop D and the summation $dy$ counter. Precessing the short channel information during this decode operation not only allows the $m$ mark to be transferred to a different relative position but also permits a ready comparison to be made of each $dz$ cell with its two corresponding $dx$ and $dy$ code space contents.

This decode program 01X, as noted above, continues through the next appearance of the $m$ mark, which appearance orders setting of flip-flop I such that, at the beginning of the next following $t=1$ interval, wait program 11X is in effect. During this wait program, the memory is recirculated by ordering the contents of flip-flops A and L transferred to flip-flops C and M, respectively, during both $t=1$ and $t=0$ intervals, the program continuing until the first cell appears in the $r$ register. This wait program is required since the various integrator sections employed for solving a particular equation will contain, in accordance with the scaling parameters, different $y$ number lengths, the remaining unused portions of their respective $y$ registers taking no part in the integration process. Also, owing to the necessity of recording the $r$ register overflow signal of each section in its corresponding $dz$ space, it is necessary to have this overflow take place from the $r-19$ space. To accomplish this, the $r$ and $y$ registers should be used in such a way that their most significant digit cells fall in the $r-19$ and $y-19$ spaces, respectively, with their successively lower place digit cells falling in the consecutive spaces to the right thereof. Thus, depending on the length of the $r$ and $y$ numbers used, their least significant digit cells will be recorded between or including the $r-18$ and the $r-1$ spaces, and the $y-18$ and $y-1$ spaces, respectively, with all of the spaces to the right of these least significant cells constituting unused register portions. These unused spaces are separated from the used spaces by a single zero cell recorded in the register space immediately preceding the appearance of the least significant $y$ number digit cell with all of the remaining unused $r$ register spaces to the right thereof, as viewed from FIGURE 20, for example, containing binary one cells. As will be apparent, if the scaling requires full $y$ and $r$ register use, then a zero cell should be recorded in the $r-0$ space and the integrate program will accordingly be initiated simultaneously with the appearance of the $y-1$ space contents in signal $l$. Upon appearance of the first zero valued $r$ register cell, signified by the expression $l'.t$, the order to zero flip-flop J is generated. So long as the wait program 11X is in effect the complement of the flip-flop D content is transferred into flip-flop B. The order to zero flip-flop J switches the wait program 11X into either the add or subtract integrate program as determined by the flip-flop D content.

Considering the order above instructing the complement of the contents of flip-flop D transferred into flip-flop B, if, as before stated, the flip-flop D content is one, addition is indicated between the $y$ and $r$ registers, and flip-flop B will be utilized for storing the carry digits produced during the corresponding $r$ and $y$ number digit successive additions. Accordingly, the content of flip-flop B should initially be zero, signifying no carry, during the first addition performed between the least significant $r$ and $y$ number digits. On the other hand, if the flip-flop D content is zero, then subtraction is indicated, which will be performed by adding the successive $r$ number digits to the inverse or complementary old $y$ number digits, again using flip-flop B for storing the carries between the successive additions. For this type of additive transfer to yield subtraction, it is necessary to add a binary digit value of one to the result of the addition of the least significant $r$ and complementary $y$ number digits. This will be accomplished since flip-flop B will be initially in its set condition, as caused by the zeroed state of flip-flop D, and this initial one value will be added to the least significant digits as though it were a normal carry digit of one.

The integrate program will initially be effective at the beginning of a $t=0$ timing interval during which time the least significant $y$ number digit is represented by the contents of flip-flop L. During this interval, assuming first that signal $d=1$ with the add integrate program 101 being in effect, the following orders are generated:

(1) The $y$ number digit signal then appearing in signal $l$ is ordered added to the contents summation of the $dy$ counter through its least significant digit flip-flop S.

(2) The signals $s$ and $l$ are simultaneously compared and a signal representing the sum thereof ordered transferred into flip-flop M at the beginning of the next $t=1$ timing interval in order to be recorded as the new $y$ number least significant digit cell.

Thus, in accordance with order (1) above, if the $y$ number digit value is one, then the total count in the summation $dy$ counter will be increased by one binary digit value while, on the other hand, if the $y$ digit value is zero, nothing further is done to change the count in the counter. It should be noted that although the $y$ number digit signal is added to the summation $dy$ counter through flip-flop S, this addition also affects the conduction states of flip-flops P, Q, and R, the other stages of the counter whenever a carry is produced by such addition. Stated differently, the contents of flip-flops P, Q and R at the end of order (1) above are no longer merely representative of the associated digits of the $dy$ input number, but of these digits plus the initial carry digit resulting from the addition of the least significant digits of the old $y$ number and the $dy$ number. As will be apparent, the new $y$ number digit, as represented by the signal recorded by flip-flop M, will be identical to the new content of flip-flop S as it appears at the beginning of the next timing interval.

During the next or $t=1$ timing interval, the least significant $r$ number digit is represented by the signal appearing in flip-flop L, the new $y$ number least significant digit will be represented by the contents of flip-flop S, and the content of flip-flop B is zero as caused by the previous transfer thereinto of the complementary contents of flip-flop D.

During this $t=1$ interval, the following instructions are generated:

(1) The binary contents of flip-flops S, L and B are ordered simultaneously added with a signal representing the resultant sum digit being ordered transferred into flip-flop M at the beginning of the next timing interval.

(2) A signal representative of the carry digit of the addition performed during order (1) above is ordered transferred to flip-flop B as the content thereof.

(3) The contents of the counter flip-flops P, Q, and R are ordered transferred into flip-flops Q, R and S, respectively, without changing the contents of flip-flop P.

Instruction (1) above effectively adds the least significant $y$ number digit, represented by the content of flip-flop S, to the old least significant $r$ number digit, represented by the content of flip-flop L, it being remembered that the content of flip-flop B is initially zero for this first $t=1$ interval.

Simultaneously with the achievement of the above instructions at the beginning of the second $t=0$ interval of the add integrate sub-operation, a signal representative of the next-to-least significant $y$ number digit appears in flip-flop L. By having shifted down the contents of the summation $dy$ counter in accordance with instruction (3) above, it is seen that the next-to-least significant digit signal in the summation counter appears as the content of flip-flop S and that this signal represents the sum of the next-to-least significant digit of the $dy$ number and the least significant carry digit resulting from the addition of the *dy* number to the old *y* number. The set of instructions previously set forth for the first $t=0$ interval of the add integrate program is repeated with the result that the next-to-least significant *y* number digit signal is ordered added to the counter through flip-flop S with the resulting signal representing the new next-to-least significant *y* number digit being found at the beginning of the next interval as the contents of flip-flops S and M.

During the next or $t=1$ interval, the next-to-least significant digit of the old *r* number, as represented by the contents of flip-flop L, the next-to-least significant new *y* number digit, as represented by the contents of flip-flop S, and the carry digit from the previous *r* and *y* digit addition as represented by the contents of flip-flop B are ordered added in accordance with above set of $t=1$ instructions, to produce a signal representative of the next-to-least significant new *r* number digit. This new *r* number digit signal is then recorded by the M flip-flop during the following timing interval with a signal representing the carry of the addition process being again stored in flip-flop B for use during the next *r* and *y* digit additions two timing intervals later.

This process of alternating adding the S flip-flop contents to the L flip-flop contents during $t=0$ intervals for securing new *y* number digit signals and adding the B, S, and L flip-flop contents during $t=1$ intervals for securing the new *r* number digit signals will continue until the next appearance of the *m* mark signifying the beginning of the next following long channel section. At the *m* mark appearance, the integrate program of 101 is ordered changed to the decode program 01X, and flip-flop D is ordered zeroed with the result that, at the beginning of the next timing interval, the decode sub-operation for the next integrator section is begun. As will be recalled, the decode sub-operation precesses the *m* mark in the *dz* line by ordering the B flip-flop contents shifted into the C flip-flop during $t=1$ intervals. Since the carry digit signal of the most significant *r* and *y* number digits addition, constituting the overflow or new *dz* value for that section, is stored in flip-flop B, the precessing operation, in first shifting the flip-flop B content into flip-flop C, immediately causes this carry or *dz* digit signal to be recorded in the *dz* space corresponding to that particular integrator section whose integrate sub-operation has just been completed.

Considering now the case where the initial content of flip-flop D equals zero signifying that the old *y* number is to be subtracted from the *r* number, the following orders are generated during the first $t=0$ interval of the resulting subtract integrate program 100.

(1) The P, Q and R flip-flops conduction states of the summation *dy* counter are ordered changed as though the binary value of signal *l* were to be added to the S flip-flop of the counter, the order being accomplished at the beginning of the next $t=1$ interval. With respect to the S flip-flop content, however, the value of signal *l'* is stepped directly thereinto and accordingly represents the complement of the old *y* number least significant digit.

(2) Signals *l* and *s* are, during this $t=0$ interval, compared with a signal representing the sum thereof being ordered transferred into flip-flop M at the beginning of the next interval to be recorded thereby as the new *y* number least significant digit.

During the next or $t=1$ timing interval, the same set of orders are generated for this subtract sub-operation as were set forth previously for the $t=1$ timing interval of the add suboperation. The first order thereunder effectively adds the complementary value of the old *y* digit, as represented by the flip-flop S content, to the initial carry value of one as contained in flip-flop B, and the old *r* number least significant digit as represented by signal *l*. The result signal of this addition, representing the new least significant *r* number digit will accordingly be ordered transferred into flip-flop M at the beginning of the next interval with a signal representing the carry of the addition being stored in flip-flop B, to be utilized in the next $t=1$ interval addition of the old *y* complementary value to the then appearing *l* and *b* signal values. Then as formerly, these $t=0$ and $t=1$ timing interval orders for this subtract sub-operation are alternately generated until reappearance of the *m* mark signifying the end of the integrator section at which time, the integrate program, as before noted, is simultaneously ordered changed back to the decode one along with flip-flop D being ordered zeroed.

Order (1) above for the $t=1$ interval orders signal *l'*, rather than signal *l*, transferred into flip-flop S since, in order to accomplish the desired subtraction in the present machine, the complements of the *y* number digits are added to their corresponding *r* number digits, with an initial value of one, as in the B flip-flop, being added in for securing correct mathematical results. The last carry digit signal, in flip-flop B, produced by the addition of the $y-19$ and $r-19$ space contents, represents, as formerly, the output *dz* value from the integrator section just recirculated, and will be recorded in the proper *dz* space during the subsequent short channel precession taking place during the decode sub-operation of the next following section.

No rigorous mathematical attempt is made in the present disclosure to justify the particular type of addition employed for combining the summation *dy* count to the old *y* number to secure the new *y* number nor is an attempt made to justify the particular type of additions or subtractions performed between the *y* and *r* numbers to produce successive *dz* values which, as demonstrated in section I, represent the desired integration.

However, a single example of combining the summation *dy* count with the old *y* number in accordance with the computer's operation is given at this time. Assume, by way of example, that the number in the *y* register is 1.001, and that a plus five count or, from Table I, 0101 has been counted into the summation *dy* counter during the previous decode process with the two to be additively combined during the integrate sub-operation. As may be readily seen by straight binary addition, the result should be:

$$\begin{array}{r} 1.001 \\ 0.101 \\ \hline 1.110 \end{array}$$

In the analyzer's operation, since the least significant digit of the *y* number is first added to the counter, a binary value of one would be added to 0101 the result being 0110 with the S flip-flop content of zero corresponding to the least-significant new *y* number digit. Next, the *y* number remaining would be 100, and the counter contents of 0110, after having been shifted right without changing the P flip-flop contents would be changed to a count of 0011. The least significant digit zero of the *y* number in being added to the counter effects no change therein with the S flip-flop contents of one corresponding to the value recorded as the next-to-least significant place digit of the new *y* number.

The *y* number remaining after the above step would be 10, the counter contents being 0001 and after shifting and adding the least significant digit 0 of the remaining *y* number to the count, a one value will be recorded as the next place binary digit of the new *y* number.

Continuing, the remaining *y* number would be 1 and the counter contents, after shifting, of 0000, would be changed by addition of the remaining *y* number digit 1 to 0001. Hence, a one would be recorded as a most significant place digit of the new *y* number. The new *y* number thus recorded is 1.110 which is equal to the desired result of the addition process as set forth above.

(12) COMPUTE OPERATION STOPPAGE

The compute operation will continue in the manner described until stopped either by manual depression of "Halt" pushbutton 184 or by a particular type of overflow from any of the y registers. A manual stoppage may be desired by the operator owing to an obviously wrong solution caused, for example, by erroneous coding and scaling of the problem, completion of the solution through the desired independent variable limits, or, for obtaining a readout, in a manner to be later described, of the contents of any of the registers.

The halt pushbutton in its down position will be effective during the next following decode program 01X to order flip-flop J zeroed during the first appearing $t=1$ interval thereof. This instruction generates the Idle program 000 if flip-flop D is zeroed or Dawdle program 001 if flip-flop D is set. In the latter case, the Idle program will be generated therefrom automatically in the manner previously explained, assuming both 1 and 0 pushbuttons are in their normally up position.

Considering now the automatic stoppage caused by a y number, two distinct types of such overflow may occur, each signifying that the magnitude of the y number in one of the sections has exceeded the capacity of the y register therein. In the first instance, a positive y number may receive sufficient positive counts from the summation $dy$ counter such that it contains all ones and hence represents substantially a $+1$ value, recalling that the most significant place digit of the y number represents the sign thereof with the consecutive lower place digits being separated therefrom by the binal point and representing the magnitude of the y number. Upon receipt of one additional positive count from the $dy$ counter during an addition ordered by program 101, all of the ones will be changed to zeroes, with the new y number being at an obviously incorrect $-1$ value.

Upon the above occurrence, the compute operation is automatically stopped in the following manner. Recalling first that since each y number digit signal is added to the contents of flip-flop S of the counter, then the contents of flip-flop S will always represent the carry digit of the previous y number digit and $dy$ counter addition after the $dy$ counter contents have been shifted to the right. Thus, continuing the above example, where the y number contains all ones with a plus one added thereto from the summation $dy$ counter, the contents of flip-flop S will be, upon the appearance of the $y-19$ space digit in signal $l$, of $+1$ value representing the carry digit from the previous addition. The $y-19$ digit value of one will then be added to the one in the S flip-flop to produce a count of 10, represented by the R and S flip-flop contents, respectively.

During the next timing interval, upon appearance of the $r-19$ digit signal, the S flip-flop contents will be ordered added thereto as previously described and the order generated to transfer the P, Q and R flip-flop contents into the Q, R and S flip-flop contents, respectively. This order will be realized at the beginning of the next timing interval coincident with appearance of the $m$ mark at which time the S flip-flop will contain the previous R flip-flop contents of one, this value, in turn, representing the y number overflow.

The above operation for program 101 is performed similarly during program 100 denoting subtraction since, although the signal $l'$ value is here transferred or stepped into flip-flop S each time, the subsequent or following shift right order of the P, Q and R flip-flop contents will, during the appearance of the $y-19$ digit signal cause its binary value of one added to the counter contents to produce a final count of 10, which is identical to the operation as above described.

This overflow is recognized during either the 100 or 101 program by the simultaneous appearance of the $m$ mark and a set condition of flip-flop S, which, in turn, serve to generate the following instructions:

(1) Set flip-flop D, and
(2) Zero flip-flops I and J.

The above instructions will be carried out at the beginning of the next or $t=1$ interval to produce the Dawdle program of 001 which, in turn, is automatically programmed into Idle assuming both 1 or 0 pushbuttons are in their up position.

On the other hand, if the y number is negative as represented by a zero digit cell in the $y-19$ space and sufficient negative counts are received from the summation $dy$ counter, the y number may contain all zeros representing a value of $-1$. Upon receipt of one additional negative count from the counter, all of the zeros will be changed to ones to thereby represent an obviously incorrect accumulation of substantially a $+1$ value.

The compute operation stoppage in this case for both the 101 and 100 programs is similar to the previous stoppage in that, simultaneously with the $m$ mark appearance, the content of flip-flop S will be equal to one. This operation and result may be readily understood by determining the computer's operation for an example case as was done previously for the positive valued overflow. For this overflow case, the same two orders are generated by the computer as set forth previously for the other case, namely, to set flip-flop D and zero both of flip-flops I and J. With this accomplished, then the computer goes first to Dawdle and then to Idle as before explained.

(13) READOUT ARRANGEMENT

Although various types of digital readout devices may be employed with the analyzer of the present invention, one extremely simple method is herewith presented for determining the contents of any register of any particular integrator section. Thus, referring now to FIGURE 25, there is shown signals $a$, $t'$, and $l$ applied to the three input terminals of an "and" gating circuit 410. The output terminal of the "and" circuit is coupled to the trigger circuit of an oscilloscope (not illustrated) with the result that whenever signals $a$, $t'$ and $l$ are simultaneously at their high voltage level, as will be the case during each appearance of the T* mark, the oscilloscope's trigger circuit will initiate the horizontal sweep of its electron beam. Now, signal $t$ is applied to the $dx$ and $r$ terminals of a switch section 180-11 while signal $t'$ is applied to the $dy$ and $y$ terminals therein. The movable switch arm of the switching section is coupled through a resistor 415 to one input terminal of an "and" gating circuit 411, the remaining input terminal of circuit 411 being connected to the signal $l$ conductor. The output signal of "and" circuit 411 is applied to the vertical amplifier of the associated oscilloscope.

In operation, circuit 410 will trigger the horizontal sweep circuit upon each appearance of the T* mark and, depending upon the particular switch position of section 180-11, the ensuing, signal $l$ values during either the $t$ or $t'$ intervals will be effective to determine the magnitude of the horizontal sweep. For example, if the movable switch arm of section 180-11 were thrown to engage either the $y$ or $dy$ contact point, then only the $t'$ interval values of signal $l$ following the fiducial mark would be projected on the screen of the oscilloscope these, in turn, corresponding to the consecutive $dy$ and $y$ register values. On the other hand, with the movable arm of switch section 180-11 thrown to engage either the $dx$ or $r$ contact points, then the consecutive $t$ interval values of signal $l$ would appear visually on the oscilloscope's screen and correspond to the sequentially appearing $dx$ and $r$ register values.

Now, by properly manipulating the vertical position of the sweep as well as the amplification of the horizontal amplifier, it is possible to isolate only the interplexed $r$ and $y$ registers on the screen or the interplexed $dx$ and $dy$ registers. Under these two adjustments, the setting of switch section 180–11 will then determine whether the *r* and *y* register values are the ones presented on the screen in one case or the *dx* or *dy* register values are presented in the other case.

This readout technique is further illustrated in FIGURE 26 wherein an electron beam trace 414 is shown as it would appear, by way of example only, on the fluorescent screen 412 of an oscilloscope. In this figure, the X axis placement and horizontal amplifier have been adjusted so that only the interplexed *r* and *y* registers are scanned with section 180–11 being thrown to its *y* contact position to thus pass through gating circuit 411 only the *y* register values.

Resistor 415 serves the important function of causing the zero valued *y* number digits to appear as different levels in trace 414 than the adjacent *r* number digits, regardless of the *r* digit values. This is due to the fact that signal *t'* in being transmitted through switch section 180–11 produces a voltage drop across resistor 415 with the result that both the high and low values thereof, as applied to gating circuitry 415, will be of a slightly less magnitude than the normal high and low clamped output voltage levels ordinarily produced by the flip-flops. Since the output signal magnitude from any "and" gating circuit will be approximately equal to the lower of the two signal magnitudes applied thereto, the lower voltage levels of signal *t'*, appearing simultaneously with the *r* number digits values in signal *l*, will control the magnitude of the output voltage level from circuit 411. On the other hand, the zero valued *y* number digits, represented by signal *l* being low when signal *t'* is high, will be controlled by the normally valued low voltage level of signal *l* and this, in turn, will produce slightly higher output low voltage levels from circuit 411 than the former case when signal *t'* is low. This difference between the magnitudes of the low voltage levels in the two cases will be reflected as a difference in their corresponding levels in trace 414, as shown in FIGURE 26. Thus, the operator is readily able to distinguish between the adjacent *y* and *r* digits values on the screen and accordingly determine the contents of the *y* register without undue difficulty.

In the same way, the consecutive zero valued *r* number digits may be distinguished from adjacent *y* digit values of either value when switch section 180–11 is thrown to its *r* contact position since, in this case, signal *t* will be attenuated through resistor 415. Also, as will be apparent, examination of either of the *dx* or *dy* registers permits the same visual distinguishment to be made between adjacent values of the two numbers.

(14) MISCELLANEOUS

Analysis of the present analyzer reveals a symmetrical relationship between the number of integrator sections, the number of spaces in each long channel section, and the length of the *dz* channel. For example, each long channel section contains the same number of *dx* and *dy* code spaces as there are integrator sections in the machine. Also, the number of *r* number spaces equals the number of integrator sections while the number of *y* number spaces is always one less than the number of integrator sections. These relationships coupled with the fiducial mark space in each section means that each long channel section has four times the number of spaces as there are integrator sections recorded along the channel. Also, since the output value from the integrator sections are recorded in alternate spaces on the short channel, the number of spaces in the short channel accordingly is twice the number of integrator sections.

This symmetry may be expressed mathematically to define in terms of size a more general analyzer than the one herein specifically described. Thus, if *n*, an integer, equals the number of integrator sections, then there are *n* sections in the long channel the length of each section being 4*n* spaces. In the same way, the length of the short channel will be 2*n* spaces while the total length of the long channel will be $4n^2$, as derived from *n*, the number of sections, times 4*n*, the number of spaces in each section. Thus, it may be quite readily understood that the twenty integrator sections herein set forth by way of example embodies only one form of the present invention and, in practice, other numbers of section may be utilized quite readily in accordance with the design techniques herein set forth.

Considering further, certain relationships between channel length, information arrangement and number of integrator sections, if *n* integrator sections are employed, the first space in each long channel section will be reserved for the fiducial mark, and the 2nd, 4th, 6th, . . . 2*n*th spaces will comprise the consecutive *dx* code mark spaces. In the same way, the consecutive *dy* code mark spaces will be the 3rd, 5th, 7th . . . (2*n*+1)th spaces, the consecutive *r* number place digit cells will occupy the (2*n*+2), (2*n*+4), (2*n*+6), . . . 4*n* spaces, and, finally, the consecutive *y* number digit cells will fall in the (2*n*+3), (2*n*+5), (2*n*+7), . . . (4*n*−1) spaces. As pointed out above and as shown in FIGURE 20, the first *r* number cell space, that is the (2*n*+2) space, is reserved for the signal for converting the wait suboperation of the compute operation to either the add or subtract suboperation.

A number of features embodied in the present differential analyzer appear to have general utility in special purpose digital machines and accordingly represent design principles having broader application than in the specifically disclosed analyzer of the present invention. For example, the general process of integration performed employs interplexed ordered number pairs in each long channel section, the *y* and *r* numbers, the integration being performed by specific manipulation of the signals representing these numbers. By ordered, it should be noted, is meant that a definite order exists in the memory placement between the *y* and *r* number pairs.

Stated even more broadly, the basic principle of operation involves two digital electrical signals representing two numbers or members of a binary number set, which are combined in such a way as to produce a third digital electrical signal representing a third number, the *dz* one in the differential analyzer, this third number of the set being unique insofar as the two original numbers producing it are concerned. Considered generally, a wide choice of possibilities exist insofar as the particular operation capable of being performed between such two numbers, the particular arithmetic ones of addition and subtraction being the ones herein performed as required for the integration process. Also, the contents of the *dx* code register in any long channel section may in conjunction with the contents of the *dz* register be viewed as two members of, simply, and ordered set, neither being numbers within the accepted meaning of the word. During the decode operation, a particular type of decoding operation is performed between the signals representing these members to produce a signal representing a third quantity, the binary digit contained in flip-flop D. In the same way, contents of each *dy* register and the *dz* register represent two members of another ordered set and are operated on during each integrator section appearance to form the signal representing the summation *dy* count.

The means by which the signals representing these ordered number pairs are interplexed with one another in the memory appears fundamental. This is done, as will be recalled, by having flip-flop T operate as a single stage binary counter and count alternate 0 and 1 or first and second timing intervals, in turn, marked by the repetitive timing signal *cl*. In this way also, the signals in the *dx* and *dy* registers are interplexed and all of such interplexed register pairs or number pairs may be distinguished from each other during their respective recirculation periods by the output count of flip-flop T.

Another feature having general application is the synchronization of the information found on the two information channels by the use of the m mark. The m mark, as will be recalled, is a binary one cell recorded on the short channel so as to appear in the memory output flip-flop A during a signal $t=0$ interval with all of the remaining signal $t=0$ interval spaces in the short channel having a permanently recorded binary zero cell. Owing to the length relationship between this short channel and each long channel section, the m mark will appear simultaneously with the beginning space of each long channel section and hence make such known to the computer and, if called for, order the ensuing programming change. As also brought forth in considerable detail, the beginning space of each long channel section, except one, is normally blank with the excepted long channel section containing a binary one cell in its first space. This, in conjunction with the m mark, permits the long channel section to be specifically recognized as such, and enables reading out or filling any of its respective registers. Also, the technique utilized in shifting the T* mark from one long channel section to another permits an external visual indication to be continuously available to the operator as to the specific numbered long channel section available at the read and write points.

Although the major operations of the computer are broadly controlled by the front panel switch settings, the particular sub-operation performed at any instant on the information recirculating through both channels is controlled by the conduction state sequence of the programming flip-flops. The use of programming flip-flops in the manner herein described appears fundamental in reducing the complexity of the serial memory type of digital machine of which the present analyzer is an example. By having the conduction state sequence of the programming flip-flops changed by the appearance of predetermined bits of the recirculating information, a variety of different types of operations are made possible without undue expense insofar as circuitry is involved. Such information appearances as the m mark, the simultaneous m and T* mark appearances, the first zero cell in the r register, etc., may be given as examples of information appearances producing these conduction state changes. In all cases, the sequence change pattern follows a closed loop, so to speak, since all major operations inevitably return to the basic or normal Idle sub-operation wherein no changes in the recirculating information are made. This Idle condition also appears basic as a design characteristic in that all of the machine operations begin from the conduction state sequence defining it and progressively change in successive steps until it is once more obtained.

Associated with the Idle program is the Dawdle program which serves to prevent attempted insertions of binary one cells in the memory during fill operation, for example, or changes in programming faster than the machine is capable of absorbing them. Briefly, the Dawdle program is achieved only after the desired insertion, change in programming, etc., has been accomplished and during its existence the memory is recirculated without change as an Idle. The Dawdle program is automatically changed to Idle only after the particular pushbutton depressed to initiate that particular cycle of operation has been released and has again attained its normal up contact position. Thus, since the Idle program is required before the next operational cycle can be initiated, Dawdle acts as a safeguard to insure that both pushbuttons are in their released or up position.

Another feature embodied in the analyzer of the present invention being of general digital application is the manner in which possible logical errors are eliminated upon depression of either the 1 or the 0 pushbutton. As will be recalled upon such a depression, for either a fill operation or for initiating one of the major operations, the conduction state of only one flip-flop is altered. If, for example, an attempt were made in the design to have more than one, for example two flip-flops triggered by such a depression, the possibility exists, if the pushbutton attained its down contact position just prior to the end of a timing interval, that one of the resulting negative pulses applied to the two flip-flop grids would be insufficient to trigger its respective flip-flop. This, in turn, would immediately cause the wrong programming sequence to take place with an ensuing failure of computation.

In the fill operation, additional security for entering the correct values in the memory is attained by requiring logically that the value of the pushbutton depressed be entered first into the B flip-flop and then, at the instant its content is prepared for passing into the memory that it agree in value with the particular button depressed.

A great reduction in circuitry is accomplished in the present design by judicious use of the switching circuitry employed in the diode gating networks for switching in the major operations. This switching circuitry, as exemplified in FIGURES 13 through 18 in isolated section form, allows various "and" and "or" gating circuits to have various numbers of input signals in the different machine operations by switching in and out such signals as required. Also, in some instances, "and" and "or" circuits are actually switched from one place to another place in the circuit in different operations and hence eliminate the necessity for redundant circuits. This technique reduces considerably the total number of diodes required with an ensuing reduction in the flip-flop output current requirements.

The precessing feature of the short channel has been explained in detail in previous sections and its obvious and fundamental importance in digital machine design is apparent. This technique not only allows interplexed data to be alternately viewed, as in the decoding sub-operation, but further permits the output value from each integrator section to be recorded in its own respective space in the short channel.

As will be apparent to those skilled in the art, the specific components utilized may be altered in type without basically changing the invention inherent in the present analyzer design. For example, other types of cyclical storage means may be employed such as mercury delay lines, a rotating electrostatic memory, and the like without involving invention. In the same way, the specific memory circuitry utilized with the magnetic drum as illustrated may be modified in accordance with established techniques without involving invention. Also, other types of magnetic binary recording may be employed such as the non-return-to-zero system, etc. In addition, if a slower speed of operation were permissible, then other types of switching circuits, such as relays, may be substituted for the flip-flops herein shown along with appropriate modifications of the input circuits thereto for establishing proper operation therefor. In addition, other types of "and" and "or" gating circuits, using multigrid vacuum tubes, for example, are known in the art and may be employed within the present analyzer without modifying or effecting the scope of the invention inherent therein.

What is claimed is:

1. In a digital differential analyzer including a plurality of cyclically operable integrator sections, each section having a first register for storing during each cycle a first electrical signal representing the summation of the incremental changes in a first input variable during all of the preceding cycles and a second register for storing a second electrical signal representing the accumulation of the contents of the first register as a function of a second input variable, the overflow output signal produced by the second register representing the integral of the first variable with respect to the second variable, the combination comprising: first and second cyclical storage channels, said first storage channel including the first and second registers of each of the plurality of integrator sections; means for serially recording and recirculating the electrical signals representing the contents of said first and second registers of said integrator sections through said first cyclical storage channel; and means for recording and recirculating the most recent output signals produced by said series of integrator sections through said second cyclical storage channel.

2. In a digital differential analyzer including a plurality of cyclically operable integrator sections, each section having a first register for storing during each cycle a first electrical signal representing the summation of the incremental changes in a first input variable during all of the preceding cycles and a second register for storing a second electrical signal representing the accumulation of the contents of the first register as a function of a second input variable, the overflow output signal produced by the second register representing the integral of the first variable with respect to the second variable, the combination comprising: first and second recirculating storage channels said first storage channel including the first and second register of each of the plurality of integrator sections; means for serially recording the electrical signals representing the contents of the first and second registers of each of the plurality of integrator sections on said first storage channel; means for recording the plurality of output signals produced by said plurality of integrator sections, respectively, on said second storage channel; and means for producing the input signals for each of said plurality of integrator sections from the output signals recirculating on said second storage channel.

3. In a digital differential analyzer including a plurality of cyclically operable integrator sections, each section having a first register for storing during each cycle a first electrical signal representing the summation of the incremental changes in a first input variable during all of the preceding cycles and a second register for storing a second electrical signal representing the accumulation of the contents of the first register as a function of a second input variable, the overflow output signal produced by the second register representing the integral of the first variable with respect to the second variable, the combination comprising: a magnetic drum having first and second storage channels thereon said first storage channel including the first and second registers of each of said plurality of integrator sections; means for serially recording the electrical signal representing the contents of the first and second registers of said integrator sections on said first channel; and means for continually recording the most recent output signal of each integrator section on said second channel.

4. In a digital differential analyzer including $n$ cyclically operable integrator sections, each section having a first register for storing during each cycle a first electrical signal representing the summation of the incremental changes in a first input variable during all of the preceding cycles and a second register for storing a second electrical signal representing the accumulation of the contents of the first register as a function of a second input variable, the overflow output signal produced by the second register representing the integral of the first variable with respect to the second variable, the combination comprising: a magnetic drum having first and second recirculating information storage channels thereon said first storage channel including the first and second registers of each of said plurality of integrator sections; means for serially recording the first and second signals of the 1st, 2nd, . . . $n$th integrator sections on said first channel; and means for continuously recording the most recent output signals produced by said 1st, 2nd, . . . $n$th sections on 1st, 2nd, . . . $n$th spaces, respectively, on said second channel.

5. The combination of claim 4 including, in addition, means for producing input signals for each of said 1st, 2nd, . . . $n$th integrator sections from the most recent output signals recorded on said second channel.

6. In a digital differential analyzer including $n$ cyclically operable integrator sections, each section storing electrical signals representing functions of first and second input variables and producing an output signal representing the integral of the first variable with respect to the second variable, the combination comprising: a timing signal source marking a series of timing intervals; a rotatable magnetic memory drum including first and second channels each having a plurality of spaces, the length of each space being equal to the arcuate distance traveled by each channel during one of said timing intervals; first write and first read means, said first write and read means overlying said first channel on said drum and positioned substantially $4n^2$ spaces apart along said first channel; first means coupled to said timing signal source and conductively coupled between said first write and read means for serially recording and recirculating the electrical signals for said $n$ integrator sections on said first channel, the electrical signals for each of said sections being recorded on $4n$ consecutive spaces; second write and second read means, said second write and read means overlying said second channel on said drum and positioned substantially $2n$ spaces apart; and second means coupled to said timing signal source and conductively coupled between said second write and read means for recording and recirculating the most recent output signals from said $n$ integrator sections in alternate spaces on said second channel.

7. The combination of claim 6 including, in addition, counting means responsive to said timing signal for counting first and second timing intervals, synchronizing means connected to said counting means and conductively coupled to said first and said second means for actuating said first means to record a signal in the first space of said first channel representing the contents of each integrator section during a first timing interval and for actuating said second means to record the most recent output signal of each of said integrator sections on said second channel during a second timing interval, respectively.

8. A digital differential analyzer including $n$ integrator sections, each section having $r$ and $y$ registers for storing information relating to input variables $dx$ and $dy$ and producing an electrical output signal representing the integral of variable $dy$ with respect to variable $dx$, said analyzer comprising: magnetic storage means having first and second storage channels said first storage channel including the $r$ and $y$ registers of each of said $n$ integrator sections; first and second means for recording and recirculating binary electrical signals in $4n^2$ and $2n$ consecutive spaces, respectively, on said first and second channels, respectively; third means coupled to said first means for serially recording and recirculating binary electrical signals representing the information stored in said $n$ integrator sections on said first channel, the signals representing the information stored in each of said sections being recorded in $4n$ spaces, said $4n$ spaces including a first space normally having a signal representing a first binary value therein, $2n$ interplexed $dx$ and $dy$ code spaces, and $(2n-1)$ interplexed $r$ and $y$ register spaces; fourth means coupled to said second means for recording and recirculating the electrical output signals produced each recirculation by said 1st, 2nd, 3rd, . . . $n$th integrator sections in 2nd, 4th, 6th, . . . $2n$th spaces on said second channel, each of said 1st, 3rd, 5th, . . . $(2n-1)$ spaces normally containing a signal representing a first binary value; and fifth means coupled to said second means for recording a signal representing a second binary value in one of said 1st, 3rd, 5th, . . . $(2n-1)$ spaces of said second channel.

9. The analyzer according to claim 8 including, in addition, sixth means coupled to said first means for recording a signal representing a second binary value in one of the first spaces of said first channel.

10. The analyzer according to claim 9 including, in addition, selectively operable means for indicating one of said 1st, 2nd, . . . nth integrator sections, and means coupled between said indicating means and said sixth means for operating said indicator means to indicate the integrator section corresponding to the first space containing the electrical signal representing the second binary value.

11. A digital differential analyzer including a plurality of cyclically operable integrator sections, each section including a y register for storing during each cycle a first electrical signal representing the summation of the incremental changes in a first input variable during the preceding cycles and an r register for storing a second electrical signal representing the accumulation of the contents of the y register as a function of a second input variable, each section producing during each cycle an electrical output signal representing the integral of the first variable with respect to the second variable, said analyzer comprising: magnetic storage means having first and second storage channels said first storage channel including the y and r registers of each of said plurality of integrator sections; means for recording and recirculating the first and second electrical signals for all of the plurality of integrator sections along said first channel; means for recording the most recent output signal of each section on said second channel; means, responsive to the signals recorded on said second channel during each cycle of each of the integrator sections, for producing a third electrical signal representing the first input variable; means for combining said third electrical signal with the associated first electrical signal to produce a fourth electrical signal; means for applying said fourth electrical signal to the first-named recording means; and means for combining the second signal in each of the r registers with one of the associated first and fourth signals to produce in the r register a new second electrical signal, and to produce a resultant overflow signal, the most recent overflow signal from each r register as produced by the y number signal combination constituting the output signal for the associated integrator section.

12. A digital computing device comprising: first cyclical storage means; first means for serially storing and recirculating a plurality of interplexed pairs of first and second binary electrical signals in said first cyclical storage means, each pair of electrical signals representing two numbers of one of a corresponding plurality of ordered number sets, the plurality of pairs of 1st and 2nd signals corresponding respectively to the plurality of number sets; second means responsive to an applied electrical input signal for converting each of said first electrical signals to a third binary electrical signal representing a new first number in each of said plurality of ordered number sets during each recirculation thereof; and third means for combining each of said second electrical signals during each recirculation thereof with one of said first and third signals to perform an arithmetic operation between the two numbers of each of said plurality of ordered number sets represented by the combined signals; said third means producing a fourth binary electrical signal representing at least one digit of a third number in the respective set.

13. The computing device of claim 12 including, in addition, second cyclical storage means, and means for storing and recirculating said fourth electrical signals through said second storage means, the plurality of said fourth signals recirculating through said second storage means at any time representing the contents of an output register.

14. The computing device of claim 13 wherein said first means also includes means for storing and recirculating a plurality of pairs of fifth and sixth binary electrical signals representing, respectively, the contents of a plurality of pairs of binary code registers, one code register pair for the two numbers in each of said plurality of ordered number sets, each binary code register of said plurality of binary code register pairs forming with said output register two members of an ordered set.

15. The computing device of claim 14 including, in addition, means for combining said plurality of fifth electrical signals with the fourth electrical signals to produce a seventh electrical signal for controlling the operation of said second means, and means for combining said plurality of sixth electrical signals with the fourth electrical signals to produce an eighth electrical signal for controlling the arithmetic operation between the signals representing the two numbers within the associated ordered number set.

16. An electronic digital integrating device comprising: first and second cyclical storage channels; means for storing and recirculating at least first and second electrical binary information signals, representing first and second numbers, respectively, through said first storage channel; means for recirculating electrical binary information signals representing the change in magnitude of said first number and the operation to be performed between said first and second numbers during each of their recirculations, in said second storage channel; means, responsive to the last-named means during each recirculation of said first and second information signals, for generating a third electrical binary information signal representing the new magnitude of the first number and a fourth electrical binary information signal representing the result of the operation between said first and second numbers in accordance with the binary information signals recirculating through said second storage channel and means for applying said third and fourth signals to the first-named means.

17. A digital integrator section for integrating a function $du(v, dv)$ with respect to $dv$, an independent variable where $du(v, dv)$ is a function of the independent variable $dv$ and of the integral $v$ of the independent variable, said section comprising: rotatable magnetic memory storage means having a recirculating information channel having a plurality of spaces; means for storing a first plurality of electrical digit signals, representing the consecutive place digits of a first binary number of function $u(v)$, in alternate spaces along said information channel; means for storing a second plurality of electrical digit signals representing the consecutive place digits of the integral of the function $u(v)dv$ in the remaining spaces along said information channel; means responsive to electrical signals representing the magnitude of the independent variable $dv$ during each recirculation of said channel, for combining said first and second pluralities of signals during each recirculation of the channel to produce a third plurality of electrical digit signals representing the consecutive place digits of the new function $u(v)dv$; means for applying said third plurality of signals to the first-named means; and means for generating an electrical digit signal representing the most significant carry digit resulting from the combination of the first and second pluralities of electrical digit signals, the series of carry digits represented by the signals generated by the last-named means during a series of channel recirculations constituting the function $u(v)dv$.

18. A digital integrator section for integrating a function $u(v)$ with respect to $dv$, where $du$ is represented as a series of separate $dy$ input binary digit signals and $dv$ is represented as a series of separate $dx$ input binary digit signals, each of said separate $dx$ and $dy$ binary digit signals being either of a first or second value, said integrator section comprising: a rotatable memory drug including a recirculating memory channel having a plurality of spaces thereon; means for recording a first plurality of electrical digit signals representing the consecutive place digits of a y number in alternate spaces on said channel, said y number corresponding to the magnitude of the function $u(v)$ during each recirculation of said channel; means for recording a second plurality of electrical digit signals representing the consecutive place digits of an r number in the remaining spaces on said channel, said r number corresponding to the magnitude of the integral of the function $u(v)dv$ during each recirculation of said channel;

means, responsive to said first plurality of electrical digit signals and said $dy$ input binary digit signals during each recirculation of said channel, for actuating the first-named recording means to record a new first plurality of electrical digit signals representing the new $y$ number; means, responsive to said $dx$ input binary signals during each recirculation of said channel, for combining said first and second pluralities of electrical digit signals to produce a new second plurality of electrical digit signals representing the new $r$ number; means for applying said new second plurality of electrical digit signals to the second-named recording means; and means operable during each recirculation of said channel for generating an electrical digit signal representing the most significant carry digit of the new $r$ number, the series of carry digits resulting from the series of new $r$ number corresponding to the consecutive digits of the function $u(v)dv$.

19. The integrator section of claim 18 wherein said memory drum includes, in addition, a second memory channel having a plurality of spaces, and means for sequentially recording the series of carry digit signals in one space on said second channel.

20. In combination with a source of timing signals marking a series of timing intervals and a rotatable magnetic memory drum having recorded thereon first and second series of signals representing, respectively the consecutive place digits of first and second binary numbers: single stage binary counting means responsive to the timing signals for counting alternate first and second timing intervals; plural stage binary counting means for storing a third series of signals representing the consecutive place digits of a third binary number; first combining means, coupled to the drum and to each of said counting means, for combining the first and third series of signals during said first timing intervals to produce a new first series of signals representing the sum of the consecutive place digits of the first number and the consecutive place digits of the third number; and second combining means, coupled to said single stage counting means, for combining the first and second series of signals during said second time intervals to produce a new second series of signals representing the consecutive place digits of a new second number.

21. The combination of claim 20 including, in addition, means for storing a signal having either a first or a second voltage level representing, respectively either a first or a second binary digit value, said second combining means being additionally responsive to the signal stored in the last-named means for producing a new second series of signals representing the sum of the first and second numbers when said stored signal has said first voltage level and a new second series of signals representing the difference between the second number and the new first number when said stored signal has said second voltage level.

22. In an electronic computer including an operation mechanism for performing a plurality of operations on information signals, each of said operations including a plurality of sub-operations, the combination comprising: a plurality of programming electronic switching means, each of said switching means having a pair of stable conduction states, the conduction state sequence of said series of switching means at any time controlling the sub-operation performed by the operation mechanism, said series of switching means being normally in a first conduction state sequence to cause a normally idle condition of the operation mechanism; actuable means normally in a rest position; means responsive to the actuation of said actuable means for changing the conduction state of one of said switching means, the operation mechanism being responsive to the new conduction state sequence of said series of switching means for performing the first of a plurality of sub-operations; means responsive to the completion of said first and each of said plurality of sub-operations for progressively changing the conduction state sequences of said series of said switching means, each of said new conduction state sequences controlling the new sub-operation of the operation mechanism; means responsive to the completion of the final sub-operation for changing the conduction state sequence of said plurality of switching means to a final conduction state sequence, said final conduction state sequence differing from said normal first conduction state sequence only in the conduction state of another of said switching means; and means responsive to the rest position of said actuable means and said final conduction state sequence for switching said another of said switching means into its other conduction state whereby the normal first conduction state sequence is produced and the operation mechanism returns to its normal idle condition.

23. In an electronic computer including operation means capable of sequentially performing a series of sub-operations but having an idle condition, the combination comprising; first and second programming switching means for controlling the performance of the sub-operation by the operation means, each of said switching means having 1st and 2nd conduction states, each of said switching means being normally in said 1st conduction state to maintain the operation means in said idle condition; actuable means normally in a rest position; means responsive to the actuation of said actuable means when each of said first and second switching means is in said 1st conduction state for switching said first switching means into said 2nd conduction state to initiate the operation means into performing the series of sub-operations; means responsive to the conclusion of the performance of said series of sub-operations for setting said first and second switching means to said 1st and 2nd conduction states, respectively; and means responsive to the 1st and 2nd conduction states of said first and second switching means and to the rest position of said actuable means for triggering said second switching means into said 1st conduction state thereby to return the operation means to said idle condition.

24. In an electronic computer including operation means for performing a plurality of separate operations, each operation including at least one sub-operation, the combination comprising: operation selection means for controlling the operation performed by the operation means; a series of electronic switching means, each of said switching means having two conduction states, said series of switching means being normally in one series of conduction states to produce a normal idle condition of the operation means; actuable means normally in a rest position; means responsive to the actuation of said actuable means for changing the conduction state of one of said switching means; means responsive to said operation selection means and the new series of conduction states of said series of switching means for actuating the operation means to perform at least one sub-operation of the operation selected by said operation selection means; and means responsive to the completion of said one sub-operation and the rest position of said actuable means for changing the conduction state of said one switching means into its normal conduction state thereby to return the operation means to the normal idle condition.

25. A digital computer for performing a plurality of sub-operations on information signals, said computer comprising: a rotatable magnetic memory drum including a recirculating information channel; a series of programming flip-flops, each of said flip-flops having two conduction states, said series of flip-flops being normally in a first conduction state sequence; means responsive to said first conduction state sequence for recirculating without change information signals on said information channel; a pushbutton having up and down contact positions; means responsive to said first conduction state sequence and the down contact position of said pushbutton for changing the conduction state of one of said programming flip-flops to initiate the sequential performance of the plurality of sub-operations; means responsive to the completion of the plurality of sub-operations for changing the conduction state sequence of said series of flip-flops into a second conduction state sequence; means responsive to said second conduction state sequence for recirculating without change the information signals on said information channel; and means responsive to said second conduction state sequence and the up contact position of said pushbutton for changing said second conduction state sequence of said series of flip-flops into said first conduction state sequence.

26. In a digital differential analyzer having a plurality of integrator sections, each section being cyclically operable upon first and second series of binary electrical signals representing first and second binary numbers, respectively, in accordance with third and fourth series of binary electrical signals representing first and second decode numbers, the combination comprising a rotatable magnetic memory drum having first and second channels of substantially $2n$ and $4n^2$ binary digit spaces in length, respectively, where $n$ is a predetermined integer; means for erasing signals stored on said first and second channels; means for recording a first mark signal in one space on said first channel and a second mark signal in one space on said second channel; means for reading the signals recorded on said first and second channels and responsive to said first and second mark signals for recording the first, second, third and fourth signals for an integrator section in the first $4n-1$ spaces following the second mark signal space on the second channel; and selectively operable means for erasing said second mark signal and recording a new second mark signal $4n$ spaces following said second mark signal space.

27. In combination with a rotatable magnetic memory drum having first and second channels of first and second predetermined lengths, respectively: means for recording first and second continuous streams of signals representing first binary digit values in said first and second channels, respectively; means for recording a single signal representing a second binary digit value on each of said first and second channels; and selectively operable means for converting said single signal representing the second digit value on said second channel into a signal representing said first binary digit value and recording a second single signal representing said second binary digit value on said second channel at a point spaced from the converted signal a distance equal to an integral multiple of said first predetermined length.

28. A device for use with a rotatable magnetic memory drum having first and second channels, each of said first and second chanels being a predetermined number of spaces in length, said device comprising: means for recording a signal representing a binary zero value in each space of said first and second channels; means for recording a signal representing a binary one value in one space in each of said first and second channels; and selectively operable means for erasing the binary one digit value signal on said second channel and recording a second signal representing a binary one value a number of spaces from said erased signal substantially equal to an integral multiple of the number of spaces contained in said first channel.

29. In a digital differential analyzer including a plurality of cyclically operable integrator sections, each section being operable upon a series of binary signals, the combination comprising: a source of timing signals marking a series of timing intervals; a single stage counting means responsive to said timing signal for counting alternate first and second timing intervals thereof; a rotatable magnetic memory having a magnetic channel; means, coupled to said counting means and said source, for serially recording the series of signals for the integrator sections on said channel, the first signal in each series being recorded during said first timing interval and normally representing a first binary value; means for converting the first signal of one series of signals to a second signal representing a second binary value; and means responsive to said second signal for indicating the integrator section associated with said one series of signals.

30. A device for recording binary signals on a magnetic memory without the introduction of logical or transient errors, said device comprising: first and second electronic switching means, each of said switching means being normally in a 1st conduction state and being responsive to an applied input signal for switching into a 2nd conduction state; actuable means; means responsive to the actuation of said actuable means and to the 1st conduction state of said second electronic switching means for applying an input signal to said first electronic switching means to switch the conduction state thereof; means responsive to the 2nd and 1st conduction states of said first and second electronic switching means, respectively, for recording a binary signal on the magnetic memory; and means responsive to the completion of the recording of said binary signal for reversing the conduction state of said first electronic switching means thereby to prevent further recording on the magnetic memory.

31. A device for recording binary signals on a magnetic memory channel without the introduction of logical or transient errors, said device comprising: first and second electronic switching means, each of said switching means being normally in a first conduction state and being responsive to an input signal for switching into a second conduction state; first and second actuable means corresponding to first and second binary values, respectively, each of said actuable means being in a normal rest position; means responsive to the actuation of either one of said first and second actuable means for applying an input signal to said first electronic switching means to switch the conduction state thereof; means responsive to the second and first conduction states of said first and second switching means, respectively, for recording on the memory channel a signal representing a first binary value when said first actuable means is actuated and a signal representing a second binary value when said second actuable means is actuated; and means responsive to the rest position of said first and second actuable means for reversing the conduction state of said first electronic switching means.

32. A device for recording binary signals on a magnetic memory channel without the introduction of logical or transient errors, said device comprising: first and second electronic switching means, each of said switching means being in a first conduction state and responsive to an input signal for switching into a second conduction state; third electronic switching means having first and second input conductors and operable in response to signals applied to said first and second input conductors for triggering into first and second conduction states, respectively, representing first and second binary values, respectively; first and second actuable means corresponding to first and second binary values, respectively, each of said actuable means being in a normal rest position; means responsive to the actuation of either one of said first and second actuable means for applying an input signal to said first electronic switching means to switch the conduction state thereof; means responsive to the actuation of said first and second actuable means for applying a signal to the first and second input conductors, respectively, of said third electronic switching means; means simultaneously responsive to the second and first conduction states of said first and second switching means, respectively, and the actuation of one of said first and second actuable means, for recording on the memory channel a signal representing a first binary value when said third electronic switching means is in said first conduction state and a signal representing a second binary value when said third electronic switching means is in said second conduction state; and means, responsive to the simultaneous rest position of said first and second actuable means and the second and first conduction states of said first and second electronic switching means, respectively, for reversing the conduction state of said first electronic switching means.

33. In an electronic digital differential analyzer including $n$ integrator sections cyclically operable upon $n$ series, respectively, of $4n$ binary signals to produce $n$ binary output signals, respectively, each output signal representing the result of the integration performed by the corresponding integrator section, the combination comprising: first storage means for delaying each signal applied thereto for substantially $4n^2$ time intervals; second storage means for delaying each signal applied thereto for substantially $2n$ time intervals; first recording means for serially recording and recirculating the $n$ series of signals through said first cyclical storage means; second recording means for serially recording and continuously recirculating through said second cyclical storage means the most recent output signals produced by the $n$ integrator sections, said second recording means being operable during alternate time intervals whereby the number of signals recirculating through said second storage means is one-fourth the number of signals in each series; and means coupled to said second recording means for delaying the most recent output signals recirculating through said second cyclical storage means two time intervals during every other recirculation whereby the placement of the most recent output signals relative to each other in said second cyclical storage means is different during the circulation of each series of signals in said first cyclical storage means.

34. In an electronic digital differential analyzer including $n$ integrator sections cyclically operable upon $n$ series, respectively, of $4n$ binary signals to produce $n$ binary output signals, respectively, where $n$ is an integer, the combination comprising: rotatable magnetic storage means having first and second recirculating information channels effectively $4n^2$ and $2n$ spaces in length, respectively; first means for serially recording the $n$ series of signals on said first information channel, each series of signals being recorded in $4n$ consecutive spaces whereby the second information channel recirculates completely first and second times during each circulation of each series of signals; second means for serially recording the most recent output signals produced by the $n$ integrator sections in alternate spaces on said second information channel; and third means for delaying said most recent output signals for a time interval equivalent to two spaces during each of said first recirculation times whereby the sequence of said most recent output signals on said second information channel is different during the circulation of each series of signals.

35. In combination: a rotatable magnetic storage drum having an information channel and a timing channel, said timing channel having a series of clock signals permanently recorded thereon; means responsive to said clock signals for producing a first timing signal marking a series of timing intervals; counting means responsive to said timing signal for producing a second timing signal marking alternate first and second timing intervals of said series of timing intervals; and recording means for serially recording and recirculating first and second series of binary information signals on said information channel, said recording means being connected to said counting means and being responsive to said second timing signal for recording the signals of said first and second series during said first and second timing intervals, respectively.

36. In a digital computing device including a cyclical memory system having at least one recirculating information signal channel, the combination comprising: a series of electronic flip-flop switching means for processing the information signals recirculating on the information channel, each of said electronic flip-flop switching means having input terminals for receiving input signals and producing output signals representing logical functions of the received input signals; a diode gating network; and means including mechanical switching means having a plurality of positions for applying the information signals and the output signals of said series of electronic switching means to the input terminals of said series of electronic switching means through said diode gating network in a plurality of ways, one for each switch position, said series of electronic switching means being operable to effect processing of the information signals recirculating on the information channel a plurality of ways in accordance with the plurality of positions, respectively, of said mechanical switching means.

37. The combination of claim 36 wherein said gating network comprises a plurality of input terminals, a plurality of output terminals connected to the input terminals of each of said series of electronic mechanical switching means, and a plurality of logical "and" and "or" circuits intercoupling the plurality of input terminals with the plurality of output terminals, and said switching means includes a group of separate switch sections, said group of switch sections serving during different positions of said mechanical switching means for applying the output signals produced by said series of electronic switching means in different ways to said plurality of "and" and "or" gating circuits.

38. A digital computer comprising a cyclical memory system including at least one recirculating information signal channel; a series of electronic flip-flop switching circuits for receiving input signals and producing output signals representing a plurality of operations on the received input signals; a gating network, coupled between said information channel and said series of electronic switching circuits, for applying the information signals on said information channel to said series of electronic switching circuits; mechanically actuable means for selectively making each of a plurality of connections between said gating network and said series of electronic switching circuits, one connection for each of said plurality of operations; and means for actuating said actuable means.

39. A digital differential analyzer having a plurality of cyclically operable integrator sections, each section producing a single $dz$ electrical output signal during each cycle thereof, said analyzer comprising: a magnetic memory system including first and second recirculatable information channels, said second information channel being divisible into a plurality of channel sections corresponding respectively to the plurality of integrator sections, each of said channel sections having a first series of alternate $dx$ and $dy$ code spaces and a second series of alternate $r$ and $y$ number spaces; first recording means for recording the $dz$ electrical output signals on said first channel; first reading means for reading the signals recorded on said first channel; second recording means for serially recording on said second information channel electrical signals representing the information to be operated upon by the plurality of integrator sections, said second recording means including means for recording an electrical code signal in at least one of said $dx$ code spaces, means for recording an electrical code signal in at least one of said $dy$ code spaces, and means for recording $r$ and $y$ electrical signals representing the consecutive digits of $r$ and $y$ numbers, respectively, in said $r$ and $y$ number spaces, respectively; second reading means for reading the signals recorded on said second channel; electrical counting means having a predetermined count therein upon the appearance of the first signal of each channel section at said second reading means, said counting means being operable to count electrical input signals applied thereto; third means, coupled to said first and second reading means for applying an electrical input signal to said counting means upon each coincidence at said reading means of a *dz* output signal and an electrical signal from a *dy* code space; bistable electronic switching means having first and second conduction states and being in said first conduction state upon the appearance of the first signal of each channel section at said second reading means, said switching means being responsive to an applied electrical signal for reversing its conduction state; fourth means, coupled to said first and second reading means, for applying an electrical signal to said switching means upon each coincidence at said reading means of a *dz* output signal and an electrical signal from a *dx* code space; fifth means, coupled to said second reading means and said counting means and responsive to said *y* electrical signals in each of said channel sections and the count in said counting means, for applying to said second recording means a new *y* electrical signal representing the sum of the *y* number in said channel section and the count in said counting means; sixth means, coupled to said second reading means and said switching means, for applying a new *r* electrical signal to said second recording means, said new *r* electrical signal representing the result of the mathematical operation of subtraction between the *r* number and the *y* number when said switching means is in one of said conduction states, and the result of the mathematical operation of addition of the *r* number and the number represented by the new *y* signal, when said switching means is in the other of said conduction states, and seventh means, coupled to said second reading means, for applying to said first recording means an electrical signal representing the most significant carry digit, resulting from the operation performed on the *r* and *y* numbers, the electrical signal applied by said seventh means constituting the new *dz* electrical output signal.

40. The analyzer defined in claim 39, wherein said first reading means includes a delay element for storing said *dz* electrical output signals whereby each *dz* electrical output signal may be compared with the associated *dx* and *dy* code signals.

41. In a digital electronic computer including apparatus for performing a plurality of operations on digital information signals, each operation including a series of sequentially performed sub-operations, the combination comprising: operation selection means including a plurality of selectively operable switching elements, said switching elements having a plurality of combinations of positions corresponding, respectively, to the plurality of operations; normally inoperative programming means, coupled to said operation selection means, for actuating the apparatus to sequentially perform a series of sub-operations; said programming means including a plurality of electronic switching circuits having predetermined states, said programming means being operative whenever only one of said electronic switching circuits is reversed from its predetermined state; and manually operable switching means normally in a predetermined rest position and responsive to operation thereof for reversing only one of said electronic switching circuits to render said programming means operable, in response to the combination of positions of said selectively operable switching elements, for actuating the apparatus to sequentially perform the series of sub-operations of the operation corresponding to said combination of positions and means responsive to the completion of said series of sub-operations and to said manually operable switching means at its rest position for reversing said switching circuits to their predetermined states.

42. The combination defined in claim 41 wherein each of said electronic switching circuits is a bistable circuit having two conduction states and the conduction state sequence of said switching circuits controls the sub-operation performed by the apparatus; and said manually operable means includes means for reversing the conduction state of only one of said electronic switching circuits.

43. In an electronic information handling system including a cyclical memory device for storing and recirculating digital information signals between read and write points, and an operation device for performing a plurality of operations on said information signals, said information signals including at least one control signal, the combination comprising: programming means for controlling the operation performed by the operation device, said programming means having a plurality of settings corresponding, respectively, to the plurality of operations; and control means, responsive to each occurrence of the one control signal at the read point, for changing the setting of said programming means thereby to change the operation performed by the operation device.

44. The combination defined in claim 43, wherein said programming means has a normal setting; and said control means includes switch means having a plurality of settings for performing a corresponding plurality of sequences of changes in the setting of said programming means in response to successive occurrences of the one control signal at the read point, and manually actuable switch means for initiating the first change of each of said sequences of changes in response to the first occurrence of the one control signal at the read point.

45. The combination defined in claim 44, wherein said control means further includes means, coupled to said manually actuable switch means and responsive to the occurrence of the one control signal at the read point, for returning said programming means to said normal setting.

46. In an electronic integrator section having a *dy* input formed by combining a series of bilevel *dy* code signals with a series of corresponding bilevel *dz* signals, the levels of each *dy* code signal representing one and zero binary values, respectively, and the levels of each *dz* signal representing plus one and minus one values respectively, the *dy* input to to the integrator section being the difference between the number of plus one representing levels and the number of minus one representing levels of the *dz* signals corresponding to the one representing *dy* code signals; a unidirectional summation *dy* counter for producing a count representing the *dy* input, said counter comprising: four-stage binary counting means responsive to each application of first and second input signals for counting up in one and two binary number steps, respectively; means for initially setting the counter to a predetermined count; means, responsive to each zero representing *dy* code signal for applying said first signal to said counting means; and means, responsive to each plus one representing *dz* signal corresponding to a one representing *dy* code signal for applying said second signal to said counting means.

47. In an electronic digital differential analyzer including *n* integrator sections, each section being cyclically operable upon a series of signals to produce an output signal representing the result of the integration during the cycle of operation, the combination comprising: first recirculating information storage means having a predetermined recirculation period, said storage means having the series of signals for the *n* integrator sections serially recorded thereon; second recirculating information storage means having a recirculating period substantially equal to $1/2n$ times said predetermined period whereby information signals stored on said second storage means are recirculated $2n$ times during each recirculation of said first storage means; delay means for precessing signals stored on the second storage means every other recirculation whereby the sequence of information signals on said second storage means differs during the circulation of each series of signals on said first storage means; and means for recording the output signal from each integrator section at a predetermined point on said second storage means during each cycle of operation.

48. In an electronic digital differential analyzer including *n* integrator sections cyclically operable upon *n* series, respectively, of $4n$ binary signals to produce *n* binary output signals, respectively, where *n* is an integer, the combination comprising: signal generating means for generating an electrical signal having alternate relatively high and relatively low voltage levels of substantially equal time durations; first and second magnetic storage means, having associated read and write points and being operable to reproduce at the associated read point each signal applied to the associated write point after delays substantially equal to $4n^2$ and $2n$ times, respectively, the time duration of each of said levels; first recording means for serially recording and recirculating the $n$ series of signals through said first storage means; second recording means for serially recording and recirculating the $n$ output signals through said second storage means whereby each output signal is recirculated first and second times through said second storage means during the time interval that the $4n$ signals of each series appear at the read point of said first storage means; and means, coupled to said signal generating means and said second recording means, for delaying the application to the associated write point of each signal appearing at the read point of said second storage means during each of the first recirculation times for a period substantially equal to twice the period of each of said levels whereby a different sequence of signals appears at the read point of said second storage means during each of the second recirculation times.

49. In a digital computer for performing a plurality of operations on a series of two-level input signals, the combination comprising: a first bistable electronic switching circuit having first and second input terminals and first and second output terminals, said first circuit being operable to produce at said first and second output terminals signals representing the magnitudes of the signals received at said first and second input terminals, respectively; a plurality of second bistable electronic switching circuits for producing a plurality of two-level control signals; a gating network including a plurality of input terminals for receiving input signals and an output terminal coupled to the first input terminal of said first switching circuit, said network being operable to produce at said output terminal a signal representing a logical function of the levels of the signals appearing at said input terminals; and selectively operable mechanical switch means having a plurality of multiposition switches settable to a plurality of different combinations of switch positions, for applying to the input terminals of said gating network a corresponding plurality of different combinations of said control signals and the input signals, respectively, the plurality of combinations of switch positions corresponding respectively to the plurality of operations.

50. The combination defined in claim 49, wherein said gating network includes at least one logical "and" circuit having $n$ input terminals coupled to $n$ input terminals of said gating network, respectively, and said mechanical switch means includes one switch connected to at least one of said $n$ input terminals of said gating network, said one switch when in an open position causing said "and" circuit to operate independently of the signal on said one of said input terminals.

51. In a digital computer having a bistable electronic switching circuit responsive to an applied signal for generating an electrical signal representing a logical function of the voltage levels of $n$ bilevel input signals, where $n$ is an integer, the combination comprising: a logical "and" gating circuit including $n$ input terminals and one output terminal, said gating circuit being operable to produce at said output terminal an electrical signal representing the logical product of the levels of the signals applied to said $n$ input terminals; selectively operable switch means for applying the $n$ bilevel input signals to the $n$ input terminals, respectively, of said gating circuit, said switch means including at least one multi-position switch connected to one of said $n$ input terminals and being operable in one position to prevent the associated input signal from appearing at said one input terminal; and means for applying the electrical signal at the output terminal of said gating circuit to the bistable electronic switching circuit.

52. A digital differential analyzer having a plurality of cyclically operable integrator sections, each section producing a single $dz$ electrical output signal during each cycle thereof, said analyzer comprising: a magnetic memory system including first and second recirculatable information channels, said second information channel being divisible into a plurality of channel sections corresponding respectively to the plurality of integrator sections, each of said channel sections having a first series of alternate $dx$ and $dy$ code spaces followed by a second series of alternate $r$ and $y$ number spaces, the number of $dx$ code spaces and the number of $dy$ code spaces corresponding to the number of integrator sections, respectively; first recording means for recording the $dz$ electrical output signals on said first channel; first reading means for reading the signals recorded on said first channel; second recording means for serially recording on said second information channel electrical signals representing the information to be operated upon by the plurality of integrator sections, said second recording means including means for recording an electrical code signal in at least one of said $dx$ code spaces, means for recording an electrical code signal in at least one of said $dy$ code spaces and means for recording $r$ and $y$ electrical signals representing the consecutive digits of $r$ and $y$ numbers, respectively, in said $r$ and $y$ number spaces, respectively; second reading means for reading the signals recorded on said second channel; third means coupled to said first and second reading means and responsive to the $dz$ electrical output signals and said $y$ and $dy$ electrical signals in each of said channel sections, for applying to said second recording means a new $y$ electrical signal representing the sum of the $y$ number in said channel section and the number of coincidences at said reading means of a $dz$ signal and a $dy$ signal; bistable electronic switching means having first and second conduction states and being in said first conduction state upon the appearance of the first signal of each channel section at said second reading means, said switching means being responsive to an applied electrical signal for reversing its conduction state; fourth means, coupled to said first and second reading means, for applying an electrical signal to said switching means upon each coincidence at said reading means of a $dz$ output signal and an electrical signal from a $dx$ code space; fifth means, coupled to said second reading means and said switching means, for applying a new $r$ electrical signal to said second recording means, said new $r$ electrical signal representing the result of the mathematical operation of subtraction between the $r$ number and the $y$ number when said switching means is in said first conduction state, and the result of the mathematical operation of addition of the $r$ number and the number represented by the new $y$ signal, when said switching means is in said second conduction state; and sixth means, coupled to said second reading means, for applying to said first recording means an electrical signal representing the most significant carry digit resulting from the operation performed on the $r$ and $y$ numbers, the electrical signal applied by said sixth means constituting the new $dz$ electrical output signal.

53. A digital differential analyzer having a plurality of cyclically operable integrator sections, each section producing a single $dz$ electrical output signal during each cycle thereof, said analyzer comprising: a magnetic memory system including first and second recirculatable information channels, said second information channel being divisible into a plurality of channel sections corresponding respectively to the plurality of integrator sections, each of said channel sections having a first series of alternate $dx$ and $dy$ code spaces followed by a second series of alternate $r$ and $y$ number spaces, the number of $dx$ code spaces and the number of $dy$ code spaces corresponding to the number of integrator sections, respectively; first recording means for recording the $dz$ electrical output signals on said first channel; first reading means for reading the signals recorded on said first channel; second recording means for serially recording on said second information channel electrical signals representing the information to be operated upon by the plurality of integrator sections, said second recording means including means for recording an electrical code signal in at least one of said $dx$ code spaces, means for recording an electrical code signal in at least one of said $dy$ code spaces and means for recording $r$ and $y$ electrical signals representing the consecutive digits of $r$ and $y$ numbers, respectively, in said $r$ and $y$ number spaces, respectively; second reading means for reading the signals recorded on said second channel; third means, coupled to said first and second reading means and responsive to the $dz$ electrical output signals and said $y$ and $dy$ electrical signals in each of said channel sections, for applying to said second recording means a new $r$ electrical signal representing the sum of the $y$ number in said channel section and the number of coincidences at said reading means of a $dz$ signal and a $dy$ signal; fourth means, coupled to said first and second reading means and responsive to the $dz$ electrical output signals and the $dx$ electrical signals in each of said channel sections, for applying a new $r$ electrical signal to said second recording means, said new $r$ electrical signal representing the result of one of the mathematical operations of subtraction between the $r$ number and the $y$ number and addition of the $r$ number and the number represented by the new $y$ signal, said new $r$ signal representing the result of one of said mathematical operations when the number of coincidences of $dz$ and $dx$ signals is odd, and the result of the other of said mathematical operations when said number of coincidences is even; and fifth means, coupled to said second reading means, for applying to said first recording means an electrical signal representing the most significant carry digit resulting from the operation performed on the $r$ and $y$ numbers, the electrical signal applied by said fifth means constituting the new $dz$ electrical output signal.

54. A digital differential analyzer having a plurality of cyclically operable integrator sections, each section producing a single $dz$ electrical output signal during each cycle thereof, said analyzer comprising: a magnetic memory system including first and second recirculatable information channels, said second information channel being divisible into a plurality of channel sections corresponding respectively to the plurality of integrator sections, each of said channel sections having a first series of alternate $dx$ and $dy$ code spaces followed by a second series of alternate $r$ and $y$ number spaces, the number of $dx$ code spaces and the number of $dy$ code spaces corresponding to the number of integrator sections, respectively; first recording means for recording the $dz$ electrical output signals on said first channel; first reading means for reading the signals recorded on said first channel; second recording means for serially recording on said second information channel electrical signals representing the information to be operated upon by the plurality of integrator sections, said second recording means including means for recording an electrical code signal in at least one of said $dx$ code spaces, means for recording an electrical code signal in at least one of said $dy$ code spaces and means for recording $r$ and $y$ electrical signals representing the consecutive digits of $r$ and $y$ numbers, respectively, in said $r$ and $y$ number spaces, respectively; second reading means for reading the signals recorded on said second channel; third means, coupled to said first and second reading means and responsive to the $dz$ electrical output signals and said $y$ and $dy$ electrical signals in each of said channel sections, for applying to said second recording means a new $y$ electrical signal representing the sum of the $y$ number in said channel section and the number of coincidences at said reading means of a $dz$ signal and a $dy$ signal; fourth means, coupled to said first and second reading means and responsive to the number of coincidences between the $dz$ electrical output signals and the $dx$ electrical signals in each of said channel sections, for applying to said second recording means a new $r$ electrical signal representing the result of one of the mathematical operations of addition and subtraction of the $y$ and $r$ numbers; and fifth means, coupled to said second reading means, for applying to said first recording means an electrical signal representing the most significant carry digit resulting from the operation performed on the $r$ and $y$ numbers, the electrical signal applied by said fifth means constituting the new $dz$ electrical output signal.

55. In a digital differential analyzer including a plurality of integrator sections, each of said integrator sections being cyclically operable upon signals representing $r$ and $y$ numbers, a storage system for storing in interplexed order the signals representing the $r$ and $y$ numbers, said system comprising: first generating means for generating a square wave electrical signal having a predetermined period, said signal having alternate relatively high and relatively low voltage levels; a storage element for receiving each signal recorded at a write point and applying said signal at a read point after a time delay substantially equal to a multiple of said predetermined period; second generating means for generating a series of consecutive $y$ electrical signals representing the consecutive digits of the $y$ number; third generating means for generating a series of consecutive $r$ electrical signals representing the consecutive digits of the $r$ number; and means, coupled to each of said generating means, for recording the consecutive $y$ signals at said write point during the corresponding consecutive periods when said square wave electrical signal has a first of said voltage levels and recording the consecutive $r$ signals at said write point during the corresponding consecutive periods when said square wave electrical signal has a second of said voltage levels.

56. The storage system defined in claim 55, wherein the last-named means includes recording means for recording at said write point a signal representing the electrical signal applied thereto, and gating means having an output circuit coupled to said recording means and input circuits coupled to said generating means, said gating means being responsive to each of said first and second voltage levels for applying the corresponding $r$ and $y$ signals, respectively, to said output circuit.

57. The storage system defined in claim 55, wherein said first generating means includes clock pulse means for generating clock pulse signals having a period of one-half said predetermined period, and counting means, coupled to said clock pulse means for generating said first voltage level of said squarewave signal during alternate clock pulse signal periods and said second voltage level of said squarewave signal during the remaining clock pulse signal periods.

58. The storage system defined in claim 57, wherein said second generating means includes means, coupled to said clock pulse means, for generating said $y$ electrical signals during said alternate clock pulse signal periods, and said third generating means includes means, coupled to said clock pulse means, for generating said $r$ electrical signals during said remaining clock pulse signal periods.

59. In a digital differential analyzer including a plurality of integrator sections each of said integrator sections being cyclically operable upon signals representing $r$ and $y$ numbers, a storage system for storing in interplexed order the signals representing the $r$ and $y$ numbers, said system comprising: first generating means for generating a squarewave electrical signal having a predetermined period, said signal having alternate relatively high and relatively low voltage levels; a storage element for receiving each signal recorded at a write point and applying said signal at a read point after a time delay substantially equal to a multiple of said predetermined period; second generating means for generating a series of consecutive $y$ electrical signals representing the consecutive digits of the y number; third generating means for generating a series of electrical signals representing the consecutive digits of the r number; recording means, coupled to each of said generating means, for recording the consecutive y signals at said write point during the corresponding consecutive periods when said squarewave electrical signal has one of said voltage levels and recording the consecutive r signals at said write point during the corresponding consecutive periods when said squarewave electrical signal has the other of said voltage levels; and reading means for reading the signals appearing at said read point.

60. The storage system defined in claim 59, wherein said second generating means includes means for producing an electrical signal representing the change in the y number during each cycle of an integrator section, and selectively operable means, coupled to the last-named means and said reading means, for applying to said recording means either the y signals read by said reading means or a series of consecutive electrical signals representing the consecutive digits of the result of addition between the y number and the change in the y number.

61. The storage system defined in claim 60, wherein said third generating means includes selectively operable means, coupled to said reading means, for producing a series of consecutive electrical signals representing the consecutive digits of the result of either addition or subtraction of the y and r numbers.

62. In an electronic data processing machine for serially operating upon signals representing first and second members, a storage system for storing in interplexed order the signals representing the first and second numbers, said system comprising: first generating means for generating a squarewave electrical signal having a predetermined period, said signal having alternate relatively high and relatively low voltage levels; a storage element for receiving each signal recorded at a write point for applying said signal at a read point after a time delay substantially equal to a multiple of said predetermined period; second generating means for generating a first series of consecutive electrical signals representing the consecutive digits of the first number; third generating means for generating a second series of consecutive electrical signals representing the consecutive digits of the second number; and means, coupled to each of said generating means, for recording the consecutive signals of said first series at said write point during the corresponding consecutive periods when said squarewave electrical signal has one of said voltage levels and recording the consecutive signals of said second series at said write point during the corresponding consecutive periods when said squarewave electrical signal has the other of said voltage levels.

63. The system defined in claim 62, which further includes a rotatable magnetic drum having a clock pulse channel and an information channel, said information channel constituting said storage element.

64. The system defined in claim 63, wherein said first generating means includes means coupled to said clock pulse channel for producing a series of electrical clock pulse signals, and bistable switching means, coupled to the last-named means and responsive to said electrical clock pulse signals, for generating said squarewave electrical signal in synchronism with said clock pulse signals.

65. In an electronic integrator section wherein one input signal series is formed by combining first and second series of bilevel electrical signals, the signals of said first series corresponding, respectively, to the signals of said second series, each signal of said first series having either a first or a second level, and each signal of said second series having either a first or a second level; a unidirectional counter for producing a count representing the difference between the number of first levels and the number of second levels of the signals of said first series corresponding to the signals of said second series having one of said first and second levels; said counter comprising: multi-stage binary counting means settable to a predetermined count, said counting means being responsive to each applied first signal for counting up one binary digit and to each applied second signal for counting up two binary digits; means, responsive to each signal of said second series having the other of said first and second levels, for applying said first signal to said counting means; and means, responsive to each first-level signal of said first series corresponding to a signal of said second series having said one level, for applying said second signal to said counting means.

66. A unidirectional binary counter for producing a count representing the difference between the number of first levels and the number of second levels of those signals of a first series of bilevel electrical signals corresponding to those signals having a predetermined level of a second series of bilevel electrical signals, the signals of said first series corresponding, respectively, to the signals of said second series, said counter comprising: multi-stage counting means settable to a predetermined count, said counting means counting up one binary digit in response to each application of a first signal and counting up two binary digits in response to each application of a second signal; means, responsive to each signal of said second series having a level different from said predetermined level, for applying said first signal to said counting means; and means, responsive to each coincidence between a signal of said second series having said predetermined level and the corresponding signal of said first series having said first level, for applying said second signal to said counting means.

References Cited in the file of this patent

UNITED STATES PATENTS

| | | |
|---|---|---|
| 2,587,532 | Schmidt | Feb. 26, 1952 |
| 2,609,143 | Stibitz | Sept. 2, 1952 |
| 2,611,813 | Sharpless | Sept. 23, 1952 |
| 2,635,229 | Gloess et al. | Apr. 14, 1953 |
| 2,636,672 | Hamilton et al. | Apr. 28, 1953 |
| 2,644,887 | Wolfe | July 7, 1953 |
| 2,656,524 | Gridley et al. | Oct. 20, 1953 |
| 2,666,575 | Edwards | Jan. 19, 1954 |
| 2,679,638 | Bensky | May 25, 1954 |
| 2,700,696 | Barker | Jan. 25, 1955 |
| 2,701,095 | Stibitz | Feb. 1, 1955 |
| 2,726,038 | Ergen | Dec. 6, 1955 |
| 2,735,005 | Steele | Feb. 14, 1956 |
| 2,737,342 | Nelson | Mar. 6, 1956 |
| 2,745,006 | Chu | May 8, 1956 |
| 2,749,037 | Stibitz | June 5, 1956 |
| 2,772,050 | Robinson | Nov. 27, 1956 |
| 2,777,634 | Williams | Jan. 15, 1957 |
| 2,790,599 | Gloess | Apr. 30, 1957 |
| 2,841,328 | Steele et al. | July 1, 1958 |
| 2,850,232 | Hagen et al. | Sept. 2, 1958 |
| 2,866,177 | Steele | Dec. 23, 1958 |
| 2,923,470 | Beck et al. | Feb. 2, 1960 |

FOREIGN PATENTS

| | | |
|---|---|---|
| 1,021,382 | France | Dec. 3, 1952 |
| 1,033,166 | France | Apr. 1, 1953 |
| 718,983 | Great Britain | Nov. 24, 1954 |

OTHER REFERENCES

Functional Description of the EDVAC, Univ. of Penn., Moore School of EE; received Patent Office May 3, 1951; vol. I, pages 1-2, 1-3; vol. II, FIGS. 104-10LD-6; 104-6LC-2.

"Design of a Digital Computer by Boolean Algebra" by Jeffrey and Reed, Digital Computer Lab. of M.I.T., Engineering Note E-462, May 20, 1952.

"The Design of the Bendix Digital Differential Analyzer," Proceedings of the I.R.E., pages 1352-1356, October 1953.